US008579699B2

(12) United States Patent
Bigelow, Jr. et al.

(10) Patent No.: US 8,579,699 B2
(45) **Date of Patent: *Nov. 12, 2013**

(54) GAMING SYSTEM, GAMING DEVICE AND METHOD FOR PROVIDING AN OUTCOME ENHANCING FEATURE

(75) Inventors: Robert F. Bigelow, Jr., Reno, NV (US); Damien C. Ennis, Reno, NV (US); Michael P. Khamis, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/586,651

(22) Filed: Aug. 15, 2012

(65) Prior Publication Data

US 2012/0309483 A1 Dec. 6, 2012

Related U.S. Application Data

(63) Continuation of application No. 11/980,290, filed on Oct. 30, 2007, now Pat. No. 8,257,164.

(51) Int. Cl.
*A63F 13/00* (2006.01)

(52) U.S. Cl.
USPC .................. 463/21; 463/23; 463/26; 463/40; 273/138.1; 273/139

(58) Field of Classification Search
USPC ................ 463/21, 23, 26, 40; 273/138.1, 139
See application file for complete search history.

(56) References Cited

U.S. PATENT DOCUMENTS 3,048,402 A 5/1961 Schaper
4,327,919 A 5/1982 Vennor
4,488,727 A 12/1984 Lam
4,582,324 A 4/1986 Koza et al.
4,593,904 A 6/1986 Graves (Continued)

FOREIGN PATENT DOCUMENTS

EP 0 281 402 9/1988
EP 0 945 837 9/1999

(Continued)

OTHER PUBLICATIONS

Double Up Poker Game Description, written by IGT, available prior to 2000.

(Continued)

*Primary Examiner* — Sunit Pandya
*Assistant Examiner* — Shahid Kamal
(74) *Attorney, Agent, or Firm* — Neal, Gerber & Eisenberg LLP

(57) ABSTRACT

An embodiment of a gaming device includes a game having at least three choices, wherein each of the choices either trumps or is trumped by one of the other choices, and a processor programmed to determine if an outcome enhancing condition is satisfied, enable a player to elect to enhance an outcome if an outcome enhancing condition is satisfied, enable the player to select one of said choices, select one of said choices, determine an outcome based on a comparison of the player's choice with the processor's choice, provide a win outcome if the player elected to enhance an outcome and the comparison of the player's choice with the processor's choice results in a draw determination, provide a draw outcome if the player elected to enhance an outcome and the comparison of the player's choice with the processor's choice results in a lose determination.

8 Claims, 34 Drawing Sheets

(56) References Cited

U.S. PATENT DOCUMENTS

| | | | | |
|---|---|---|---|---|
| 4,624,459 | A | 11/1986 | Kaufman | |
| 4,695,053 | A | 9/1987 | Vazquez, Jr. et al. | |
| 4,836,546 | A | 6/1989 | DiRe et al. | |
| 5,034,807 | A | 7/1991 | Von Kohorn | |
| 5,072,946 | A | 12/1991 | Miller | |
| 5,154,420 | A | 10/1992 | Gutknecht | |
| 5,324,041 | A | 6/1994 | Boylan et al. | |
| 5,342,047 | A | 8/1994 | Heidel et al. | |
| 5,524,888 | A | 6/1996 | Heidel | |
| 5,890,962 | A | 4/1999 | Takemoto | |
| 5,944,314 | A | 8/1999 | Stavinsky | |
| 5,951,397 | A | 9/1999 | Dickinson | |
| 5,988,643 | A | 11/1999 | Awada | |
| 5,997,401 | A | 12/1999 | Crawford | |
| 6,004,207 | A | 12/1999 | Wilson | |
| 6,007,424 | A | 12/1999 | Evers et al. | |
| 6,015,346 | A | 1/2000 | Bennett | |
| 6,033,307 | A | 3/2000 | Vancura | |
| 6,068,553 | A | 5/2000 | Parker | |
| 6,089,976 | A | 7/2000 | Schneider | |
| 6,102,798 | A | 8/2000 | Bennett | |
| 6,126,542 | A | 10/2000 | Fier | |
| 6,135,882 | A | 10/2000 | Kadlic | |
| 6,142,874 | A | 11/2000 | Kodachi et al. | |
| 6,142,875 | A | 11/2000 | Kodachi et al. | |
| 6,146,271 | A * | 11/2000 | Kadlic | 463/13 |
| 6,159,095 | A | 12/2000 | Frohm et al. | |
| 6,159,096 | A | 12/2000 | Yoseloff | |
| 6,159,097 | A * | 12/2000 | Gura | 463/20 |
| 6,159,098 | A | 12/2000 | Slomiany et al. | |
| 6,164,652 | A | 12/2000 | Lauretta et al. | |
| 6,168,523 | B1 | 1/2001 | Piechowiak et al. | |
| 6,174,235 | B1 | 1/2001 | Walker et al. | |
| 6,190,255 | B1 | 2/2001 | Thomas et al. | |
| 6,193,606 | B1 | 2/2001 | Walker et al. | |
| 6,203,429 | B1 * | 3/2001 | Demar et al. | 463/20 |
| 6,210,279 | B1 | 4/2001 | Dickinson | |
| 6,217,022 | B1 | 4/2001 | Astaneha | |
| 6,224,483 | B1 * | 5/2001 | Mayeroff | 463/20 |
| 6,227,969 | B1 | 5/2001 | Yoseloff | |
| 6,231,442 | B1 | 5/2001 | Mayeroff | |
| 6,296,568 | B1 | 10/2001 | Tracy | |
| 6,305,686 | B1 * | 10/2001 | Perrie et al. | 273/146 |
| 6,315,660 | B1 | 11/2001 | DeMar et al. | |
| 6,328,649 | B1 | 12/2001 | Randall et al. | |
| D457,571 | S | 5/2002 | Edwards, Jr. | |
| 6,394,899 | B1 | 5/2002 | Walker | |
| 6,398,220 | B1 | 6/2002 | Inoue | |
| 6,406,369 | B1 * | 6/2002 | Baerlocher et al. | 463/20 |
| 6,425,824 | B1 | 7/2002 | Baerlocher et al. | |
| 6,572,473 | B1 | 6/2003 | Baerlocher | |
| 6,602,135 | B1 | 8/2003 | Gerrard | |
| 6,607,438 | B2 | 8/2003 | Baerlocher et al. | |
| 6,632,139 | B1 | 10/2003 | Baerlocher | |
| 6,632,141 | B2 | 10/2003 | Webb et al. | |
| 6,726,563 | B1 | 4/2004 | Baerlocher et al. | |
| 6,761,632 | B2 | 7/2004 | Bansemer et al. | |
| 6,780,103 | B2 | 8/2004 | Bansemer et al. | |
| 6,814,664 | B2 | 11/2004 | Baerlocher et al. | |
| 6,837,793 | B2 | 1/2005 | McClintic | |
| 6,918,830 | B2 | 7/2005 | Baerlocher | |
| 6,942,568 | B2 | 9/2005 | Baerlocher | |
| 7,037,192 | B2 | 5/2006 | Baerlocher et al. | |
| 7,056,210 | B2 | 6/2006 | Bansemer et al. | |
| 7,175,524 | B2 | 2/2007 | Bansemer et al. | |
| 7,192,344 | B2 * | 3/2007 | Baerlocher | 463/16 |
| 2003/0060281 | A1 | 3/2003 | Vancura | |
| 2003/0071416 | A1 | 4/2003 | Vancura | |
| 2003/0104852 | A1 | 6/2003 | Duhamel | |
| 2003/0193139 | A1 | 10/2003 | Vancura et al. | |
| 2004/0067790 | A1 | 4/2004 | Peterson et al. | |
| 2006/0189370 | A1 | 8/2006 | Baerlocher et al. | |
| 2007/0082725 | A1 | 4/2007 | Low et al. | |
| 2007/0167230 | A1 | 7/2007 | Baerlocher | |

FOREIGN PATENT DOCUMENTS

| | | |
|---|---|---|
| GB | 2 105 891 | 3/1983 |
| GB | 2 222 712 | 3/1990 |
| JP | 7-185126 | 7/1995 |
| JP | 10048363 | 2/1998 |
| JP | 2000-014933 | 1/2000 |
| JP | 2000-245949 | 9/2000 |
| JP | 2000-254350 | 9/2000 |
| KR | 2001066723 | 7/2001 |
| WO | WO 82/01611 | 5/1982 |
| WO | WO 98/00207 | 1/1998 |
| WO | WO 00/12186 | 3/2000 |
| WO | WO 02/32523 | 4/2002 |

OTHER PUBLICATIONS

Fey, Marshall, Slot Machines a Pictorial History of the First 100 Years, 5th, p. 161.
In Between Game Description, written by IGT, available prior to 2000.
Janken-8 II Brochure, written by Hsin Chen Wen Enterprises Co., Ltd., published prior to 2000.
Polly & Roger Brochure, written by VLC, Inc., published in 2000.
Roulette Description, written by Gaming Guide Peppermill Hotel, available prior to 2000.
Run for Your Money Brochure, written by IGT, published in 1998.
Top Gear Brochure, written by Aristocrat Leisure Industries Pty. Ltd., published in Sep. 1995.

* cited by examiner

FIG.3A
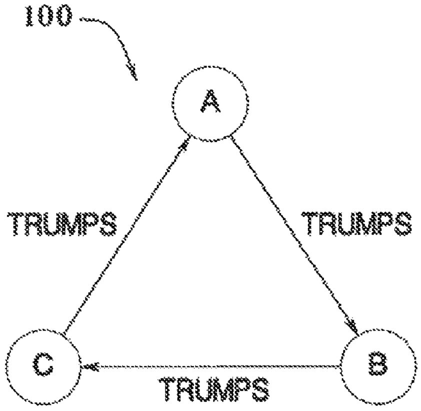
FIG.3B
102
| |
|---|
| A TRUMPS B |
| B TRUMPS C |
| C TRUMPS A |
FIG.3C
104
| | |
|---|---|
| A | 33.3% |
| B | 33.3% |
| C | 33.3% |
FIG.4A
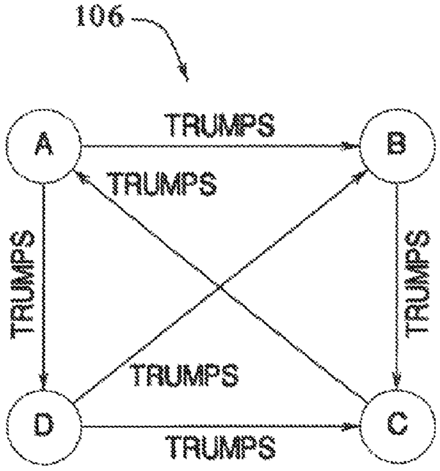
FIG.4B
108
| |
|---|
| A TRUMPS B |
| A TRUMPS D |
| B TRUMPS C |
| C TRUMPS A |
| D TRUMPS B |
| D TRUMPS C |
FIG.4C
110
| | |
|---|---|
| A | 30% |
| B | 10% |
| C | 30% |
| D | 30% |

114

| | | |
|---|---|---|
| A | TRUMPS | B |
| A | TRUMPS | D |
| B | TRUMPS | C |
| B | TRUMPS | E |
| C | TRUMPS | A |
| C | TRUMPS | D |
| D | TRUMPS | B |
| D | TRUMPS | E |
| E | TRUMPS | C |
| E | TRUMPS | A |

116

| | |
|---|---|
| A | 20% |
| B | 20% |
| C | 20% |
| D | 20% |
| E | 20% |

120

| | | |
|---|---|---|
| A | TRUMPS | B |
| A | TRUMPS | G |
| B | TRUMPS | C |
| B | TRUMPS | D |
| C | TRUMPS | A |
| C | TRUMPS | D |
| D | TRUMPS | E |
| D | TRUMPS | F |
| E | TRUMPS | C |
| E | TRUMPS | F |
| F | TRUMPS | G |
| F | TRUMPS | H |
| G | TRUMPS | E |
| G | TRUMPS | H |
| H | TRUMPS | A |
| H | TRUMPS | B |

122

| | |
|---|---|
| A | 12.5% |
| B | 12.5% |
| C | 12.5% |
| D | 12.5% |
| E | 12.5% |
| F | 12.5% |
| G | 12.5% |
| H | 12.5% |

FIG.7A

124

| | |
|---|---|
| WIN | 33.3% |
| LOSE | 33.3% |
| DRAW | 33.3% |

FIG.7B

126

| | |
|---|---|
| WIN | 25% |
| LOSE | 25% |
| DRAW | 50% |

FIG.7C

128

| | |
|---|---|
| WIN | 40% |
| LOSE | 30% |
| DRAW | 30% |

FIG.7D

130

| | |
|---|---|
| WIN | 35% |
| LOSE | 35% |
| DRAW | 30% |

FIG.9

162

| | | |
|---|---|---|
| 3 | 2 | 30% |
| 5 | 2 | 30% |
| 7 | 2 | 15% |
| 9 | 0 | 10% |
| 12 | 0 | 5% |
| 15 | 0 | 4% |
| 20 | 0 | 3% |
| 27 | 0 | 2% |
| 40 | 0 | 1% |

164

166

168

FIG. 19

Slant Right

| Defense | -10 | -5 | -2 | -1 | 0 | 1 | 2 | 3 | 5 | 8 | 10 | 15 | 20 | 30 | Yards |
|---|---|---|---|---|---|---|---|---|---|---|---|---|---|---|---|
| 4-3 | 1 | 2 | 4 | 6 | 9 | 12 | 16 | 16 | 12 | 9 | 6 | 4 | 2 | 1 | % |
| 3-4 | 1.5 | 1.5 | 5 | 5 | 10 | 11 | 16 | 16 | 11 | 10 | 5 | 5 | 1.5 | 1.5 | % |
| Goal Line | 5 | 5 | 10 | 10 | 10 | 5 | 5 | 5 | 5 | 10 | 10 | 10 | 5 | 5 | % |
| Prevent | 0 | 1 | 2 | 2 | 5 | 20 | 20 | 20 | 20 | 5 | 2 | 2 | 1 | 0 | % |
| Zone | .5 | 2.5 | 5 | 7 | 10 | 12 | 13 | 13 | 12 | 10 | 7 | 5 | 2.5 | .5 | % |
| Man to Man | 3 | 5 | 6 | 7 | 9 | 10 | 10 | 10 | 10 | 9 | 7 | 6 | 5 | 3 | % |
| Safety Blitz | 5.5 | 7.5 | 5 | 6 | 8 | 9 | 9 | 9 | 9 | 8 | 6 | 5 | 7.5 | 5.5 | % |
| Corner Blitz | 6 | 6 | 6 | 6 | 8 | 9 | 9 | 9 | 9 | 8 | 6 | 6 | 6 | 6 | % |
| Zone Blitz | 4 | 4 | 6 | 8 | 8 | 10 | 10 | 10 | 10 | 8 | 8 | 6 | 4 | 4 | % |
| LB Blitz | 5 | 8 | 6 | 7 | 7 | 8 | 9 | 9 | 8 | 7 | 7 | 6 | 8 | 5 | % |
| All Out Blitz | 10 | 10 | 10 | 5 | 5 | 5 | 5 | 5 | 5 | 5 | 5 | 10 | 10 | 10 | % |
| Fake Blitz | 2 | 4 | 5 | 6 | 10 | 11 | 12 | 12 | 11 | 10 | 6 | 5 | 4 | 2 | % |

(3a) + (1b) + (2c) + (4+s)

(2a) + (1b) + (3c) + (4+s)

(3a) + (2b) + (1c) + (4+s)

(1a) + (3b) + (2c) + (4+s)

(1a) + (3b) + (4c) + (2+s)

(1a) + (2b) + (3c) + (4+s)

(2a) + (1b) + (4c) + (3+s)

(2a) + (3b) + (4c) + (1+s)

(4a) + (1b) + (2c) + (3+s)

(4a) + (2b) + (3c) + (1+s)

FIG. 26A
Acceleration
35 - 0 to 60 mph in 5 sec = 42857m/hr$^2$
30 - 0 to 60 mph in 6 sec = 35294m/hr$^2$
25 - 0 to 60 mph in 7 sec = 31579m/hr$^2$
20 - 0 to 60 mph in 8 sec = 27000m/hr$^2$
Deceleration
35 - 60 to 0 mph in 6 sec = 35294m/hr$^2$
30 - 60 to 0 mph in 7 sec = 31579m/hr$^2$
25 - 60 to 0 mph in 8 sec = 27000m/hr$^2$
20 - 60 to 0 mph in 9 sec = 24000m/hr$^2$
Cornering
35 - 3000 (r) mph
30 - 2750 (r) mph
25 - 2500 (r) mph
20 - 2250 (r) mph
Top Speed
35 - 250 mph
30 - 235 mph
25 - 220 mph
20 - 205 mph
FIG. 26B
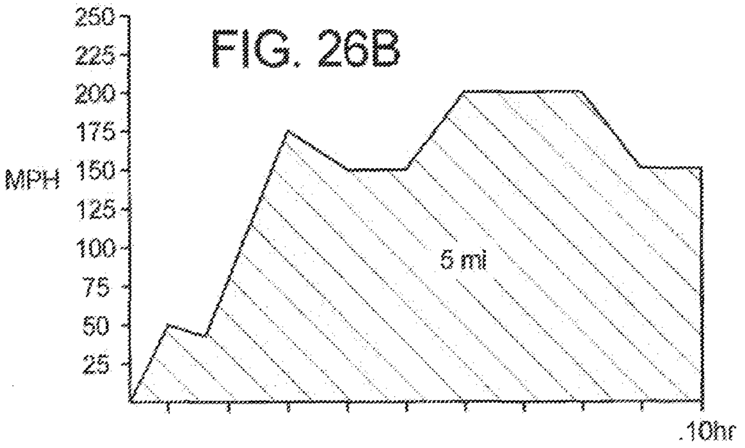
FIG. 26C
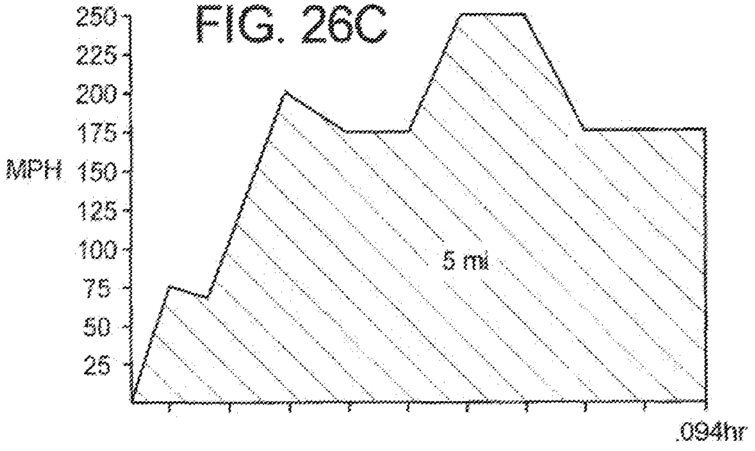

FIG. 27

| No. of Plays | Pay out Distribution for 75% Payback |
|---|---|
| 2 | 1st - 1.5x<br>2nd - 0 |
| 3 | 1st - 1.75x<br>2nd - .50x<br>3rd - 0 |
| 4 | 1st - 2.00x 4th - 0<br>2nd - 1.00x<br>3rd - 0 |
| 5 | 1st - 2.25x 4th - 0<br>2nd - 1.25x 5th - 0<br>3rd - .25x |
| 6 | 1st - 2.5x 4th - 0<br>2nd - 1.25x 5th - 0<br>3rd - .5x 6th - 0 |
| 7 | 1st - 2.75x 4th - .25x<br>2nd - 1.5x 5th - 0<br>3rd - .5x 6th - 0 |

⋮

FIG. 28

| Place | Pay | Likelihood | Payback |
|---|---|---|---|
| 1st | 4x | .1 | .4x |
| 2nd | 2.5x | .1 | .25x |
| 3rd | 1.5x | .1 | .15x |
| 4th | 1.25x | .1 | .125x |
| 5th | .25x | .1 | .025x |
| 6th | 0 | .1 | |
| 7th | 0 | .1 | |
| 8th | 0 | .1 | |
| 9th | 0 | .1 | |
| 10th | 0 | .1 | |
| | | | .95x |

GAMING SYSTEM, GAMING DEVICE AND METHOD FOR PROVIDING AN OUTCOME ENHANCING FEATURE

PRIORITY CLAIM

This application is a continuation of, claims priority to and the benefit of U.S. patent application Ser. No. 11/980,290, filed on Oct. 30, 2007, the entire contents of which are incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

In an attempt to make gaming devices more exciting and enjoyable for a player, gaming device manufacturers strive to make games more suspenseful or generally suspense building. One method and apparatus for making games more suspenseful includes a secondary or bonus game, which is played in addition to the base wagering game. Bonus games have enjoyed much commercial success especially in combination with the game of slot.

Free plays or spins of a base slot game and scatter pays have also been provided to add to the enjoyment of slot. Bonus games, free plays or spins and scatter pays are popular in part because the player feels as if the player is receiving something for free.

Bonus games, free plays and spins, and scatter pays that tend to be repetitive (e.g., repeat the same graphics and sounds) can become less exciting over time to frequent players. Swapping out bonus games, free plays and spins and scatter pays with similar but different features to maintain spontaneity can be done but is relatively cumbersome to do.

A need therefore exists for a secondary gaming feature, such as for the base game of slot, which adds to the overall gaming experience, does not need regular updating, and which maintains spontaneity with players and in particular frequent players.

SUMMARY

In one embodiment, the gaming devices disclosed herein include various competition and/or attack and countermeasure games in which an outcome enhancing feature can be implemented. In one such embodiment, the gaming device enables a player to elect to enhance one or more outcomes if an outcome enhancing condition is satisfied. If the player elects to enhance one or more outcomes, the gaming device provides the player with an outcome more favorable than the outcome the player would have received if they had not elected to enhance an outcome. That is, if the player elects to enhance one or more outcomes, the gaming device provides the player with an outcome associated with an average expected payout greater than the average expected payout associated with the outcome the player would have received if the player had not elected to enhance an outcome.

In one embodiment, the present disclosure provides a gaming device which can include an outcome enhancing feature implemented in a bonus round of a gaming device that provides the player with a plurality of selections, wherein the selections prompt the gaming device to generate an outcome, and wherein the outcome can be a positive outcome for the player, a negative outcome for the player or a neutral outcome for the player. The gaming device displays a plurality of choices to the player and enables the player to select one of the choices.

In one embodiment, the outcome enhancing feature can be implemented in a game which includes a database of choice comparisons or a choice comparator that takes any two of the choices presented to the player and determines a winner between the two choices. The game reveals which choices beat or trump which other choices. In one embodiment, the player and the game each randomly generate a choice, whereby the game provides a positive outcome to the player if the player's choice trumps the game's choice, the game provides a negative outcome to the player if the game's choice trumps the player's choice and the game provides a neutral outcome if the player's choice is the same as or equal to the game's choice.

In a second embodiment, the outcome enhancing feature can be implemented in a game that includes a database of outcomes; namely, a positive player outcome, a negative player outcome and a neutral player outcome. The game can equally weight the outcomes or weight the outcomes so that the game randomly selects one or more outcomes more often than one or more other outcomes. In this embodiment, the player makes a choice and the game randomly generates an outcome, which can be a weighted outcome.

When the game generates a positive player outcome, the game determines its appropriate choice from the comparison database and displays both its choice and the positive outcome to the player. This embodiment proceeds backwards with respect to the previous embodiment. When the game generates a negative player outcome, the game determines its appropriate choice from the comparison database and displays both its choice and the negative outcome to the player. When the game generates a neutral player outcome, the game determines its appropriate choice from the comparison database and displays both the choice and the neutral outcome to the player.

In both of the bonus round embodiments mentioned above, the game enables the player to continue to play until a negative outcome occurs. The player keeps any prior awards from positive outcomes and does not risk achieved awards for the chance to accumulate a higher award.

The outcome enhancing feature can be incorporated into a game that contemplates different choice display embodiments described in detail below. In one embodiment, the game structures the choice comparisons such that each choice either trumps or is trumped by every other choice. In this embodiment, only a random selection of the same choice by the player and the game generates a neutral outcome. Alternatively, if the game randomly selects a neutral outcome, the game has only one choice to choose, the choice that the player selected.

In another embodiment, the outcome enhancing feature can be implemented in a game which structures the choice comparisons such that not every choice trumps or is trumped by every other choice. In this other embodiment, a random selection of the player's choice or a choice not trumping or trumped by the player's choice generates a neutral outcome. Alternatively, if the game randomly selects a neutral outcome, the game can randomly select the choice that the player selected or a choice not trumping or trumped by the player's choice.

Further described herein are alternative embodiments for a gaming system, gaming device and method of providing a game which can include an outcome enhancing feature implemented in a game, such as a bonus game. The gaming device can include any suitable base game, such as slot, poker, blackjack, keno, baccarat, etc. The bonus game can be provided on any type of gaming device media, such as at a casino gaming device, a gaming kiosk, or at a computer via a network such as the internet. The bonus game can be played by a single player at a single gaming machine or can be implemented via a network and can be played by two or more players simultaneously at different gaming devices.

In one such further embodiment, the outcome enhancing feature can be implemented in a game such as a bonus game that provides a feature including a competition or exchange between two or more competitors, combatants, icons or other symbols. In one embodiment, each competitor or combatant makes an individual offensive pick or play from a plurality of different possible offensive picks or plays and an individual defensive pick or play from a plurality of different possible defensive picks or plays. These offensive plays and defensive plays of are independent from each other. Each offensive pick or play can hit or score a point against the other competitor. Each defensive pick can block a hit or point score via the offensive pick of the other competitor. Points are tallied over one or preferably a plurality of plays. At the end, the competitor with the most points wins an award. In another implementation, a player plays through multiple rounds. In one such embodiment, if the player beats the competitor, the player advances to the next round. The player's award is based at least in part on how far the player advances.

In various embodiments, the outcome enhancing feature can be incorporated in a game which is implemented in a single player or multiplayer format. For example, a single player could play against a computer or game competitor. Alternatively, multiple single players could each play against a computer or game competitor, against a same random computer or house draw. Alternatively, two players can play and pick against each other. Further alternatively, a group of players can play in a tournament type setting in which winners of a first round play each other in a second round. Winners of the second round play each other in a third round and so on. The ultimate winner wins the highest award. Lesser amounts may be paid to players advancing the second farthest, third farthest, etc. Consolation rounds can also be played.

In various embodiments, the outcome enhancing feature can be implemented in a competition feature coupled with any suitable game theme. In one example embodiment, the game theme includes a physical combat or fight theme in which two combatants try to win the fight. Each fighter chooses to attack a certain area of their competitor's body and defend a certain area of their own body for each play. In an alternative example embodiment, the game involves a tank battle in which each tank picks an offensive zone to shoot at (where the opposing tank is predicted to move) and a defensive zone to move to in an attempt to avoid the opponent's shot. Other example game themes are shown and described below.

The outcomes of the attack and countermeasure games may be scored and configured in anyone or more of a plurality of different ways. For example, a point can be awarded when a hit is scored. The game can include multiple competitions or rounds after which the player with the highest total score is the winner. The players can receive a cash or credit award that is fixed, based on a total score, based on a difference between player scores or any combination thereof. In an alternative embodiment, the player advances to a second, third, etc. more lucrative rounds. In this manner, multiple players can play in tournament fashion.

In one embodiment of a game which can include an outcome enhancing feature, the players choose from the same group or set of plays. For example, in a fighting game each player (or single player versus machine) individually picks from the head, middle body and lower body (i) to attack and (ii) to defend. If the player's defended area matches the opponent's attack area, then the opponent receives no point(s). Otherwise, the opponent receives one or more points. If the attack area is different than the opponent's defended area, then the player receives one or more point(s). If the attack area is the same as the defended area, the player receives no point(s). Here, winning and losing is based on a matching or non-matching of the individual player offensive and defensive picks or plays.

In one embodiment, winning and losing are chosen randomly and independently of the chosen plays. For example, in a basketball themed game, a first player chooses to drive to the basket and then defend in a man-to-man defense, while a second player (or the machine) chooses to defend in zone and then take a jump shot. The resulting hitting or missing of a basket is determined randomly and independently of the offensive and defensive plays called. The random decisions can be weighted equally, e.g., 50°/h basket to no-basket, or weighted unevenly.

The amount of points or credits awarded can also vary randomly or accordingly to a schedule. For example, more points can be awarded for a less likely victory. For example, in a football themed game, a blitz defense can be weighted to succeed less frequently but provide more points if successful. In another example, the defense could not only deny points for the opponent but result in a loss of points from the opponent's total. In another football example, a long pass play has a low probability of success, but a high point gain or award.

Thus, as described above it should be appreciated in various embodiments, each play of the set of plays trumps or is trumped by at least one other play of the set. In one embodiment, the player makes a single pick which has an offensive component and a defensive component instead of individual picks of the offensive and defensive plays. For example, a "rock" pick offensively defeats a "scissors" pick but loses to a "paper" pick. This embodiment can lead to a tie or draw, which can be configured to be a push (do over or play again). Alternatively, the tie or draw causes a wager or stakes increase, e.g., a win in the next game receives two points instead of one, while a loss results in two points for the opponent instead of one. In other embodiments mentioned above and further described below, the player makes multiple a single pick which has an offensive component and a defensive component instead of individual picks of the offensive and defensive plays.

It should be appreciated that the various embodiments described herein are particularly suited to be implemented using a video monitor and a touch screen overlay, such that indicia displayed on the monitor can be selected directly. For example, the display device can display a plurality of play buttons each of which is selectable. Further, the player may be able to select from a group of displayed characters—to choose the player's fighter or champion. The plays or actions selected are enacted or carried-out on the display device as is the outcome, e.g., credit award, point score, round advancement, etc.

In various alternative embodiments, the outcome enhancing feature can be implemented in a competition racing game which is provided as a base wagering game or as a bonus game played in combination with a base wagering game. In one such implementation, the game has the appearance of being a skill game because the player divides a preset amount of driving points amongst a plurality of different driving categories. The gaming machine processor randomly picks a race track from a plurality of different race tracks for a given race. Depending on the race track chosen, different distributions of driving points will cause the player's car to fare better or worse in relation to other cars in the race. The outcome of the race is therefore determined randomly because the outcome depends upon how well the player's driving point distribution matches with the randomly chosen track. In various embodiments, the categories can be considered offensive and defensive and the race track can be considered have offensive and defensive attributes.

In one example embodiment, four driving categories are provided, namely, acceleration, braking, cornering and top speed. It should be appreciated that more or less categories can be used, but that there should be at least two categories. Acceleration determines how quickly a car achieves its top speed. Braking determines how closely the car can come to a deceleration point of the track, e.g., corner or turn, before having to brake. Cornering determines how fast a car can go through a turn or corner. Top speed determines the maximum speed the car can reach assuming the tracks provides enough of a straight section to do so.

A suitable algorithm determines the race outcome for each car depending on the player's chosen driving point distribution and the randomly chosen track. In one embodiment the algorithm calculations are made prior to the race, after which the race is displayed on the video screens of each gaming device, on a large overhead video monitor or both.

In one embodiment, the gaming machine enables the player to determine the configuration of the player's representative car. The player chooses features such as car style, color, advertising, logos, numbering, etc. The player's car appears as chosen by the player. In this manner, the player can discern readily which car is his or hers. In one alternative embodiment, the player's car appears in the race with number corresponding to a number associated with the gaming device.

In one embodiment, the outcome enhancing feature can be implemented in a primary or bonus game which includes multiple races. After each race, each player's overall point total is reevaluated. At the end of all the races, winners and non-winners are determined. In one embodiment, the top winner takes the whole award or prize. In a contest between two players, for example, the winner can win the whole award or prize. In another embodiment, a top percentage of racers wins an award or prize. For example, in a race amongst ten drivers, the top three racers win some amount of the whole award or prize, e.g., 50% to the first place winner, 30% to the second place winner, and 20% to the third place winner. In a bonus embodiment, each racer can win a portion of the prize.

The racers can re-reconfigure their car and driving point distribution between races in one embodiment. In another embodiment, either one or both the car or driving point distribution is set for the entire game. The setup configuration works via a plurality of countdown periods in one embodiment. For example, each race of a ten race set can last for a minute. Between each race a minute and a half is provided for reconfiguration and winner re-alignment. The ten races and nine periods in between the races add to a total of 23.5 minutes. Afterwards, another half a minute is dedicated to highlighting the race winner(s) and distributing the award, bringing the total time elapsed to twenty-four minutes.

The next six minutes is then dedicated to calling or soliciting players for the next race. For example, the overhead video monitor can display a countdown, and/or the individual gaming devices can provide video and/or audio prompts. The casino can also advertise that a new race series begins every half a hour. The players place their wagers during the six minute countdown period, configure their cars and set the driving point distribution for the first race. In an alternative two player game, an associated gaming device waits or gaming devices wait until two players place their wager.

In one embodiment, the multiplayer racing system includes a dedicated number of gaming devices or stations, a server computer in communication with the individual gaming devices, and a large overhead display in communication with the server computer. Assuming ten constituent gaming devices, for example, the system displays ten cars in the race regardless of how many gaming devices are actually played. The server randomly decides the point distribution for any unplayed cars. The system is configured to payback a predetermined percentage for each series of races. For example, if in a 75% payback game four of the ten machines are active and the active machines rank seven, eight, nine and ten after the series of races, the seventh place car wins 50% of the total of all wagers, the eighth place car wins 25% of the total of all wagers (e.g., breaks even), the ninth and tenth cars win nothing. Alternatively, in a bonus game, each player wins a certain amount depending on their relative place finish.

In an alternative embodiment, if only four of ten machines are active after the countdown, only the four participant cars are shown in the race with the first place car taking the largest prize percentage, and so on. In a further alternative embodiment, a single player plays against one or more cars having point distributions that the server computer chooses randomly. In one such embodiment, the payouts can be fixed for a particular place finish, e.g., 5× wager for first place, 3× for second place, and so on. In one such embodiment, the overall payout percentage and expected value of the gaming system are predetermined.

In one embodiment, the system is configured to track the player's car configuration and/or driving point configuration on the player's system through a player tracking system. This way, the player can simply insert his/her card in a machine or kiosk, recall prior settings and play using those settings or changed settings. If the player's settings are different at the end of the racing series, the system prompts the player to save the changed settings as the default settings if desired.

In one embodiment, the gaming device disclosed herein includes an outcome enhancing feature implemented in various competition games and/or attack and countermeasure games described above and below. In one such embodiment, the gaming device enables a player to elect to enhance one or more outcomes if an outcome enhancing condition is satisfied. If the player does not elect to enhance one or more outcomes, the gaming device performs a first determination based on a comparison of the player's selected choice and the game's selected choice. The first determination results in an outcome from a first set of outcomes provided to the player. If the player elects to enhance one or more outcomes, the gaming device performs a different, second determination based on a comparison of the player's selected choice and the game's selected choice. The second determination results in an outcome from a second set of outcomes provided to the player, wherein the second set of outcomes are associated with an average expected payout greater than the average expected payout of the first set of outcomes. That is, the second determination provides a player with a better outcome and greater payout than they would have received from the first determination with the same game choice and player choice selections.

In one such embodiment, the outcome enhancing feature is implemented in the game described above having three choices, wherein each choice either trumps or is trumped by one of the other choices. In this embodiment, the game includes a win outcome, a draw outcome, and a lose outcome, wherein the win outcome is associated with a greater average expected payout than the draw outcome and the draw outcome is associated with a greater average expected payout than the lose outcome. In this embodiment, the gaming device decides whether an outcome enhancing condition has been satisfied. If an outcome enhancing condition has been satisfied, the gaming device enables the player to elect to enhance an outcome. If the player does not elect to enhance an outcome, the gaming device enables a player to select a choice and the game to select a choice. Based on a comparison of the player's choice and the game's choice, the gaming device determines the win outcome, the lose outcome, or the draw outcome as described above. For example, if the player's selection trumps the game's selection, the gaming device provides the player with the win outcome. If the player's selection does not trump the game's selection, the gaming device provides the player with the draw outcome. If the player's selection is trumped by the game's selection, the gaming device provides the player with the lose outcome.

In this embodiment, if the player elects to enhance an outcome, the gaming device compares the player's selected choice with the game's selected choice and determines the win outcome or the draw outcome. For example, if the player's selected choice does not trump the game's selected choice, the gaming device provides the player with the win outcome instead of the draw outcome. If the player's selected choice is trumped by the game's selected choice, the gaming device provides the player with the draw outcome instead of the lose outcome. Thus, the player's decision to elect to enhance an outcome provides the player with an outcome associated with a greater average expected payout than the player would have received if they had not elected to enhance an outcome and made the same choice selection. The outcome enhancing feature therefore improves the player's chances of receiving a favorable outcome and increases the player's excitement and enjoyment of playing an attack and countermeasure type game.

In one embodiment, the outcome enhancing condition is satisfied by an occurrence, or by a quantity of occurrences, of a gaming device monitored event. For example, conditions that may satisfy the outcome enhancing condition include, but are not limited to, a player completing a designated number of games, a player placing any wager amount on a game, a player placing a designated wager amount on a game, a player receiving a predetermined outcome such as a designated number of points or awards, the passage of a designated amount of time, the display of a designated symbol or symbol combination on one or more wheels or reels, the spinning of one or more wheels or reels a designated number of times, or the occurrence of any other trackable event during a player's gaming activity. In different embodiments, the determination of whether an outcome enhancing condition is satisfied is predetermined, randomly determined, determined based on a random determination by the central controller, determined based on a random determination by one or more gaming devices, determined based on the status of one or more players (such as determined through a player tracking system), determined based on one or more side wagers placed, determined based on the amount of coin-in accumulated in one or more pools, or determined based on any other suitable method or criteria.

In one embodiment, a player accumulates at least one outcome enhancing unit for each play of a game. The gaming device enables the player to elect to enhance at least one outcome if the quantity of accumulated outcome enhancing units is at least a designated quantity.

In one embodiment, the gaming device includes a progress indicator, which indicates the status of an outcome enhancing condition. The gaming device may prompt the player to elect to enhance an outcome once the progress indicator has incremented to a designated level.

In one embodiment, if the player does not elect to enhance one or more outcomes, the gaming device delays or prevents advancement towards satisfying another outcome enhancing condition. Thus, the player has an incentive to use the outcome enhancing feature at the time when the gaming device enables the player to elect to enhance an outcome.

In another embodiment, the outcome enhancing feature is implemented in the embodiment described above where the game includes a competition or exchange between two or more competitors, combatants, icons, entities, opponents, or other symbols. In one such example of this embodiment, if the player does not elect to enhance an outcome and the player selected offensive play is trumped by the opponent selected defensive play, then the player receives a lose outcome. If the player selected offensive play trumps the opponent selected defensive play, then the player receives a win outcome.

In this embodiment, if the player elects to enhance one or more outcomes, the player receives the draw outcome instead of the lose outcome if the player selected offensive play is trumped by the opponent selected defensive play. The player receives the win outcome associated with a greater award than when the player selected offensive play trumps the opponent selected defensive play. Thus, the player's decision to elect to enhance one or more outcomes provides the player with an outcome and associated with a greater average expected payout than the player would have received if they had not elected to enhance an outcome and made the same choice selections.

It is therefore an advantage of the present disclosure to provide an outcome enhancing feature to a player during a competition game or attack and countermeasure game such that a favorable outcome is more obtainable.

Another advantage of the present disclosure is to provide a game that includes an element of strategy.

Another advantage of the present disclosure is to provide a game with increased player input.

Another advantage of the present disclosure is to provide an outcome enhancing feature in an attack and countermeasure game.

A further advantage of the present disclosure is to provide an outcome enhancing feature in a single or multiple player game.

Another advantage of the present disclosure is to provide an outcome enhancing feature in a game with perceived skill.

Another advantage of the present disclosure is to provide an outcome enhancing feature in a game that may be implemented in a tournament fashion.

A further advantage of the present disclosure is to provide an outcome enhancing feature in a game playable over multiple rounds.

Another advantage of the present disclosure is to provide an outcome enhancing feature in a bonus or secondary game that may be implemented with a plurality of different base games.

Another advantage of the present disclosure is to provide an outcome enhancing feature in a multiplayer race game which incorporates player input into a random outcome.

Another advantage of the present disclosure is to provide an outcome enhancing feature in a race game that is fun, entertaining and relatively simple to play.

Another advantage of the present disclosure is to provide an outcome enhancing feature in a multiplayer race game allowing for player input, but which forms outcomes independent of player experience.

Additional features and advantages of the embodiments described herein are described in, and will be apparent from, the following Detailed Description of the Invention and the figures.

BRIEF DESCRIPTION OF THE DRAWINGS

FIGS. 3A, 3B and 3C are schematic diagrams that illustrate a three choice attack and countermeasure embodiment, wherein each choice of the embodiment either trumps or is trumped by every other choice of the embodiment.

FIGS. 4A, 4B and 4C are a diagram and tables that illustrate a four choice attack and countermeasure embodiment, wherein each choice either trumps or is trumped by every other choice of the game.

FIGS. 7A, 7B, 7C and 7D are tables of outcome databases having different probability distributions, wherein the game employs the databases to generate an outcome and thereby determine a game choice.

FIG. 9 is a prize table including a win column, a consolation column and a percent column, which illustrates a random prize selection game.

FIGS. 18 and 19 illustrate a random draw type attack and countermeasure wagering game having a sporting event theme.

FIGS. 26A, 26B and 26C illustrate an alternative algorithm which bases its results on the time need to achieve a total distance for a particular racetrack.

FIG. 27 shows one embodiment of a paytable for a multiplayer base or bonus embodiment of the racing game having player configurable performance characteristics.

FIG. 28 shows one embodiment of a paytable for a single player base or bonus embodiment of the racing game having player configurable performances characteristics.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
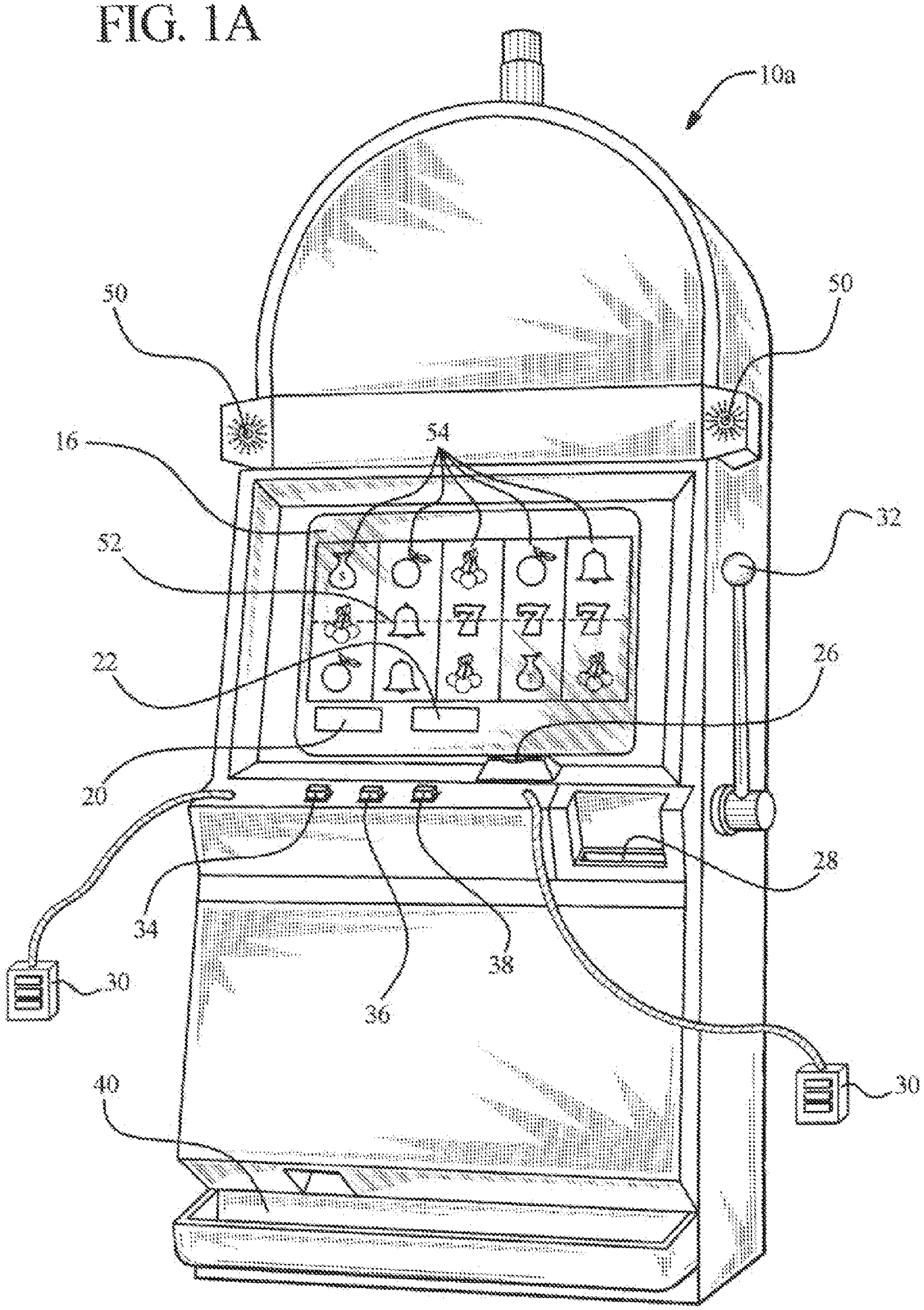
FIG. 1A is a front perspective view of one embodiment of the gaming device of the present disclosure.
Figure 1B:
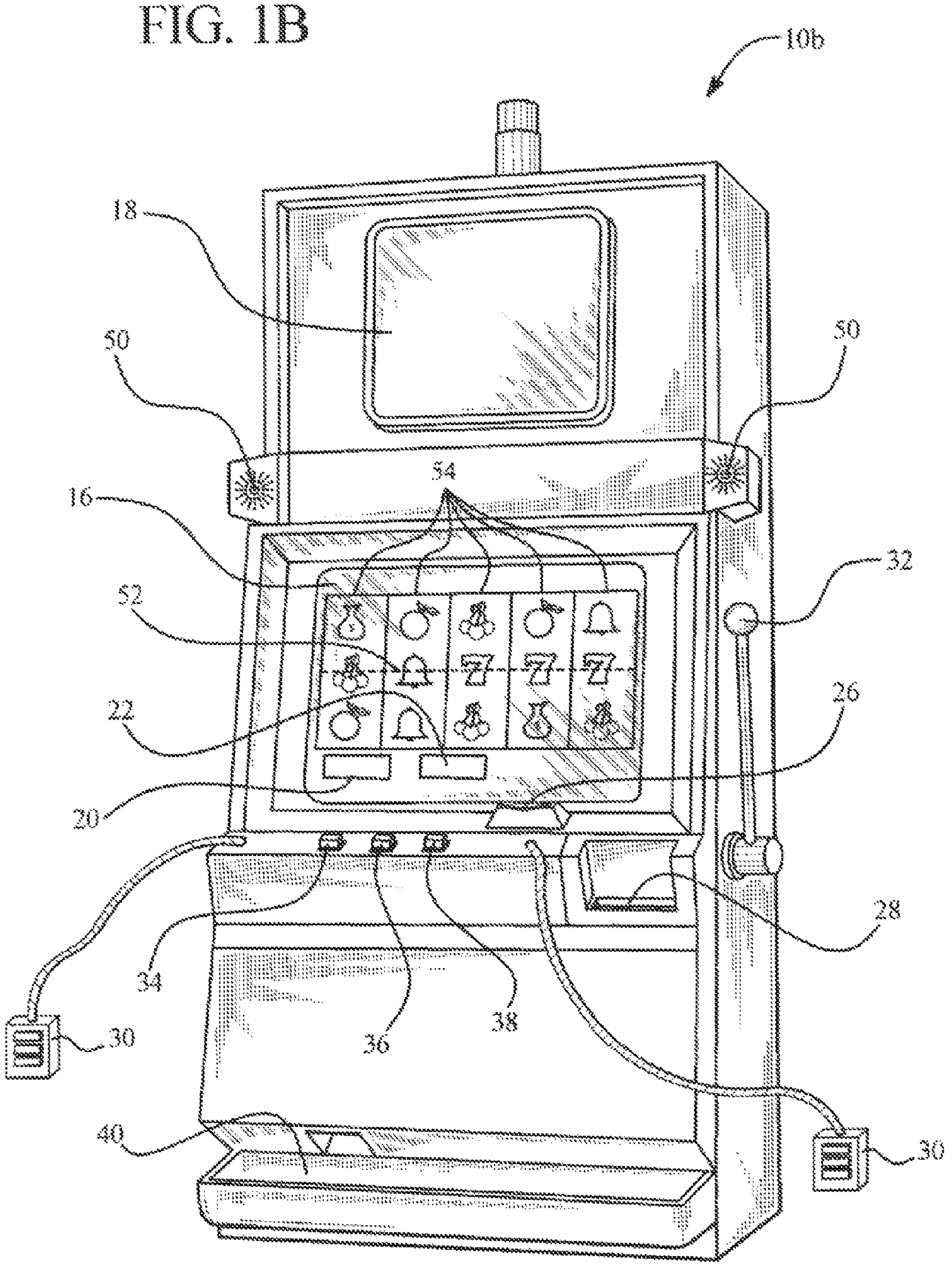
FIG. 1B is a front perspective view of another embodiment of the gaming device of the present disclosure.

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
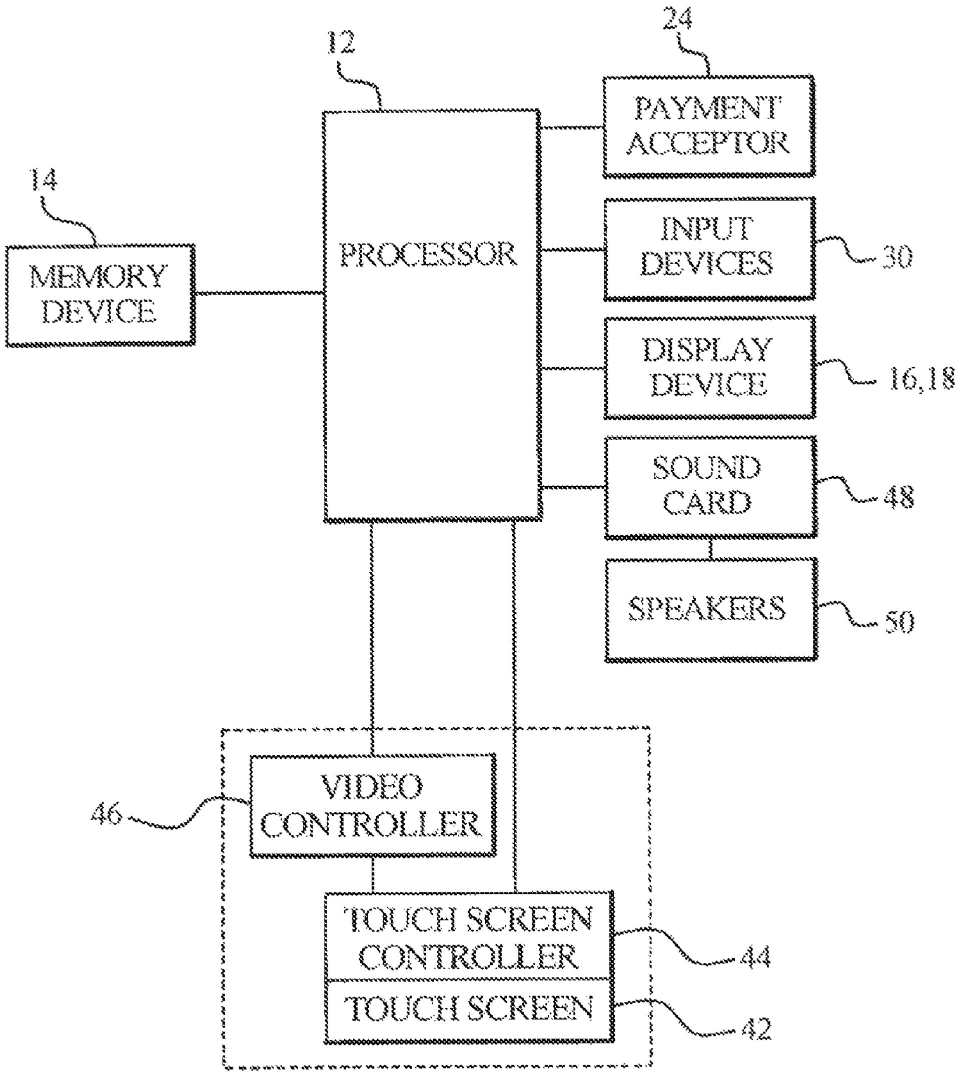
FIG. 2A is a schematic block diagram of one embodiment of an electronic configuration for one of the gaming devices of the present disclosure.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG.

1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (nor shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
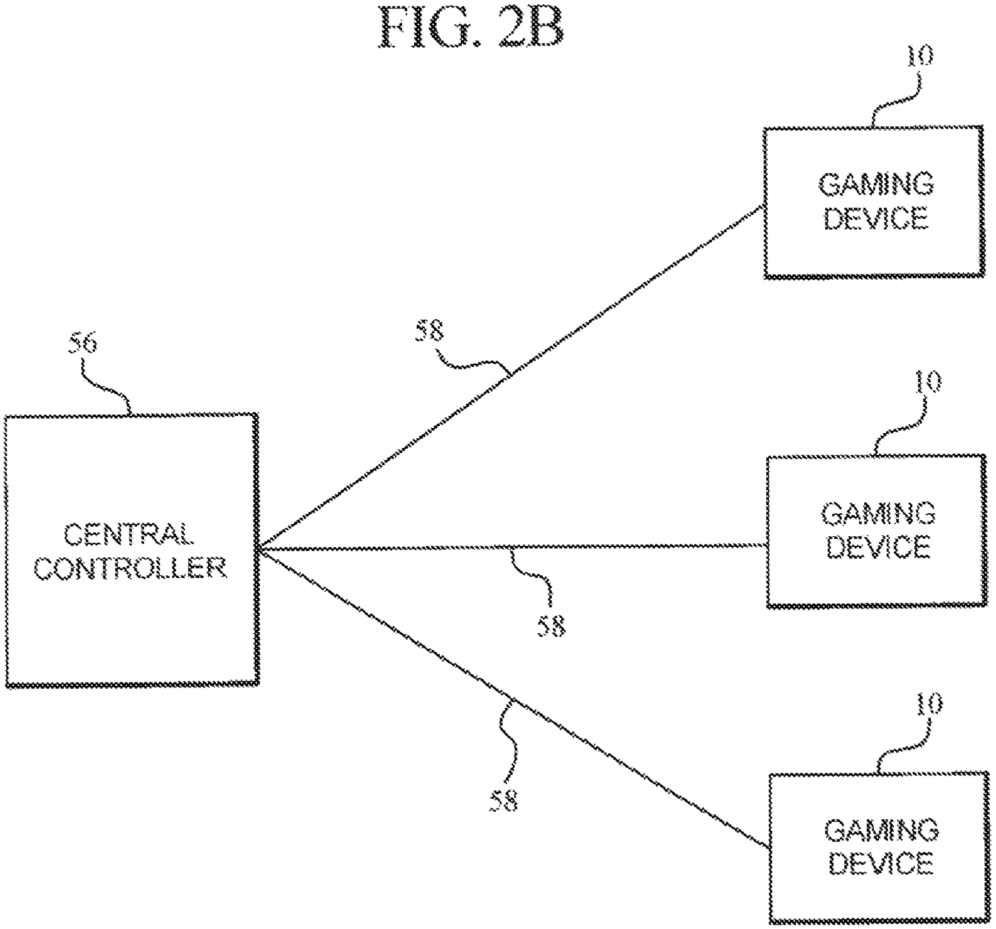
FIG. 2B is a schematic block diagram of one embodiment of a network configuration for a plurality of gaming devices of the present disclosure.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaining devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as parr of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Choice Structures, Choice Databases and Generation Databases

As discussed above and below, the gaming devices disclosed herein include various competition and/or attack and countermeasure games in which the outcome enhancing feature can be implemented. In one such embodiment, the gaming device enables a player to elect to enhance one or more outcomes if an outcome enhancing condition is satisfied. If the player elects to enhance one or more outcomes, the gaming device provides the player with an outcome more favorable than the outcome the player would have received if they had not elected to enhance an outcome. Referring now to FIGS. 3A, 33 and 3C, a three choice attack and countermeasure embodiment of a game is illustrated, in which each choice either trumps or is trumped by every other choice, wherein the outcome enhancing feature can be implemented in such game. That is, each choice has an offensive or attack component (trump) and a defensive or countermeasure component (try not be trumped). FIG. 3A illustrates a choice structure 100, which includes three choices "A," "B" and "C," and which the game displays to the player via one of the display devices 16, 18. The choices can be areas of a touch screen 50 (FIG. 2) or be associated with one or more electromechanical selectors. Arrows pointing from one choice to another indicate that: "A" trumps "B," "B" trumps "C" and "C" trumps "A." FIG. 33 illustrates a choice comparison table or database 102, which includes the comparisons or comparators of FIG. 3A. The memory device 14 (FIG. 2A) stores the choice comparison table or database 102, which the processor 12 can access at the appropriate moments.

It should be appreciated that in the choice structure 100, each choice either trumps or is trumped by every other choice. The choice structure 100 also maintains an equal percentage that any choice will either trump or be trumped. That is, there is a fifty percent chance that "A" trumps "B" and that "C" trumps "A" if the player or the game selects choice "A." To maintain an equally weighted game, as illustrated in FIG. 30, the game maintains a choice generation table or database 104 in the memory device 14, which includes equally weighted choices "A," "B" and "C." The game alternatively weights the choices such that the game randomly generates one choice more often than the other two. If a player learns that the game is more likely to choose "A" and knows that "C" trumps "A," the player will likely always choose "C" and master the game.

Referring now to FIGS. 4A, 43 and 4C, a four choice attack and countermeasure embodiment of a game is illustrated in which each choice either trumps or is trumped by every other choice, wherein the outcome enhancing feature can be implemented in such game. Here again, each choice has an offensive or attack component (trump) and a defensive or countermeasure component (try not to be trumped). FIG. 4A illustrates a choice structure 106, which includes four choices "A," "B," "C" and "D," and which the game displays to the player via one of the display devices 16, 18. The choices can be areas of a touch screen 50 (FIG. 2) or be associated with one or more electromechanical selectors. Arrows pointing from one choice to another indicate that: "A" trumps "B," "A" trumps "D," "B" trumps "C," "C" trumps "A," "D" trumps "B" and "D" trumps "C." FIG. 4B illustrates a choice comparison table or database 108, which includes the comparisons or comparators of FIG. 4A. The memory device 14 (FIG. 2A) stores the choice comparison database 108, which the processor 38 can access at the appropriate moments.

It should be appreciated that in the choice structure 106, each choice either trumps or is trumped by every other choice. The choice structure 106 thereby maintains an unequal percentage that any choice will either trump or be trumped. That is, there is a 66.7 percent chance that "A" trumps "B" or that "A" trumps "D" and only a 33.3 percent chance that "C" trumps "A" if the player or the game selects choice "A." Likewise, there is a 66.7 percent chance that "A" trumps "B" or that "D" trumps "B" and only a 33.3 percent chance that "B" trumps "C" if the player or the game selects choice "B." It should be appreciated from FIGS. 4A and 4B that "A" and "D" are better choices than "B" or "C."

As illustrated in FIG. 40, since the player can know the choice structure 106, the game maintains a choice generation table or database 110 in the memory device 14, which includes unequally weighted choices "A," "B," "C" and "D." In this table, the game randomly generates "A," "C" and "D" ninety percent of the time and "B" ten percent of the time, as illustrated, to counteract the choice structure 106. The embodiment of FIGS. 4A though 4C creates a complicated dynamic between the game and a player who learns of the unequally weighted choice generation database 110. Knowing that the game is more likely to choose "A," "C" or "D" and the choice structure 106, the player can then pick in an attempt to try to defeat those choices.

Figures 5A, 5B, 5C:
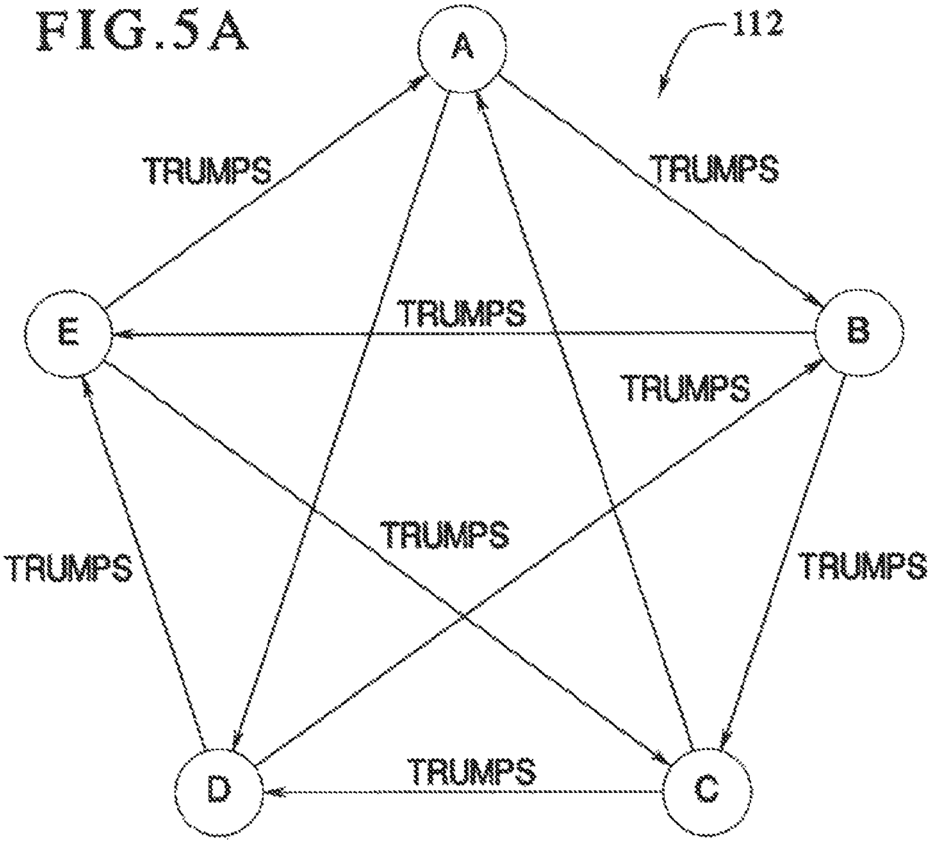
FIGS. 5A, 5B are 5C are a diagram and tables that illustrate a five choice attack and countermeasure embodiment, wherein each choice of the embodiment either trumps or is trumped by every other choice of the embodiment.

Referring now to FIGS. 5A, 5B and 5C, a five choice attack and countermeasure embodiment of a game is illustrated in which each choice either trumps or is trumped by another choice, wherein the outcome enhancing feature can be implemented in such game. Still again, each choice has an offensive or attack component (trump) and a defensive or countermeasure component (try not to be trumped). FIG. 5A illustrates a choice structure 112, which includes five choices "A," "B," "C," "D" and "E," and which the game displays to the player via one of the display devices 16, 18. The choices can be areas of a touch screen 50 (FIG. 2) or be associated with one or more electromechanical selectors. Arrows pointing from one choice to another indicate that: "A" trumps "B," "A" trumps "D," "B" trumps "C," "B" trumps "E," "C" trumps "A," "C" trumps "D," "D" trumps "B," "D" trumps "E," "E" trumps "C" and "E" trumps "A." FIG. 5B illustrates a choice comparison table or database 114, which includes the comparisons or comparators of FIG. 5A. The memory device 14 (FIG. 2A) stores the choice comparison database 114, which the processor 38 can access at the appropriate moment.

It should be appreciated that in the choice structure 112, each choice either trumps or is trumped by every other choice. The choice structure 112 also maintains an equal percentage that any choice will either trump or be trumped. That is, there is a fifty percent chance that "A" trumps "B" or that "A" trumps "D." There is also a fifty percent chance that "C" trumps "A" or that "E" trumps "A" if the player or the game selects choice "A." To maintain an equally weighted game, as illustrated in FIG. 50, the game maintains a choice generation table or database 116 in the memory device 14, which includes equally weighted choices "A" through "E," i.e., there is a 20% chance that the game generates each.

The choice structure 112 illustrates that the present invention includes providing any number of choices. Odd number embodiments, such as the choice structures 100 and 112, have an even number of combatant choices, which facilitates a choice structure having choices with equal chances of winning or losing. Even numbered embodiments, such as the choice structure 106, have an odd number of combatant choices and unequal winning percentages, unless as described below, some choice pairs do not have an associated comparator.

Figures 6A, 6B, 6C:
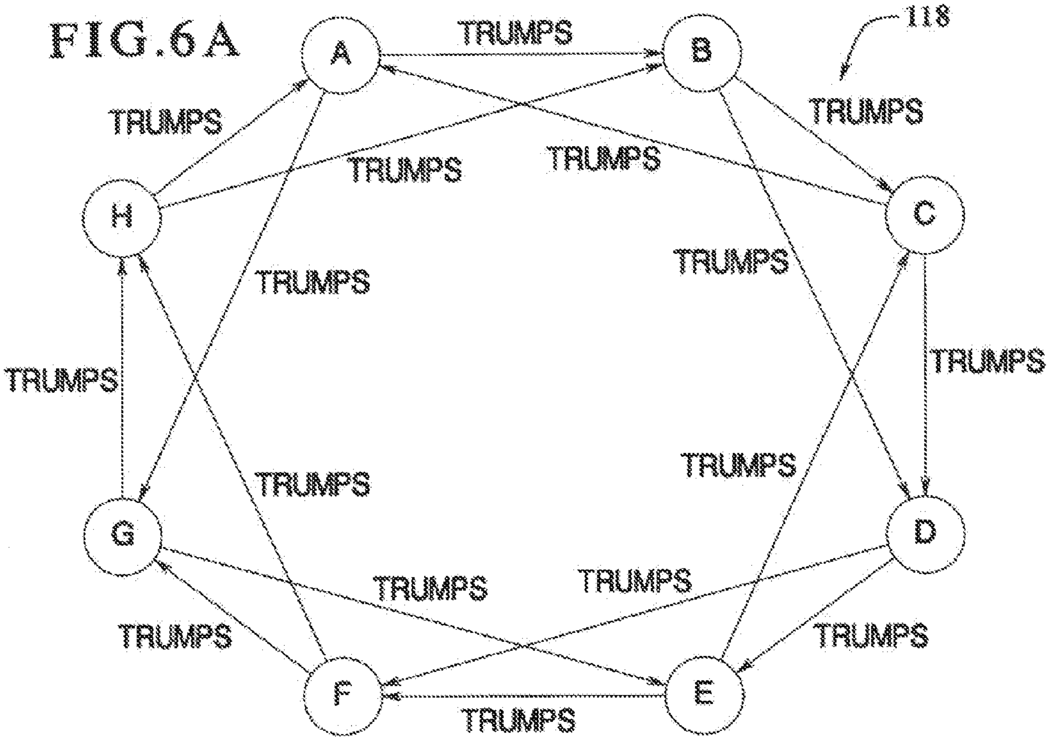
FIGS. 6A, 6B and 6C are a diagram and tables that illustrate an eight choice attack and countermeasure embodiment, wherein each choice of the embodiment does not either trump or become trumped by every other choice of the embodiment.

Referring now to FIGS. 6A, 63 and 6C, an eight choice attack and countermeasure embodiment of a game is illustrated in which each choice either trumps, ties or is trumped by another but not every other choice, wherein the outcome enhancing feature can be implemented in such game. Here, while each choice has an offensive and defensive component, certain choices are neutral with respect other choices, leading to draw or tie outcomes. Tie outcomes from neutral choices are in addition to the outcomes resulting from two of the same choices. FIG. 6A illustrates a choice structure 118, which includes eight choices "A" through "H," and which the game displays to the player via one of the display devices 16, 18. The choices can be areas of a touch screen 50 (FIG. 2) or be associated with one or more electromechanical selectors. Arrows pointing from one choice to another indicate that: "A" trumps "B," "A" trumps "G," "B" trumps "C," "B" trumps "D," "C" trumps "A," "C" trumps "D," "D" trumps "E," "D" trumps "F," "E" trumps "C," "E" trumps "F," "F" trumps "G," "F" trumps "H," "G" trumps "E," "G" trumps "H," "H" trumps "A" and "H" trumps "B." FIG. 63 illustrates a choice comparison database 120, which includes the comparisons or comparators of FIG. 6A. The memory device 14 (FIG. 2A) stores the choice comparison table or database 120, which the processor 38 accesses at the appropriate moment.

It should be appreciated that in the choice structure 118, each choice does not either trump or become trumped by every other choice. For example, there is no comparator, i.e., no winner or loser for the choices "A" and "D," "A" and "E," and "A" and "F." The present disclosure contemplates ties or draws, such that the game's random generation of the choice "A" and the player's selection of the choice "D" generates a draw and a try-again. The draw or try-again also results from selections of the same choices. Alternatively, selections of the same choices can result in a different outcome, such as an increase in potential payout.

Even though the choice structure 118 includes an even number of choices such as eight, the structure 118 maintains an equal percentage of any choice winning or losing. The game enables the equal percentage by not providing a comparator for all choice combinations and by providing an even number of choice combinations for each choice. As illustrated by the choice structure 118 and the comparison database 120, each choice trumps two other choices and is trumped by two other choices. The game maintains a choice generation table or database 122 in the memory device 14, which is equally weighted, i.e., there is 12.5% that the game generates each choice "A" through "H."

Referring now to FIGS. 7A, 7B, 7C and 7D, outcome databases having different probability distributions are illustrated in which a game employs the databases to generate an outcome and thereby determine a game choice, wherein the outcome enhancing feature can be implemented in such game. In embodiments employing one of the outcome databases, the game generates an outcome, accepts the player's input of a choice and uses the appropriate comparator to determine the game's choice.

In FIG. 7A, the game maintains an outcome database 124, which includes an equal 33.3% chance that the player wins, loses or ties. In FIG. 73, the game maintains an outcome database 126 whereby the player is as likely to tie as to win or lose. In FIG. 7C, the game maintains an outcome database 128 whereby the player is more likely to win than to tie and more likely to win than to lose. In FIG. 70, the game maintains an outcome database 130 whereby the player is equally likely to win or lose, but more likely to win than to tie and more likely to lose than to tie. It should be appreciated from the foregoing examples, that the gaming device implementor can structure the outcome databases to produce any desired outcome probability distribution.

Method of Operation

Figure 8:
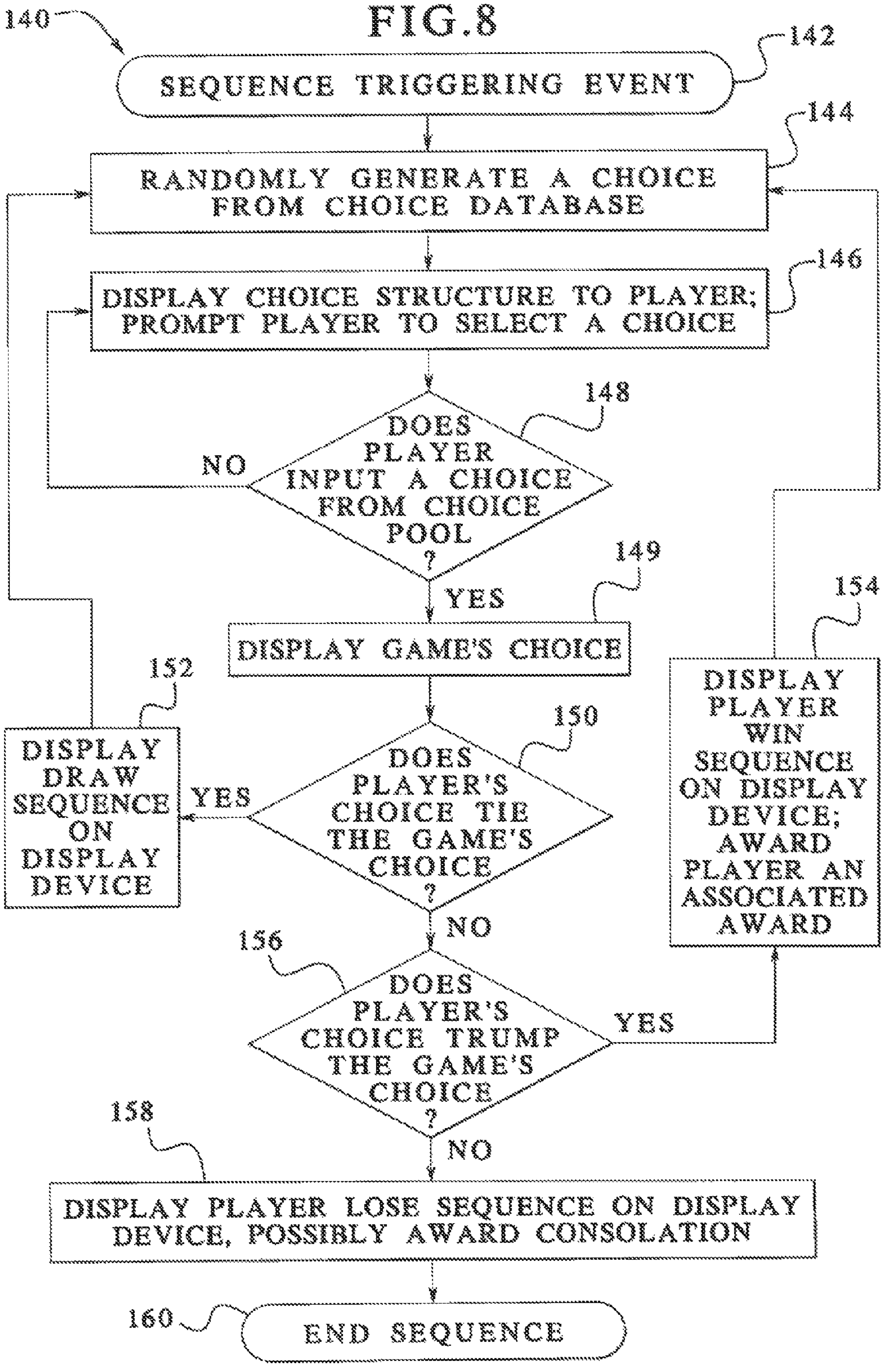
FIG. 8 is a flow diagram in which the game randomly generates a choice and thereby determines an outcome.

Referring now to FIG. 8, one method 140 is illustrated, wherein the game randomly generates a choice and thereby determines an outcome, and wherein the outcome enhancing feature can be implemented in such game. Upon a sequence triggering event, as indicated by the oval 142, the game generates a choice from an equally or unequally weighted choice database, as indicated by the block 144. The game displays a choice structure to the player and prompts the player to select a choice, as indicated by the block 146. The game awaits the player's decision, as indicated by the diamond 148.

If the player does not input a decision, the game continues to display the choice structure and prompt the player, as indicated by the block 146. If the player inputs a decision, the game displays its choice, as indicated by the block 149, and thus determines whether player's choice ties the game's choice, as indicated by the diamond 150.

Referring to the choice structures 100, 106 and 112 of FIGS. 3A, 4A and 5A, respectively, a tie occurs when the game randomly generates the same choice that the player selects. If both the game and the player choose "B," the game determines a tie or draw. Referring to the choice structure 118 of FIG. 6A, a tie occurs when the game randomly generates the same choice that the player selects and when the game and player generate choices having no comparator. In the structure 118, for example, neither the choices "B" or "F" trumps the other, so a tie occurs.

If a tie occurs, as indicated by a positive response to the diamond 150, the game displays a draw or tie sequence on one of the display devices 16, 18, as indicated by the block 152, and the game resets the sequence by randomly generating a new choice, as indicated by the block 144. In an alternative embodiment, the game additionally awards the player an associated award upon a tie. The tie award in the illustrated embodiment is less than an award associated with a player win result. A draw or tie sequence can be any display indicating a neutral outcome. The draw or tie outcome is effectively a gaming device nullity, wherein the player and game start over as if the previous choice selections have not occurred. If a tie does not occur, as indicated by a negative response to the query of the diamond 150, the game determines whether player's choice trumps the game's choice, as indicated by the diamond 156.

Referring to the comparison databases 102, 108 and 114 of FIGS. 33, 4B and 5B, respectively, the game applies the appropriate comparator from an appropriate database to the game's generated choice and the player's inputted choice. If in an embodiment such as the choice structure 118 of FIG. 6A, there is no appropriate comparator in the appropriate database for the game's generated choice and the player's inputted choice, the game determines that a tie has occurred, as indicated above by a positive response to the query of diamond 148.

If the player's choice trumps the game's choice, the game displays a player win sequence on one of the display devices 16, 18 and awards the player an associated award, as indicated by the block 154. A player win sequence can be any display indicating a positive player outcome. The win outcome improves the player's status quo. That is, in a bonus round, the only loss the player experiences is a theoretical loss or a loss of potential awards. With a win outcome, then, the player's award total starts at zero or some point of status quo and adds thereto. The game resets the sequence by randomly generating a new choice, as indicated by the block 144.

If the player's choice does not trump the game's choice, as indicated by a negative response to the diamond 156, the game: (i) displays a player lose sequence on one of the display devices 16, 18; (ii) alternatively awards a consolation award, as indicated by the block 158; and (iii) ends the sequence, as indicated by the oval 160. A suitable player lose sequence is any that indicates a negative player outcome. As mentioned above, the bonus game only adds to the player's awards. The player's loss includes the loss of continued play or potential awards. That is, the player does not risk and thereby lose previously achieved awards.

It should be appreciated that the player continues play, i.e., winning and accumulating awards or tying and trying again, until the game's choice trumps the player's choice. The player keeps any accumulated award achieved before the game's choice trumps the player's choice.

Award Types and Award Structures

The win awards, tie awards and consolation awards can be game credits although other awards are contemplated. For example, the win awards and consolation awards can be game credit multipliers that multiply: (i) a win along one or more paylines; (ii) a total bet; (iii) a prior bonus round win; or (iv) any other suitable game credit amount. The associated awards can be a number representing any type of value, such as a number of selections from a prize pool.

In one award selection embodiment, the win awards and consolation awards are associated with the comparators. That is, the comparison databases 102, 108 and 114 of FIGS. 3B, 4B and 5B, respectively, include having a separate column or columns (not illustrated) that associate a win award and/or a consolation award with each comparator. Associating a consolation award with each comparator guarantees the player of at least a consolation prize, i.e., if the game's choice trumps the player's choice on the initial try, the player receives the consolation award associated with the applied comparator.

Referring now to FIG. 9, another random award selection embodiment includes a prize pool or database 162 having a win column 164, a consolation column 166 and a percent column 168. In this embodiment, when the player's choice trumps the game's choice, the game randomly selects one of the prizes from the win column 164. The game weights the random generation using the percent values provided in the percent column 168, such that the game is more likely to generate a "3" award than a "40" award.

When the game's choice trumps the player's choice, the game in one embodiment randomly selects one of the consolation prizes from the consolation column 166. The consolation prizes are typically less and have less variation than do the win prizes. The game also weights the consolation award generation. The present invention also contemplates including "0" consolation awards, such that the player sometimes receives a consolation award and other times receives nothing.

In a further award selection embodiment, the game always provides the same award and/or consolation award when the player wins and/or loses, respectively. This embodiment does not require a separate private pool or database, such as the one disclosed in connection with FIG. 9. In this embodiment, the game evenly accumulates, e.g., 3×, 6×, 9×, etc., each time the player wins.

Alternative Method of Operation

Figure 10:
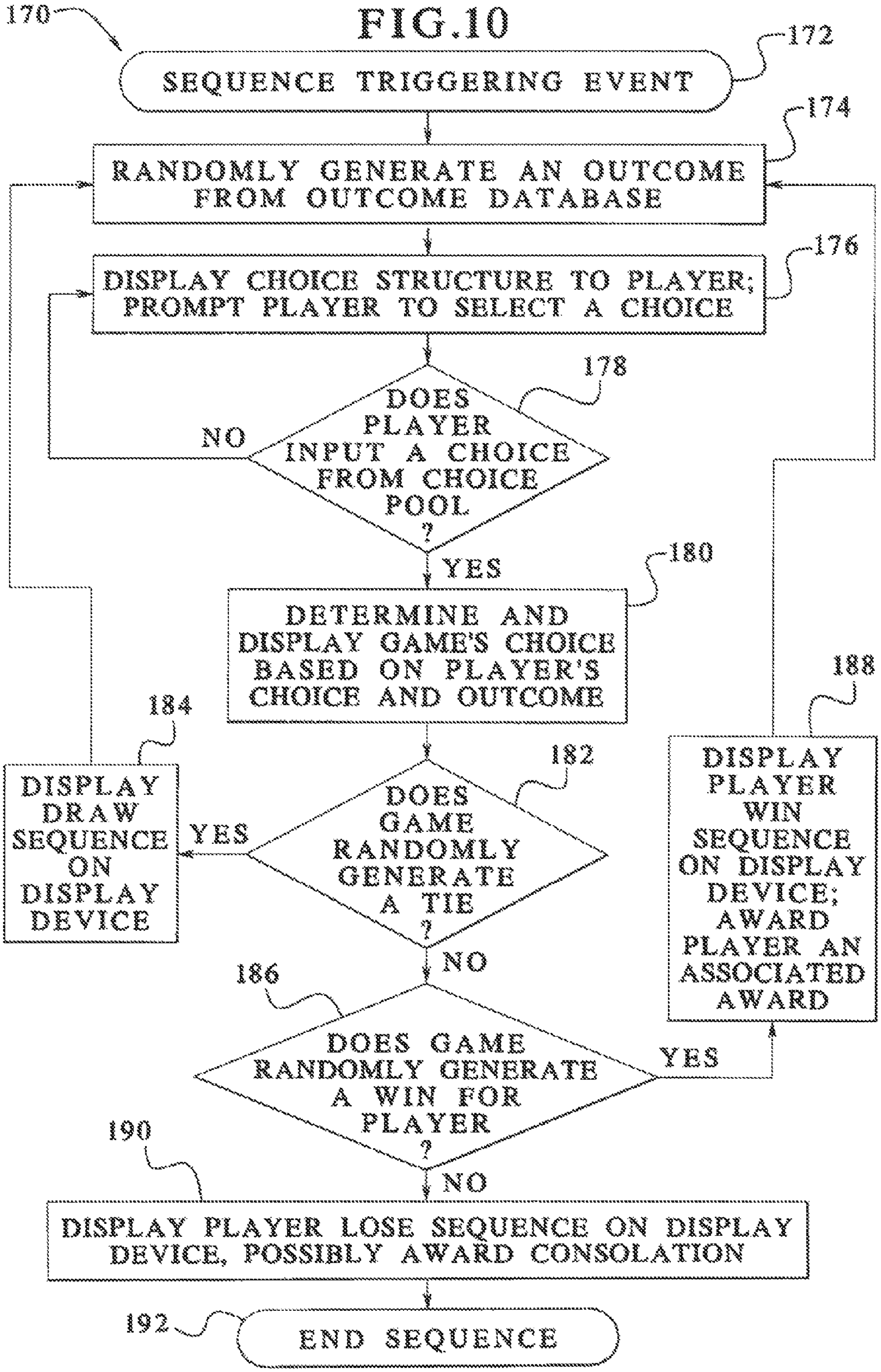
FIG. 10 is a flow diagram of an alternative embodiment, wherein the game randomly generates an outcome and thereby determines its choice.

Referring now to FIG. 10, an alternative embodiment 170 is illustrated, wherein the game which includes an outcome enhancing feature, randomly generates an outcome and thereby determines a choice. Upon a sequence triggering event, as indicated by the oval 172, the game generates a win, lose or draw outcome from an equally or unequally weighted outcome database, such as one of FIGS. 7A through 7D, as indicated by the block 174. The game displays a choice structure to the player and prompts the player to select a choice, as indicated by the block 176. The game awaits the player's decision, as indicated by the diamond 178.

If the player does not input a decision, the game continues to display the choice structure and prompt the player, as indicated by the block 176. If the player inputs a decision, the game determines and displays its choice based on the player's choice and the randomly generated outcome, as indicated by the block 180.

Referring to the comparison databases 102, 108 and 114 of FIGS. 3B, 4B and 5B, respectively, to determine its choice, the game proceeds backwards from the generated outcome, applying the appropriate comparator from an appropriate database and using the player's inputted choice. In certain instances, the game chooses between two possibilities. For instance, if the game randomly generates a player win from an outcome database, and the player inputs a choice "A" provided by the choice structure 106 of FIG. 4A, the game can choose the choice "B" or "D," which are both trumped by the choice "A."

If the game randomly generates a tie in an embodiment such as the choice structures 100, 106 and 112, of FIGS. 3A, 4A and 5A, respectively, wherein each choice trumps or is trumped by each other choice, the game only has one choice. For instance, if the game randomly generates a tie or draw from an outcome database, and the player inputs a choice "B" provided by the choice structure 100 of FIG. 3A, the game can only choose the choice "B," which is the only choice that can tie the player's choice.

If the game randomly generates a tie in an embodiment such as the choice structure 118 of FIG. 6A, wherein each choice does not trump or become trumped by every other choice, the game has a plurality of choices. For instance, if the game randomly generates a tie or draw from an outcome database, and the player inputs a choice "F" provided by the choice structure 118 of FIG. 6A, the game can choose the choice "F" or any choice that does not have a comparator in combination with "F," namely choices "A," "B" or "C."

If the game generates a tie, as indicated by a positive response to the query of the diamond 182, the game displays a draw or tie sequence on one of the display devices 16, 18, as indicated by the block 184, and the game resets the sequence by randomly generating a new choice, as indicated by the block 174. In an alternative embodiment, the game additionally awards the player an associated award upon a tie. The tie award in the illustrated embodiment is less than an award associated with a player win result. A draw or tie sequence can be any display indicating a neutral outcome. As described in connection with FIG. 8, a tie or draw outcome thereby preserves the player's status quo. If the game did not generate a tie, as indicated by a negative response to the query of the diamond 182, the game determines whether the game generated a win for the player, as indicated by the diamond 186.

If the game generated a win for the player, as indicated by a positive response to the query of the diamond 186, the game displays a player win sequence on one of the display devices 16, 18 and awards the player an associated award, as indicated by the block 188. A player win sequence can be any display indicating a positive player outcome. As described above in connection with FIG. 8, a win outcome improves the player's status quo.

The game awards the player in the manner and type described above in connection with the embodiment of FIG. 8. The game resets the sequence by randomly generating a new choice, as indicated by the block 174.

If the game did not generate a win for the player, as indicated by a negative response to the query of the diamond 186, the game: (i) displays a player lose sequence on one of the display devices 16, 18; (H) alternatively awards a consolation award, as indicated by the block 190; and (iii) ends the sequence, as indicated by the oval 192. A suitable player lose sequence is any that indicates a negative player outcome. The lose outcome deprives the player of further award generation opportunity. That is, the player continues play, i.e., winning and accumulating awards or tying and trying again, until the game randomly generates a loss for the player. The player keeps any accumulated award achieved before the game generates a loss.

Example Embodiment

Referring now to FIGS. 11A through 11D, one of the display devices 16, 18 displays a well known rock, paper, scissors game which is an example of a three choice embodiment, wherein the outcome enhancing feature can be implemented in such game. Rock, paper, scissors employs the choice structure 100 of FIG. 3A, wherein rock smashes or trumps scissors, scissors cuts or trumps paper and paper covers or trumps rock. In rock, paper, scissors, each choice either trumps or is trumped by every other choice. There is a fifty percent chance that the player selects a choice that trumps the game's choice. In this example embodiment, the game is equally likely to choose rock, paper or scissors.

Figure 11A:
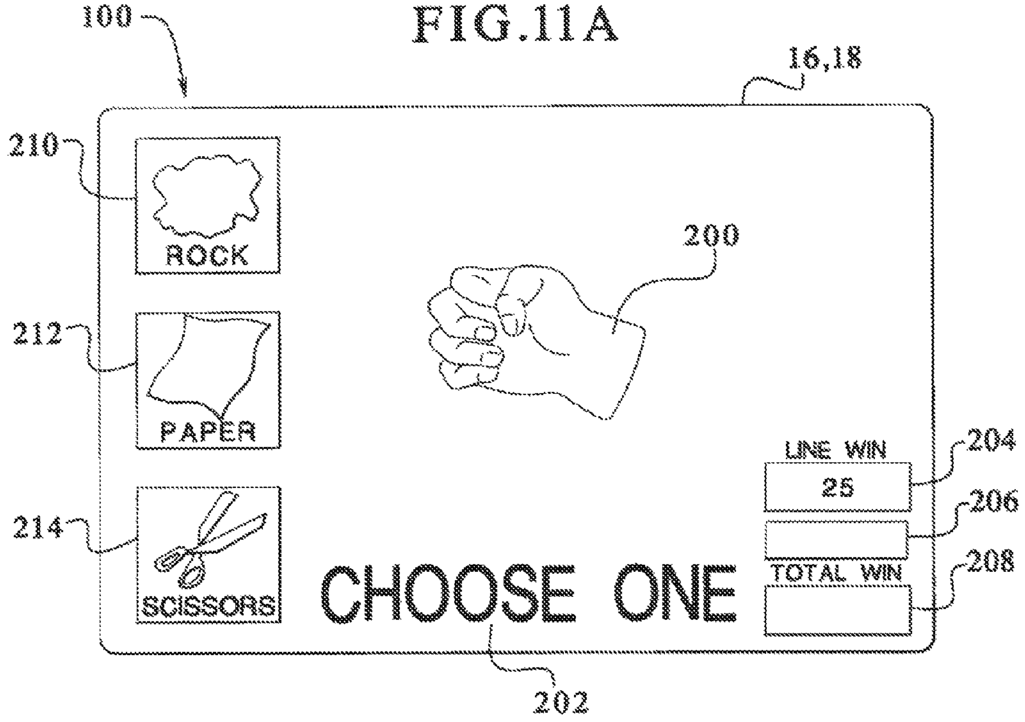
FIGS. 11A, 11B, 11C and 11D are front elevational views of one of the display devices of FIGS. 1A and 13, which illustrate one example display embodiment, wherein the choices are a rock, paper and scissors.

In an entertaining and exciting audiovisual display, the game represents its selection of a choice via an indicator 200. FIG. 11A illustrates the game prompting the player to select a choice of rock, paper or scissors via the visual or audiovisual message 202. If the player wins, the game multiplies the player's win along a payline 56 (FIGS. 1A and 1B), indicated in a line win display 204 as twenty-five credits, by an accumulating multiplier indicated in a multiplier display 206 to form a total win indicated in a total win display 208. The player selects from the choice structure 100 by selecting the rock selector 210, the paper selector 212 or the scissors selector 214.

Figure 11B:
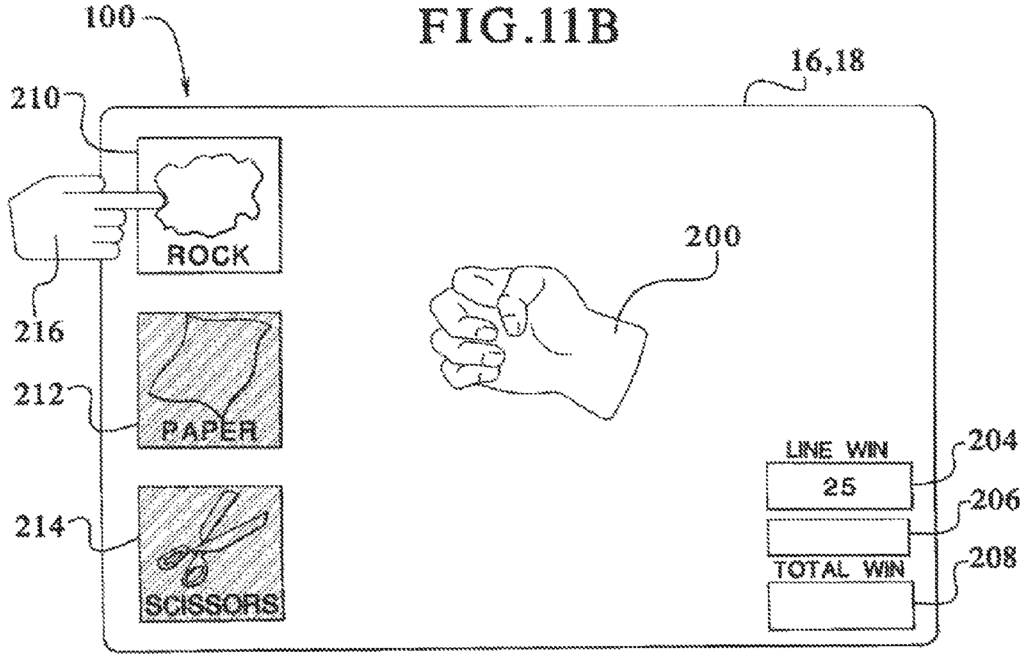
Figure 11C:
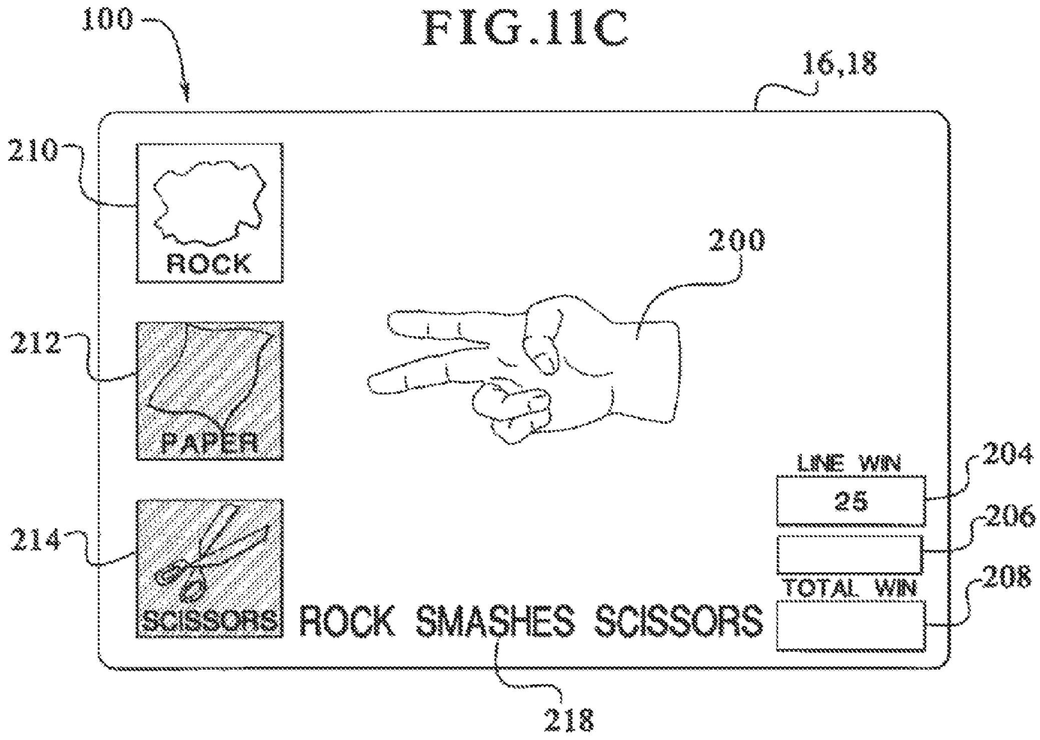

FIG. 11B illustrates that the player 216 selects the rock selector 210. The present invention also requires a selection by the game of a rock, paper, scissors choice before the game is enabled to make a comparison or employ a comparator. FIG. 11B therefore does not yet illustrate a player win or loss. FIG. 11C illustrates that the indicator 200, representing the game's choice, selects the scissors choice. It should be appreciated that in rock, paper, scissors, players shake their hands a plurality of times before picking a closed fist that is a rock choice, a flat, open horizontal hand that is a paper choice and two extended fingers that is a scissors choice. In FIG. 11C, then, the game selects the scissors choice by displaying the indicator 200 with two extended fingers.

Figure 11D:
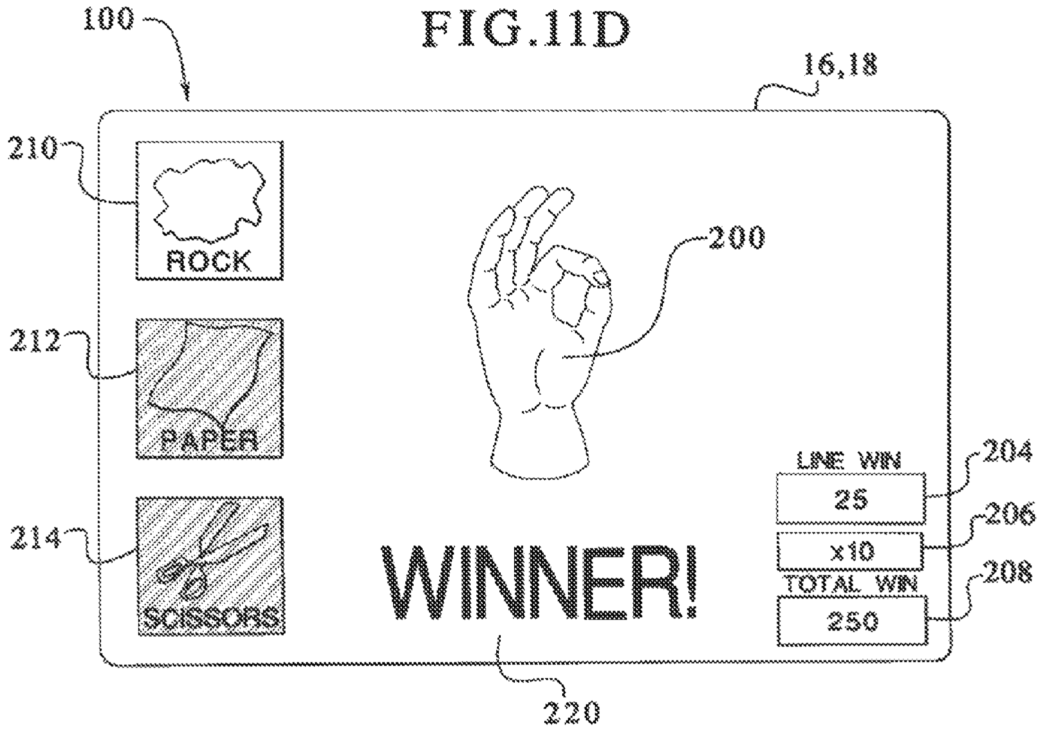

FIG. 11C also displays the appropriate comparison or comparator 218 between a rock choice and a scissors choice. That is, "rock smashes or trumps scissors." The player therefore wins this particular game of rock, paper, scissors. FIG. 11D displays a suitable visual or audiovisual indicator 220 that the player has won. FIG. 11D further illustrates that the game rewards the player by multiplying the player's payline 56 win (e.g., the win along the payline having the symbol or symbol combination triggering the bonus) of twenty-five credits shown in the line win display 204 by the multiplier of ten shown in the multiplier display 206 to form a total win of 250 credits shown in the total win display 208.

It should be appreciated that the display embodiment of FIGS. 11A through 11D includes both the methods disclosed in connection with FIGS. 8 and 10. That is, respectively, the game includes randomly selecting the scissors choice and thereby applying the appropriate compactor to generate a win or lose outcome for the player. The game alternatively includes randomly generating a win or lose outcome for the player and thereby applying the appropriate comparator to select a choice, i.e., the scissors, which is trumped by the player's choice of a rock.

Figure 12:
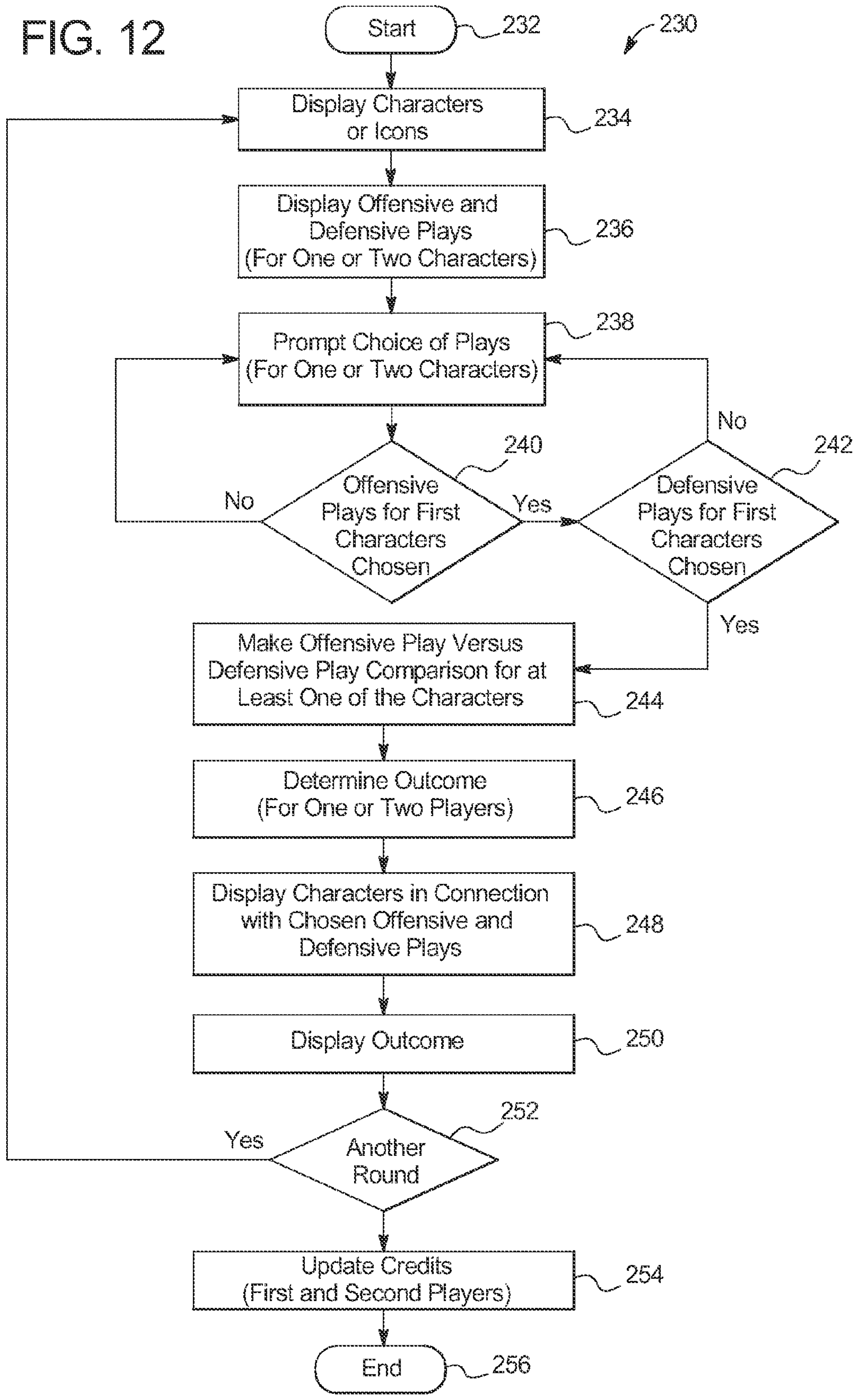
FIG. 12 is a flow diagram showing one example of an attack and countermeasure wagering game playable on a gaming device.

Referring now to FIG. 12, one method for the attack and countermeasure base or bonus game is illustrated by sequence 230, wherein the outcome enhancing feature can be implemented in such game, which begins as seen in connection with oval 232. In a base game embodiment, sequence 230 is started upon the placement of at least a minimum required wager. In the present game, a single player can play against the machine or two or more players can play against each other. When the single player plays against the machine, the machine in one embodiment requires a single credit to be wagered. The credit can represent any suitable denomination of money.

In a single player version, sequence 230 is a wagering game having a particular payback percentage for the player. For example, if the gaming device is set so that the player beats the machine forty-five percent of the time on average and pays are made per credit wagered, then the average payback percentage is 90%. Gaming device 10 can be set to increase the payback percentage if the player wagers more credits per game to account for larger wagers.

The gaming device can also be set to pay back different amounts depending upon a variable outcome. For example, as shown below in connection with Table 1, the awards can depend on the player's points accumulated over a number of rounds of sequence 230 or a differences between the player's points accrued versus the total points that the player's opponent accrues. For example, Table 1 shows one example paytable for differences between the player's total and the opponent's total.

The player wins at least one of the payouts forty-eight percent of the time, wherein (a) twenty-two percent of the time the player beats the opponent by one point; (b) twelve percent of the time the player beats the opponent by two points, and so on. The payouts increase as the likelihoods decrease. The paytable assumes that the player wins no credits for tying or losing to the opponent.

TABLE 1

Example Paytable For Single Plays Base Attack and Countermeasure Game

| Total Point Difference | Likelihood of Occurring | Payout Per Coin Wagered | Partial Payback |
|---|---|---|---|
| 1 | .22 | 1 | .22 |
| 2 | .12 | 2 | .24 |
| 3 | .08 | 3 | .24 |
| 4 | .04 | 4 | .16 |
| 5 | .02 | 6 | .12 |
| | .48 total likelihood of occurring | | .98 total payback |

It should be appreciated that the above table is merely an example. The game of sequence 230 could have more or less than five outcomes. The likelihoods, payouts and partial paybacks can also vary from those shown above. Further, the paytable could be structured such that the player loses credits upon losing to the opponent but wins more credits for beating the opponent. Further, games that end in a draw outcome can result in a push, for example, in which the next game requires another wager and plays with the same paytable but adds the previous wager to the current wager, increasing the stakes of the next game. Alternatively, the next game could be played with a different paytable, e.g., one that is more favorable to the player or more volatile.

The paytable for a two player version of sequence 230 presents an additional challenge due to the financial interplay between the players and between the players and the house. In a bonus game embodiment, the starting step 232 of sequence 230 occurs upon a bonus game triggering event as has been described herein. Here, sequence 230 is operated as a bonus sequence and the player's win is made part of an overall paytable for the gaming device having a base game and a bonus attack and countermeasure game. The base game can be any of the ones listed above. The triggering event can be a base game outcome or other event, such as the outcome of a separate random generation.

In step 234, gaming device 10 displays characters or icons that represent the players (in a two player game) or the player and an opponent (in a one-player game). As shown below in the examples, the gaming device in one embodiment displays a plurality of characters or icons and enables the player(s) to choose which character to use, e.g., which fighter to enter combat with. The choice of a fighter can for example be via touch-screen overlay 50 operable with video monitor 16, 18 and touch screen controller 52.

In step 236, gaming device 10 displays the offensive and defensive plays or choices available to each player. Different types of play or choice schemes are shown and described herein. In a rock, paper, scissors configuration, for example, the player makes a single choice, which includes both an offensive or defensive component in each choice, and which sets the player's offensive or attack play and defensive or countermeasure play. In matching type schemes, the player individually chooses separate attack and countermeasure plays. In an alternative embodiment, certain offensive and defensive plays can be linked. Multiple examples of such plays are provided below.

In step 238, gaming device 10 prompts the player to choose an offensive (attack) and defensive (countermeasure) play. The prompt can be any suitable visual message, audio instruction or combination message and instruction. Gaming device 10 determines whether each of the offensive and defensive plays have been chosen for each player (two players or player versus machine) as seen in connection with diamonds 240 and 242, respectively.

In step 244, gaming device 10 makes a comparison of the offensive and defensive plays of the player versus defensive and offensive plays for the other player or the machine and vice versa. It is possible that only a single comparison is made for a single player game, e.g., the player's offensive move versus the opponent's defensive move. The player is paid based on the single result. Even in a single player game, however, it is contemplated to keep two scores, one for the player and one for the machine's character. In this manner, even a single player game feels like a true competition. As shown in more detail below, gaming device 10 can provide outcomes based on a total score, a difference between scores, a first score to reach a preset number, etc. The comparison lends itself to keeping two scores since the comparison naturally renders two outcomes. For example, a comparison between two fighters who each make an offensive and evasive move relative to each other results in a hit/no hit and block/no block result for each player. A score for each player can therefore be made from the same comparison.

Based on the above discussion, and as seen in connection with step 246, gaming device 10 determines outcomes from the comparison for one or two characters. The outcome can vary as shown below. For example, the fight game can have multiple rounds, each round resulting potentially in one or more point for the play. The number of rounds can be preset, wherein the character with the higher total at the end wins. Alternatively, the number of rounds can be determined by whomever first reaches a preset number of wins or points. Alternatively, the outcomes can be one or more credits awarded directly after each fight to one or both of the characters.

The characters are also shown acting out or portraying the chosen offensive and defensive play, as seen in connection step 248. For example, the combat game shows the chosen characters fighting. The outcomes of the comparisons are also displayed as seen in connection with step 250. In an embodiment, display device 16 and/or 18 displays the plays or outcomes. Alternatively or additionally, e.g., in connection with a larger, multiplayer tournament type game, one or more large, e.g., overhead, display is used to show the acting out of the plays and/or the resulting outcome(s).

After the outcomes are displayed in step 250, gaming device 10 determines whether another round exists as seen in connection with diamond 252. If another round does exist, gaming device 10 repeats the above-sequence. If the initial sequence enables the player to choose which icon or character is to be associated with the player, that choice may or may not be provided to the player in the second and later rounds. If no additional rounds exists as determined in connection with diamond 252, gaming device 10 updates each player's credits, as seen in step 254, after which sequence 230 ends as seen in connection with oval 256.

Figure 13:
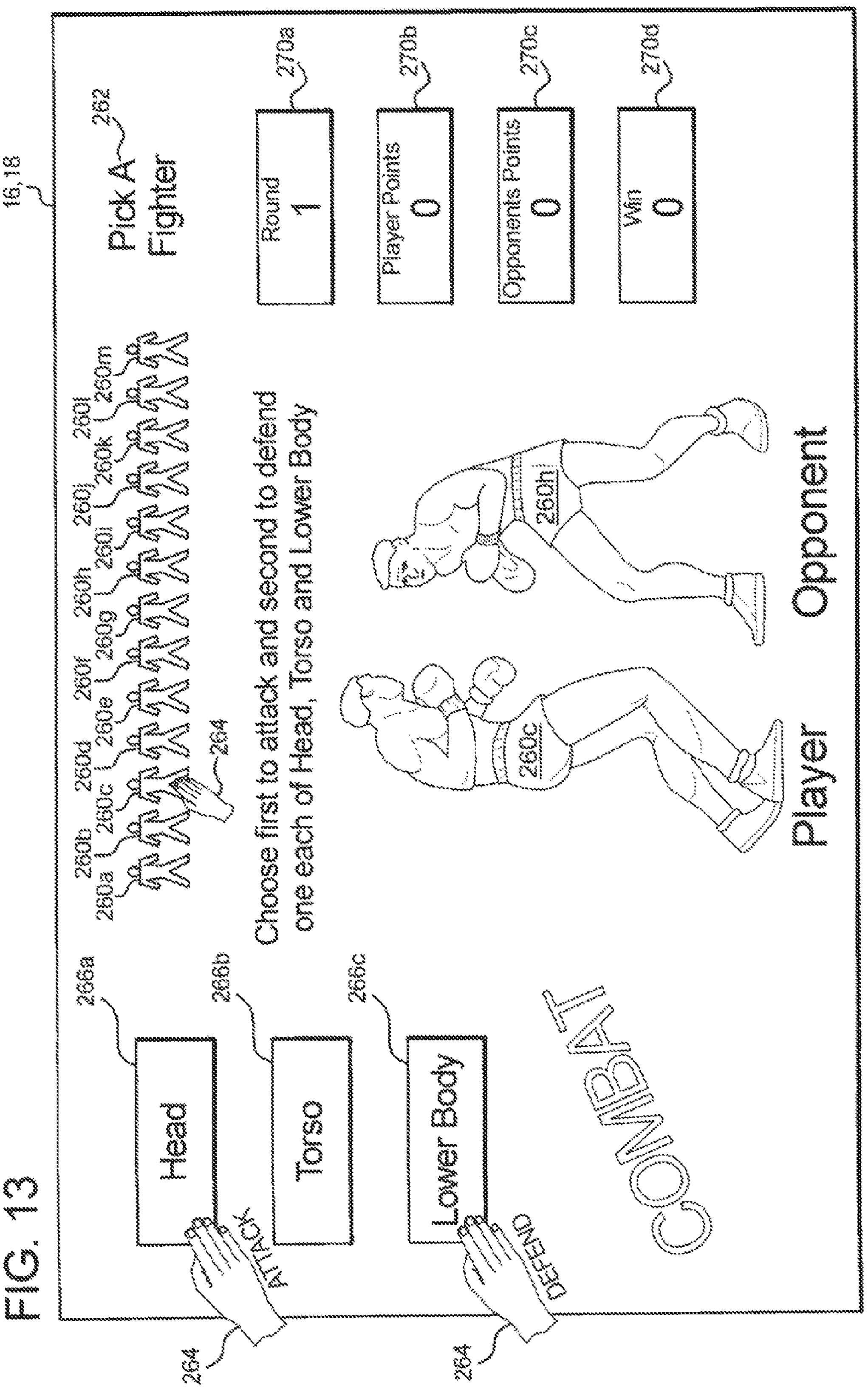
FIGS. 13 and 14 illustrate one embodiment of a matching type attack and countermeasure wagering game having a combat theme.
Figure 14:
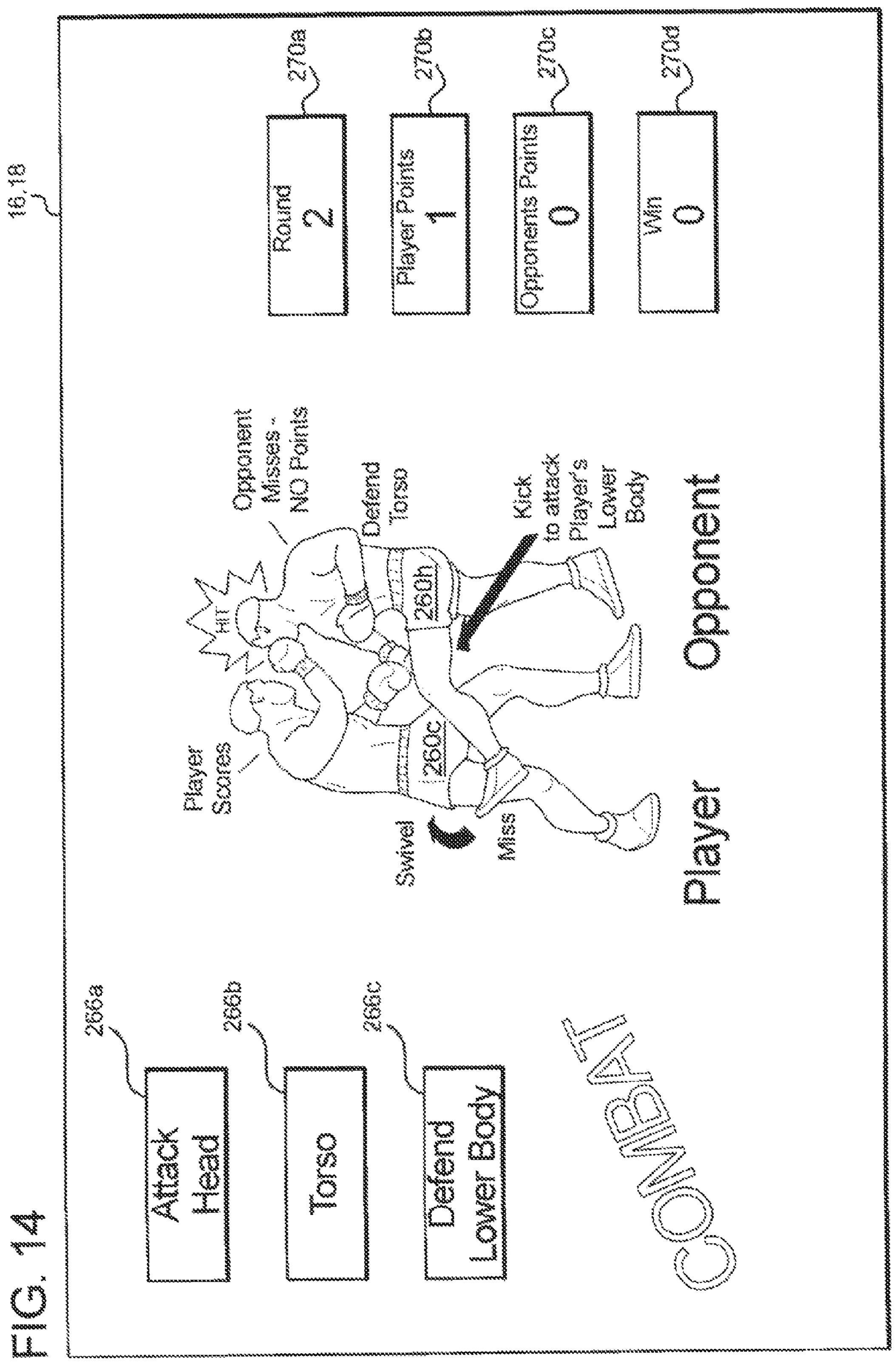

Referring now to FIGS. 13 and 14, one suitable theme for the attack and countermeasure wagering game in which the outcome enhancing can be implemented is a feature is a fight or combat theme. Here, one or more of display devices 16, 18 of gaming device 10 displays a first screen shot, which displays a plurality of selectable characters or icons 260*a* to 260*m*. Gaming device 10 displays an audio, visual or audio visual message 262 prompting the one or more player to pick one of the combatants 260*a* to 260*m*. As seen in FIG. 13, player 264 picks combatant 260*c*. In the illustrated embodiment, the attack and countermeasure game is a single player game in which the player plays against the gaming device. Here, gaming device 10 selects a player randomly from the remaining players not chosen by the player, e.g., combatant 260*h*. Combatants 260*c* and 260*h* appear on video monitor 16 or 18 ready to do battle.

Display device 16 or 18 also displays three possible offensive and defensives plays to 266*a* to 266*c*. In the illustrated embodiment, plays 266*a* to 266*c* are used to select both an offensive move or play and a defensive move or play. Play 266*a* is an attack or defense of the head area of character 260 (referring generally to characters 260*a* to 260*m*). Play 266*b* selects the torso to attack or defend. Play 266*c* selects the lower body to attack or defend.

Gaming device 10 provides an audio, visual or audio visual message 268 informing the player to choose an area of the player's opponent 260*h* to attack and then secondly to choose an area of the player's character 260*c* belonging to the player to defend. In FIG. 13 player 264 chooses move or play 266*a* to attack the head of opponent 260*h*. Also, player 264 chooses play or move 266*c* to defend the lower body of player combatant 260*c*.

Selectable plays or selections 266*a* and 266*c* are displayed on monitor 16, 18, in the illustrated embodiment because the player is playing against the machine in one embodiment. That is, the gaming device chooses its plays randomly and internally. In one embodiment, the software is set so that the gaming device's choices are in no way influenced by the player's choices. If the player is playing against another player, it is desirable to hide the selections, so that neither player knows what the other player has chosen to attack and defend. FIGS. 1A and 1B illustrate one embodiment for a mechanism that enables the players to choose attack and defense plays discreetly. Input devices 30 include buttons for other types of electromechanical inputs that correspond for example to plays 266*a* to 266*c*. Alternatively, the cabinet of gaming device 10 could include blinders or covers that block the view of the opposing player. In any case, the player does not see the plays chosen by the opposing player.

Display devices 16, 18 also show a number of meters. Meter 270*a* illustrates which round of the game is current. Meter 270*b* illustrates the number of points accumulated by the player. Meter 270*c* illustrates the points accumulated by the opponent. Meter 270*d* illustrates any credits that the player has won via play of the attack and countermeasure wagering game. In the state of the game shown in FIG. 13, the current round is round 1, neither the player or opponent has accrued any points, and the player has not won any credits.

FIG. 14 illustrates an acting out of the attack and countermeasure plays chosen by the player and chosen randomly by the gaming device 10. As seen, the opponent has chosen to attack the lower body of player character 260*c*. Further, opponent 260*h* has chosen to defend its midsection. Character 260*h* is shown in an animated or video sequence kicking at the legs of player character 260*c* and also blocking its midsection. Player character 260*c* is shown in acting out its choice of plays. Here, player 260*c* punches at the head of opponent 260*h* in an attack move and swivels its lower body in a defensive or countermeasure move. Because the countermeasure or defensive move of player combatant 260*c* successfully countered the attack move or kick of opponent 260*h*, the opponent's kick is shown as missing the player combatant 260*c* and no points are awarded to the opponent as seen in meter 270*c*. On the other hand, because the opponent's countermeasure or defensive move to block an attack to the torso of the opponent 260*h* did not successfully counter the attack player combatant's 260*c* move or punch, the players combatant 260*c* is shown successfully hitting the head of opponent 260*h*. Accordingly, the player scores a point, such as a single point shown in meter 270*b*.

Meters 270*a* to 270*d* are shown updated. If another round exists the player combatant 260*c* and opponent 260*h* are reset, such as reset to the positions of FIG. 13, to begin round two as shown in meter 270*a*. Player point meter 270*b* is updated to reflect that the player has received one point from round one. Opponent meter 270*c* shows that the opponent has yet to score a point on the player. Win meter 270*d* shows that the player as of round two has not yet won any credits. Alternative ways to the play and score attack and countermeasure game of FIGS. 13 and 14 are shown below in Table 2.

The dynamics of the combat game of FIGS. 13 and 14 are such that the player or opponent scores or wins one or more points unless the attack play is successfully countered. The more plays 266 (referencing generally to plays 266*a* to 266*c*, etc.), e.g., areas of the body, the higher the likelihood becomes that each combatant will score a point. For example, if torso play 266*b* were broken out into stomach and upper body, the total number of plays would be four, and each combatant would have only a 25% chance of successfully blocking the attack of the other combatant, instead of the 33% chance that each combatant has in the combat game illustrated in FIGS. 13 and 14.

Figure 15:
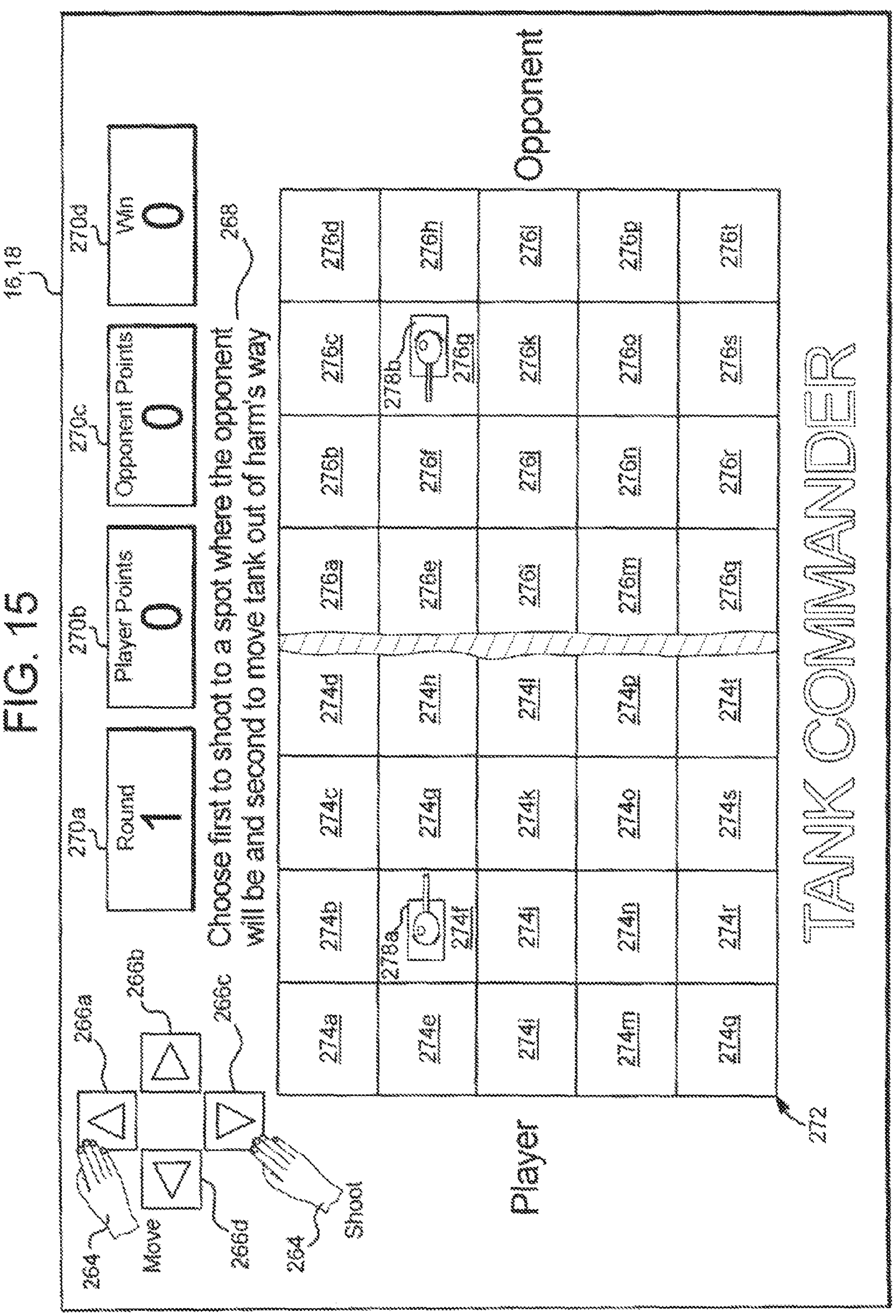
FIGS. 15, 16 and 17 illustrate another embodiment of a matching type attack and countermeasure wagering game having a tank bathe theme.
Figure 16:
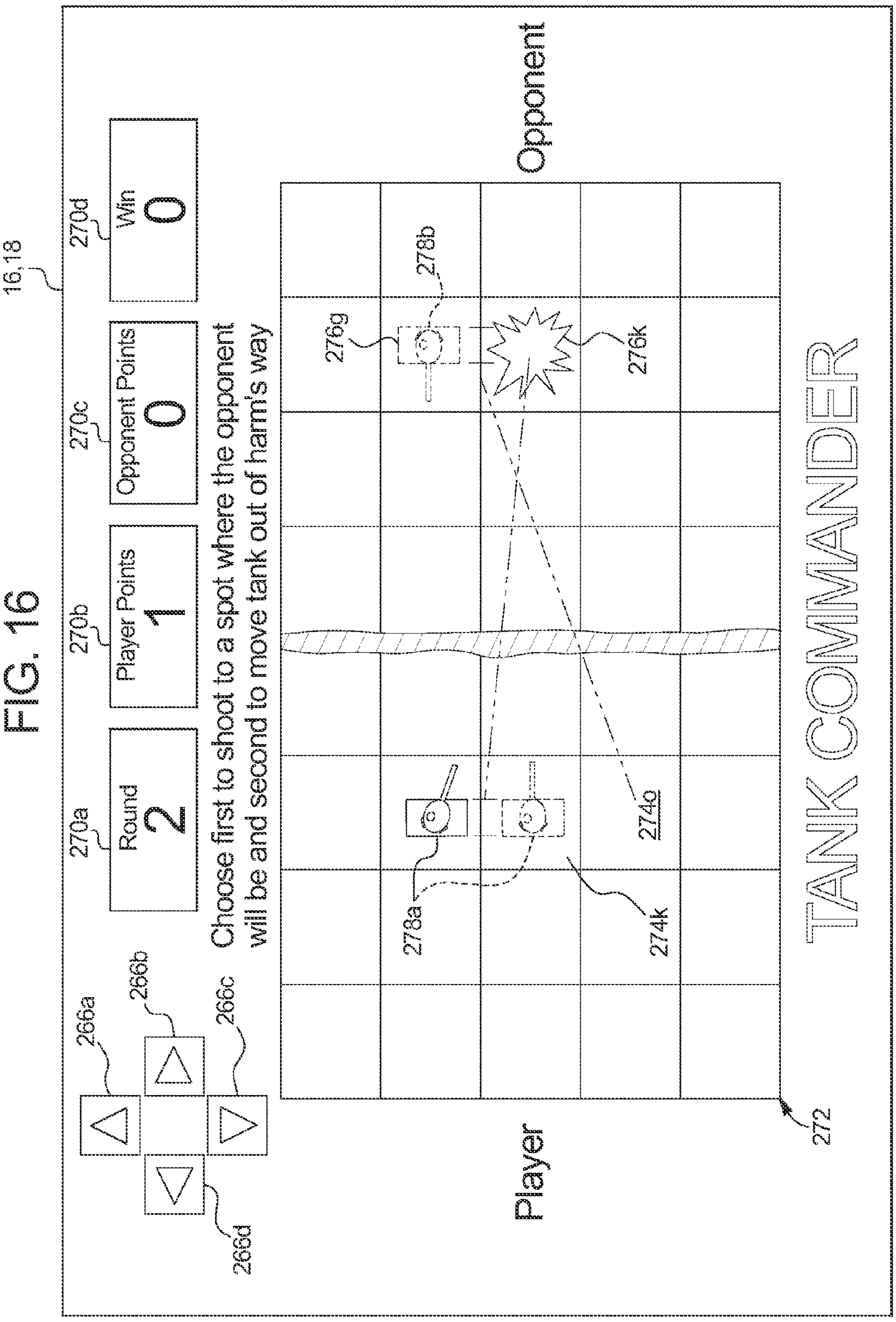
Figure 17:
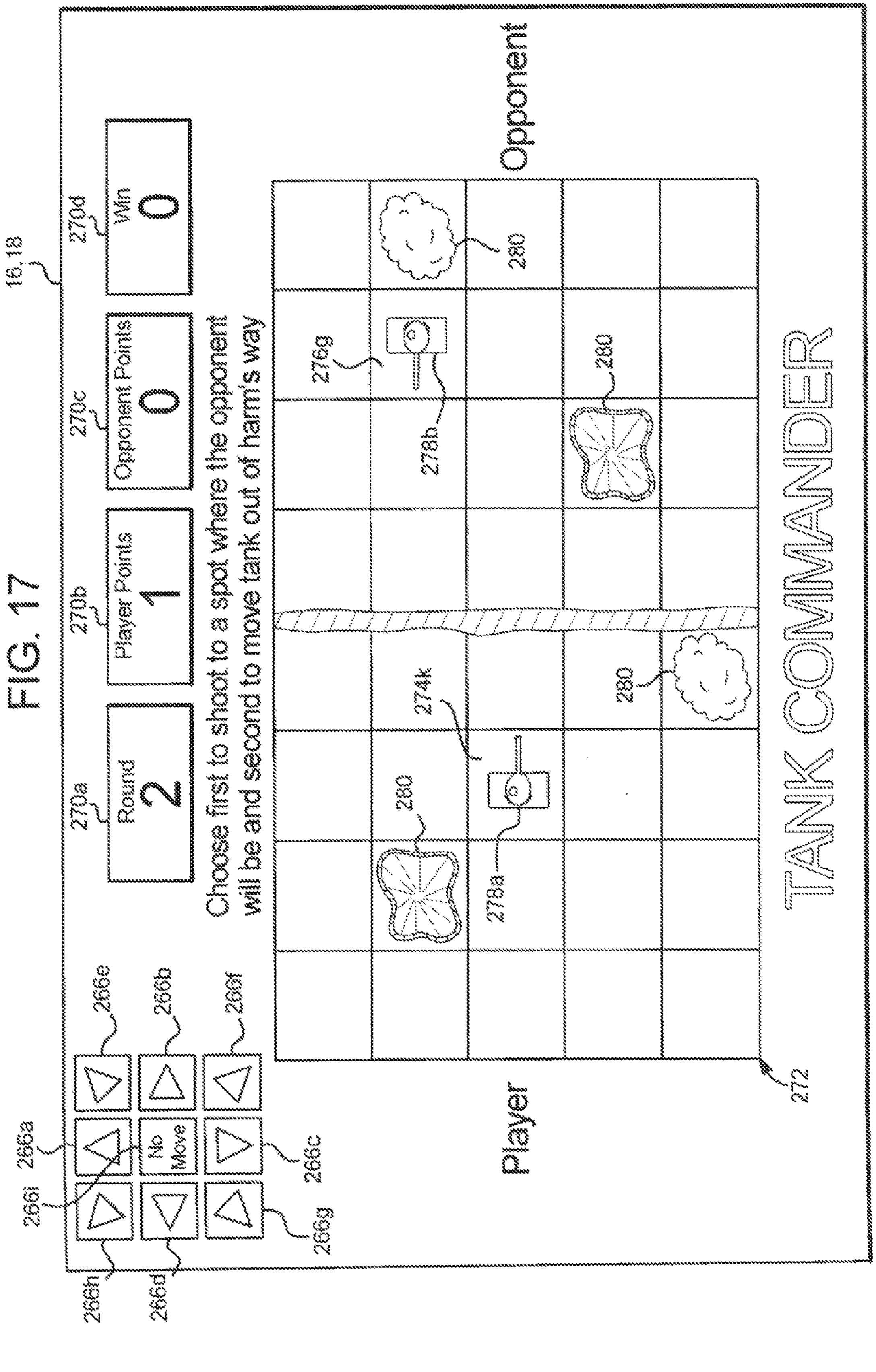

Referring now to FIGS. 15 to 17, a second attack and countermeasure game theme includes a tank commander or tank battle game, in which the outcome enhancing feature can be implemented in such game. This game is similar to the combat game of FIGS. 14 and 15 in that the two players or a single player playing against the machine select from the same group of plays 266 (referring collectively to plays 266*a* to 266*d*). As will become apparent, however, the tank battle game of FIGS. 15 to 17 is more defensive in nature than the combat game of FIGS. 13 and 14. That is, adding more plays or choices lessens the likelihood of a hit or successful attack as opposed to increasing the likelihood of a hit as seen with the combat game of FIGS. 13 and 14.

FIG. 15 illustrates that the tank commander theme includes the same meters 270*a* to 270*d* described above for the combat games for FIGS. 13 and 14. Display device 16 or 18 displays a battle zone or battle grid 272, which is divided into zones 274*a* to 274*t* for the player and zones 276*a* to 276*t* for the opponent. In the illustrated embodiment, the player again plays against the machine or opponent as opposed to another player. This enables choices or plays 266*a* to 266*d* to be displayed on video monitor 16 or 18, wherein plays 266 can be selected via the touch screen overlay 50. Alternatively, in a two player embodiment, input devices 30 such as those shown in connection with FIGS. 1A and 1B, are provided to enable the two players to select offensive and defensive plays discreetly.

FIG. 15 illustrates that the player and opponent are each provided with an icon or tank 278*a* and 278*b*, respectively. Here, the players do not pick a favorite from multiple icons or tanks, such as with the combat embodiment shown in FIG. 13. Alternatively, different icons, such as different types of tanks can be displayed on display device 16 and 18, allowing the player to choose his/her favorite icon or tank.

Display device 16 or 18 displays an audio, visual or audio visual message 268 prompting the player to choose a spot to which the player thinks the opponent's tank 278*b* will move and secondly to choose a defensive play to move the player's tank 278*a* to different grid 274*a* to 274*t* to avoid the opponent's shot. Plays 266*a* to 266*d* show arrows and indicate that by pressing one of the arrows the associated tank 278*a* or 278*b* will move in the direction of the chosen arrow. In the illustrated embodiment, the arrow signals that the associated tank will move one grid in the direction chosen. The player knows that the player's tank 278*c* can only move one square or grid in one of the four directions shown. The player also knows that opponent's tank 278*b* can also only move one grid in one of the four directions.

As seen in FIG. 15, player 264 first selects play 266*c* indicating that the player thinks that the opponent's tank 278*b* will move from its current grid position 276*g* down one position to 276*k*. The player's second selection, player 264 chooses play or up arrow 266*a* as the player's defensive maneuver. That is, the player believes that by moving the player's tank 278*a* from its current position at 274*k* upwardly one grid to new position 274*g*, the player's tank will avoid the grid into which opponent's tank 278*b* will shoot.

In an alternative embodiment, plays 266 can include double-arrows indicating that tank 278*a* or 278*b* will move two places in the chosen direction. Further alternatively, plays 266*a* to 266*t* mirror grid positions 274*a* to 274*t* and 276*a* to 276*t*. Here, tanks 278*a* and 278*b* can move to any open grid 274 or 276.

FIG. 16 illustrates the outcome of the plays selected in FIG. 15. In FIG. 16, player's tank 278*a* is shown moving from its current position 274*k* to a new position 274*g*. Along the way, player's tank 278*a* fires a shot into the player's selected grid 276*k* of the opponent. At the same time, opponent's tank 278*b* is shown moving from its current position 276*g* to its new defensive position at grid 278*k*. Before arriving at 278*k*, opponent's tank 278*b* shoots into the player's area of battle field 272, namely, into grid 274*o*. The result of a comparison of the moves or plays chosen by the player and by the gaming device for opponent tank 278*b* is also illustrated in FIG. 16. Here, player's tank 278*a* by moving to new position 276*g* has successfully avoided the shot into grid 274*o* by opponent's tank 278*b*. Opponent's tank 278*b* on the other hand has moved from grid 276*g* to grid 276*k*, where it is hit by the shot from player's tank 278*a*. The player is accordingly award a point for hitting opponent's tank 278*b* as shown in meter 270*b*. On the other hand, opponent's tank has not scored any points as shown in meter 270*c*. In FIG. 16 the round switches from one to two as shown in meter 270*a*. The player has yet to win any credits for the game as shown in 270*d*.

FIG. 17 illustrates a plurality of alternative embodiments for the tank commander game in which the outcome enhancing feature can be implemented. For example, as illustrated, a new round can begin with tanks 278*a* and 278*b* beginning in the same position as the previous round. In an alternative embodiment, tanks 278*a* and 278*b* begin the round in the position to which they moved or attempted to move in the previous round.

In a further alternative embodiment, tanks 278*a* and 278*b* begin the round in a randomly chosen grid 274 or 276 (referring generally to one of grids 274*a* to 274*t* and 276*a* to 276*t*, respectively). It should be appreciated that starting from a grid along an edge of battle field 272 provides less places to move to than does one of the inner grids. Beginning at a corner grid provides even less opportunity for movement. Accordingly, to make the game progressively more offensive, later rounds may be weighted such it is more likely that the tanks begin along an edge or corner of battle field 272.

In another attempt to make the game more offensive, obstructions 280 can be placed in one or more grid of battle field 272. Obstructions 280 prevent the player or gaming device from moving into the grid having an obstruction. The obstructions thereby reduce the number of evasive places to move to and thus increase the likelihood of a hit and resulting in points. Obstructions 280 can increase in number in later rounds.

As seen in FIG. 17, the number of plays 266 can be varied. FIGS. 15 and 16 show four plays or directions 266*a* to 266*d*. FIG. 17 illustrates that the player and opponent tanks can move to eight different directions or grids 266*a* to 266*h*, depending on where tanks 278*a* and 278*b* are currently located on battlefield 272. Further, FIG. 17 shows a null selection for play 266*i*, in which the player or gaming device chooses not to move and to remain instead in its current position. It should be appreciated that the more plays or moves that are added, the more defensive the game becomes because the likelihood of choosing the opponents new position lessens.

Figure 18:
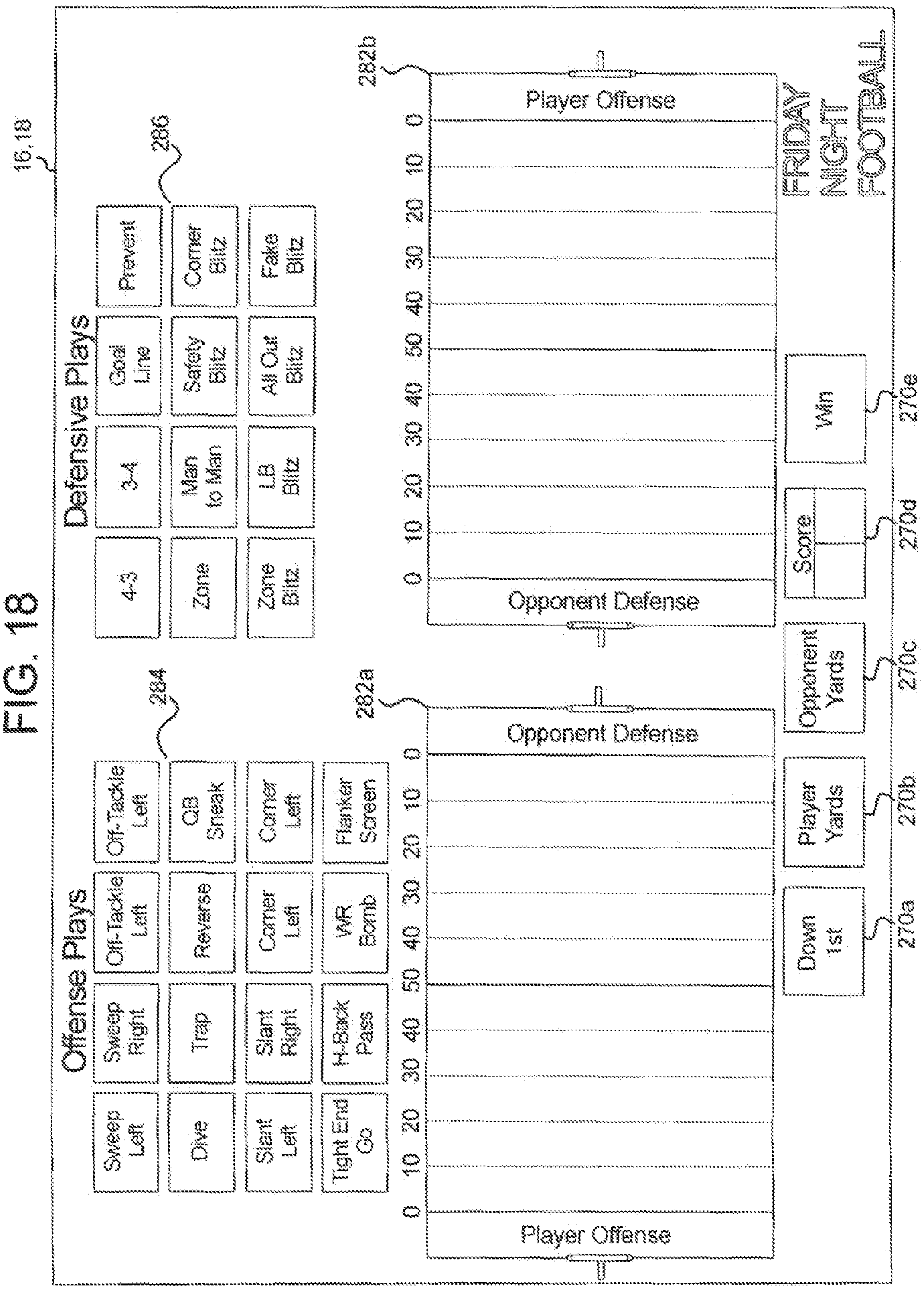

Referring now to FIGS. 18 and 19, a further alternative embodiment and theme for the attack and countermeasure game is illustrated, wherein the outcome enhancing feature can be implemented in such game. Here, the game theme is the game of American football. It should be appreciated however that the teachings of FIGS. 18 and 19 are applicable to any type of sport, such as baseball, basketball, soccer, hockey, etc.

The football version of the attack and countermeasure game is also displayed on display device 16 or 18 of gaming device 10. Meters 270*a* to 270*d* are provided again and operate as described above. A separate score meter 270*e* is provided. Its function is discussed below.

Display device 16 or 18 shows two separate football fields 282*a* and 282*b*. On football field 282*a*, the player plays on offense, while the opponent or gaming device plays on defense. On football field 282*b*, the opponent plays on offense, while the player plays on defense. The illustrated embodiment is again one in which a single player plays against the machine. Accordingly, the offensive and defensive plays 284 and 286, respectively, are shown on display device 16 or 18, which can be selected via a touch screen overlay 50. Alternatively, a first player plays against a second player, in which case discreet input devices such as input devices 30 shown in FIGS. 1A and 1B, are used.

The football theme includes a plurality of selectable offensive plays 284 and a plurality of selectable defensive plays 286. For each football down shown in meter 270*a*, each player or opponent selects one of the offensive plays 284 and one of the defensive plays 286. Yards gained by the player from his/her play selection are shown in yard meter 270*b*. Likewise yards gained by the opponent from its play selection are shown in yard meter 270*c*. In one embodiment, the yards accumulate to a score for either the player or opponent, which is then shown in score meter 270*e*. Any credits awarded the player are shown in meter 270*d*. Credit awarded to the player can be based on the player's score only (270*e*), the number of yards gained only (270*b*, in which case score meter 270*e* is not needed), or a combination of yards and score.

In the illustrated embodiment, the player can be allowed to make selections as long as the player achieves ten yards within four downs. If the player eventually reaches the opponent's goal line, the player obtains a score and either the game ends or a new round or set of downs is provided, in which the player begins near the player's own goal line. If the player fails to make a first down, play can stop and an award can be provided based on yards for example.

In another embodiment, the player is provided with four downs in which to gain as many yards as possible. The player's win at the end of the four downs is based on the number of yards gained or the difference of yards gained between the player and opponent. If the player reaches the opponent's goal line, an additional award is provided in connection with score meter 270*e*.

The embodiments of FIGS. 13 to 17 involved a matching game, in which a matching of plays resulted in a successful evasive block of an attack move for the combat game or a successful move in the tank command game. The football game of FIGS. 18 and 19 operates differently. Here, each combination of offensive and defensive plays is weighted in connection with a variable outcome, e.g., a yardage outcome.

FIG. 19 illustrates one possible outcome array for one offensive and defensive play combination. In FIG. 19, the example shows one offensive play 284 versus each of the potential defensive plays 286. Namely, the slant right offensive play, is compared to: (i) a 4-3 defense, (ii) a 3-4 defense, (iii) a goal line defense, (iv) a prevent defense, (v) a zone defense, (vi) a man-to-man defense, (vii) a safety blitz, (viii) a corner blitz, (ix) a zone blitz, (x) a line backer blitz, (xi) an all out blitz, and (xii) a fake blitz. The chart of FIG. 19 also shows a plurality of different yardage outcomes, namely: (i) a loss of 10 yards, (ii) a loss of 5 yards, (iii) a loss of 2 yards, (iv) a loss of 1 yard, (v) no gain, (vi) a gain of a yard, (vii) a gain of 2 yards, (viii) a gain of 3 yards, (ix) a gain of 5 yards, (x) a gain of 8 yards, (xi) a gain of 10 yards, (xii) a gain of 15 yards, (xiii) a gain of 20 yards, and (xiv) a gain of 30 yards.

In FIG. 19, each yard output defense combination has provided a percentage likelihood of occurrence. For example, if the player or opponent chooses the slant right offensive play 284 and the opposing player or opponent chooses a 4-3 defense 286, that combination has: (i) a 1% change of generating a 10 yard loss, (ii) a 2% chance of a 5 yard loss, (iii) a 12% chance of a 1 yard gain, (iv) a 95% chance of an 8 yard gain, (v) a 1% chance of a 30 yard gain, etc. Each of the yardage and defensive combinations is weighted in a similar manner. In an embodiment, the percentage ratings can mirror real life football. That is, a riskier defense, such as an all out blitz, can have a higher likelihood of producing a larger loss of yardage or yielding a large gain of yardage, with a lesser likelihood of yielding an average gain of yards. A more conservative defense on the other hand is weighted oppositely.

It should be appreciated that a random outcome generator operates with weighted outcomes such as those shown in FIG. 19. Weighted tables are stored for each combination of offensive plays 284 and defensive plays 286. Here, adding more offensive or defensive plays does not raise or lower the likelihood of a successful outcome or yards, because the likelihoods are set in and generated randomly from software.

Three separate themes for the attack and countermeasure game have been illustrated via FIGS. 13 to 19. Each of these games can be implemented in a multitude of ways and have a multitude of different payout schemes. The combinations of different embodiments are quite varied. Accordingly a chart detailing different primary embodiments is shown as Table 2.

TABLE 2

| Alternative Embodiments | | | | |
|---|---|---|---|---|
| Primary Embodiment No. | No. of Players | Multiple Rounds (Y/N) | Description of Game Play | Pay Schemes |
| 1 | 1 | N | Single round bonus game, player plays against machine. | 0 to X credits for losing to opponent, >X credits for tying opponent, >>7X>> credits for beating opponent. |
| 2 | 2 | N | Single round base or bonus game, player 1 plays against player 2. | If player 1 wins, player 1 wins credits, player 2 loses credits, vice versa if player 2 wins, draw if tie. |
| 3 | 1 | Y | Multiple round bonus game, player plays against machine, number of rounds can be preset, last until preset score is reached last until the player loses or does not win once, or last until the player loses or does not win a preset number of times. | 0 to X credits for losing to opponent, >X credits for tying opponent, >>X credits for beating opponent. |
| 4 | 2 | Y | Multiple round base or bonus game, player 1 plays against player 2, number of rounds can be preset, last until a certain point total is met, until a certain point differential is met. | At the end of the rounds, winner wins preset amount.<br>At the end of the rounds, winner wins randomly determined amount<br>At the end of the rounds, winner's award based on player's total points<br>At the end of the rounds, winner's award based on differential of points between winning and losing player |
| 5 | >2 | Y | Tournament gaming system in which two players square off in a base or bonus game having one or more rounds, winner advances to play another winner at the next level and so on until a single winner emerges, consolation matches can be held depending on pay scheme. | Pay based on level reached, all players win some award in bonus game.<br>Pay based on level reached, less than all players win award in base game.<br>Consolation matches held until complete ranking is made, 1, 2, 3, . . . x, all players win in bonus game.<br>Consolation matches held until complete ranking is made, 1, 2, 3, . . . x, less than all players win award in base game. |

TABLE 2-continued

| Alternative Embodiments | | | | |
|---|---|---|---|---|
| Primary Embodiment No. | No. of Players | Multiple Rounds (Y/N) | Description of Game Play | Pay Schemes |
| 6 | >2 | Y | Tournament gaming system in which each player plays against the machine in a base or bonus game having one or more rounds, winning players advance to play machine again at a next level and so on until only a single winner remains, consolation matches can be held depending on pay scheme, levels can increase in difficulty. | Pay based on level reached, all players win some award in bonus game. Pay based on level reached, less than all players win award in base game. Consolation matches held until complete ranking is made, 1, 2, 3, . . . x, all players win in bonus game. Consolation matches held until complete ranking is made, 1, 2, 3, . . . x, less than all players win award in base game. |

Table 2 shows six different primary embodiments, wherein certain embodiments have a multitude of payout schemes. It should be appreciated that Table 2 is in no way meant limit the scope of the examples set forth herein. To the contrary, Table 2 illustrates that the examples set forth herein can be implemented in many ways.

The first alternative embodiment in Table 2 illustrates a single player game having a single round. Here, the player plays a bonus game and plays against the machine. In a bonus game, it is generally desirable to provide the player some amount of an award. For example, the player can be provided 0 to X credits for losing to the opponent, greater than X credits for tying the opponent or greater than the tie amount for beating the opponent.

In the second main embodiment, a two player game involves a single round, which can be played as a base or bonus game. Here, if the first player beats the second player, the first player wins credits and the second player loses credits. The results are reversed if player two wins. A push results from a tie. In a bonus game, a loser does not lose credits.

In the third primary embodiment, a single player plays a multi-round bonus game, such as in the examples shown above, against the machine. The number of rounds can be preset or last until the player loses or ties. The rounds can last until the player loses or ties a certain number of times. Alternatively, the number of rounds can last until a certain point total is achieved. In this bonus game embodiment, the pay scheme can be the same as that set forth in first primary embodiment. In alternative pay scheme, the player win is based on the player's total points. In a further alternative embodiment, the players win is based on the difference between the player's points and the game's points.

In a fourth alternative embodiment, a two player game involves multiple rounds. This can be a base or bonus game wherein the number of rounds is preset or varied as discussed above in connection with the third primary embodiment. The fourth embodiment includes a plurality of different pay schemes, such as paying the winner at the end of the rounds a preset amount, a randomly determined amount, an award based on the winner's total points or an award based on the difference between the winner's points and the loser's points.

The fifth primary embodiment includes more than two players and has multiple rounds. Here a tournament setting is provided in which multiple gaming devices are linked via a server computer and computer network. Two players play against each other in a base or bonus game having one or more rounds. A winner advances to play another winner and so on until a single winner emerges. Consolation matches can be held depending the type of pay scheme. The pay schemes can be varied. The payout can be based on the level reached, wherein all players win some amount in a bonus game. The payout can be based on a level reached, wherein less than all players win in a base wagering game. Consolation matches can be held until a complete ranking is made, e.g., one, two, three, etc., and wherein all players win some amount in a bonus round. The same ranking can be made via consolation matches, but in which less than all players win in a base game version.

The same pay scheme for the fifth primary embodiment can be applied to the sixth primary embodiment, which includes a game involving more than two players in a multiple round tournament game. Here, however, each player plays against the machine instead of playing against another player as in the fifth primary embodiment. The game can have one or more rounds but ultimately either the player or the machine wins in a particular level. The winning players advance to play the machine again at a next level, and so on until only a single winner remains. Consolation matches can be held depending on the pay scheme as discussed in connection with pay schemes for primary embodiment of FIG. 5. Increasing levels can increase in difficulty, for example, by providing more obstructions in the tank commander game theme described above.

Any of the primary embodiments cooperating with any of the game themes can employ a game scheme in which one or more player in a single round (of a single or multi-round game) makes multiple attack and countermeasure moves or plays. For example, the fighters of the combat game or tank commander game could make multiple offensive and defensive moves against each other in the same round, each move combination resulting in a point or win for each player.

Figure 20:
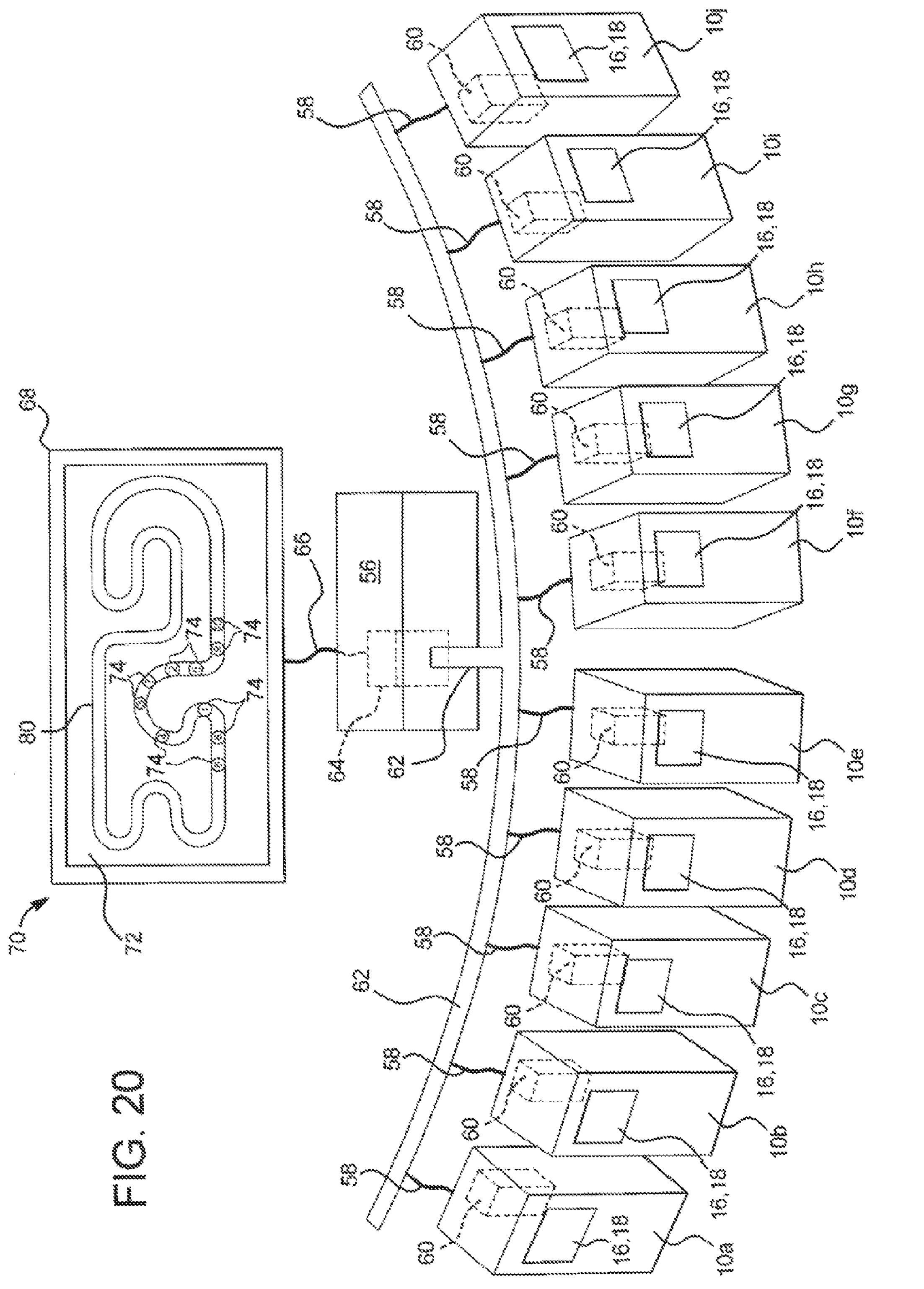
FIG. 20 is a schematic illustration of one embodiment of a multiplayer racing game system, which includes a server computer, multiple gaming stations or kiosks and a large overhead display.

Referring now to FIGS. 20 to 28, single and multiplayer competitive racing game systems which include an outcome enhancing feature are illustrated. Which the racing game is shown primarily as a multiplayer game, it should be appreciated that the racing competition can also be configured in a single player embodiment. This is shown and described below in addition. FIG. 20 illustrates one embodiment of a racing competition system 70. In the illustrated embodiment, ten gaming devices, namely gaming devices 10*a* to 10*j* play against one another. System 70 can include more or less than ten positive constituent gaming devices and be carried out over a LAN, WAN, internet or any combination thereof or any other suitable network.

One or more video monitor 16 or 18 is illustrated for each gaming device 10*a* to 10*j*. Each gaming device also includes a control unit 60. Control unit 60 houses one or more processor 12, one or more memory device 14, video controller 46, touch screen controller 44 (all shown above in connection with FIG. 2A), and any other equipment necessary for each gaming device 10*a* through 10*j* to communicate via data link 58 and data bus or network 62 with server computer 56. Server computer 56 likewise includes a control unit 64 having one or more processor and/or memory, which communicates via network or data bus 62 and each of the links 58 to gaming devices 10*a* to 10*j*. Links 58 and network or data bus 62 can be of any of the variety of types discussed above in connection with FIGS. 2A and 2B. Moreover, the processing and memory capability of control unit 64 or server computer 56 can be of any of the types and varieties discussed above in connection with the processing and memory capabilities of gaming device 10, Control unit 64 also includes a video RAM or video controller that communicates via link 66 to large overhead display 68. It should be appreciated that in alternative embodiments, any of the data linkages 58, 62 and 66 can be replaced with radio frequency, microwave or other alternative wireless technology.

Individual video monitors 16 and 18 of gaming devices 10*a* to 10*j* can show the exact same indicia that large overhead display 68 shows. Alternatively, video monitors 16 and 18 show additional or different information, such as information relating to the specific gaming device 10*a* to 10*j* or to a player playing any of those gaming devices. Further, as discussed above in the summary, in one embodiment the competition race game includes multiple heats or races and enables the player to redistribute driving points (discussed below) or car configuration (discussed below) between the heats or races. Such reconfiguration in one embodiment is done via individual video monitors 16 and 18 and an associated touch screen overlay 44, for example.

The attract or solicitation countdown done at end of a series of races to attract players for the next series of races can be split amongst large overhead display 68 and local video monitors 16 and 18. For example, during the attract sequence local video monitors 16 and 18 could show a log of the top ten series finishes, while large overhead display shows commentators or announcers in a sport recap setting commenting on the previous race series and showing footage of various ones of the races. It is believed that such interaction provides a fun and exciting attract or solicitation sequence, which involves players in the game.

In one alternative embodiment, the competition racing game is a bonus game on a gaming machine, which is played in addition to any of the primary base games such as those discussed herein. Here, players play the base wagering game via video monitor 16 or 18. Large overhead display 68 runs a attract, e.g., commentator, sequence until a bonus is hit by one of the gaming devices 10*a* to 10*j*, after which large overhead display 68 shows the bonus races discussed below.

Large overhead display 68 includes a large video screen 72, which can be any types of video screens described above for monitors 16 and 18. Video screen 72 shows a racetrack 80, which is selected from a plurality of different racetracks randomly as discussed in detail below. The race is shown with racing cars 74, which are numbered in one embodiment according to numbers selected by the player of the corresponding game device 10*a* through 10*j*. In the illustrated embodiment, the numbers are zero to nine for convenience. These numbers could be arranged in any suitable pattern in association with gaming devices 10*a* to 10*j*. Different cars 44 can also have different shapes and colors, which can be player selectable or correspond alternatively to a color, for example, associated with a particular gaming device 10*a* to 10*j* or some type of indicator attached to the gaming device. In the example illustrated in FIG. 20, car zero wins the race, followed by car seven, car five, car two, car nine, car three, car four, car one, car eight and car six.

Figure 21:
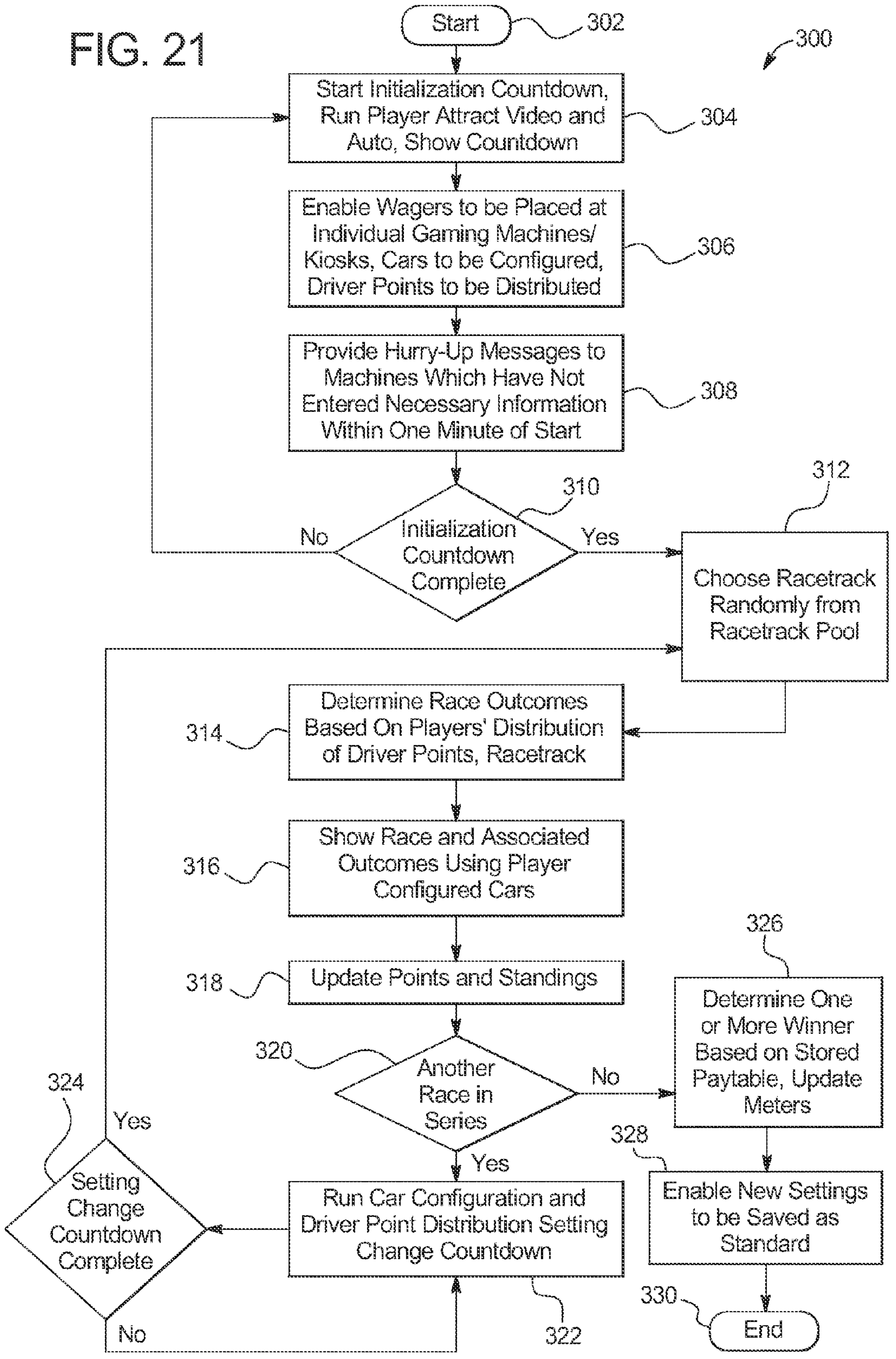
FIG. 21 is a schematic block diagram showing one possible sequence of operation for a multiplayer version of a racing game having player configurable performance characteristics.

Referring now to FIG. 21, sequence 322 illustrate one possible sequence of operation for the multiplayer version of the racing competition game having player configurable performance characteristics of system 70. Upon beginning sequence 300, as seen in connection with oval 302, system 70 starts an initialization countdown, runs player attract video and audio and shows the countdown to potential players, as seen in connection with block 304. As discussed above, this is done on large overhead display 68 and/or the video monitors of 16 and 18 of constituent gaming devices 10*a* to 10*j* of system 70.

Figure 23:
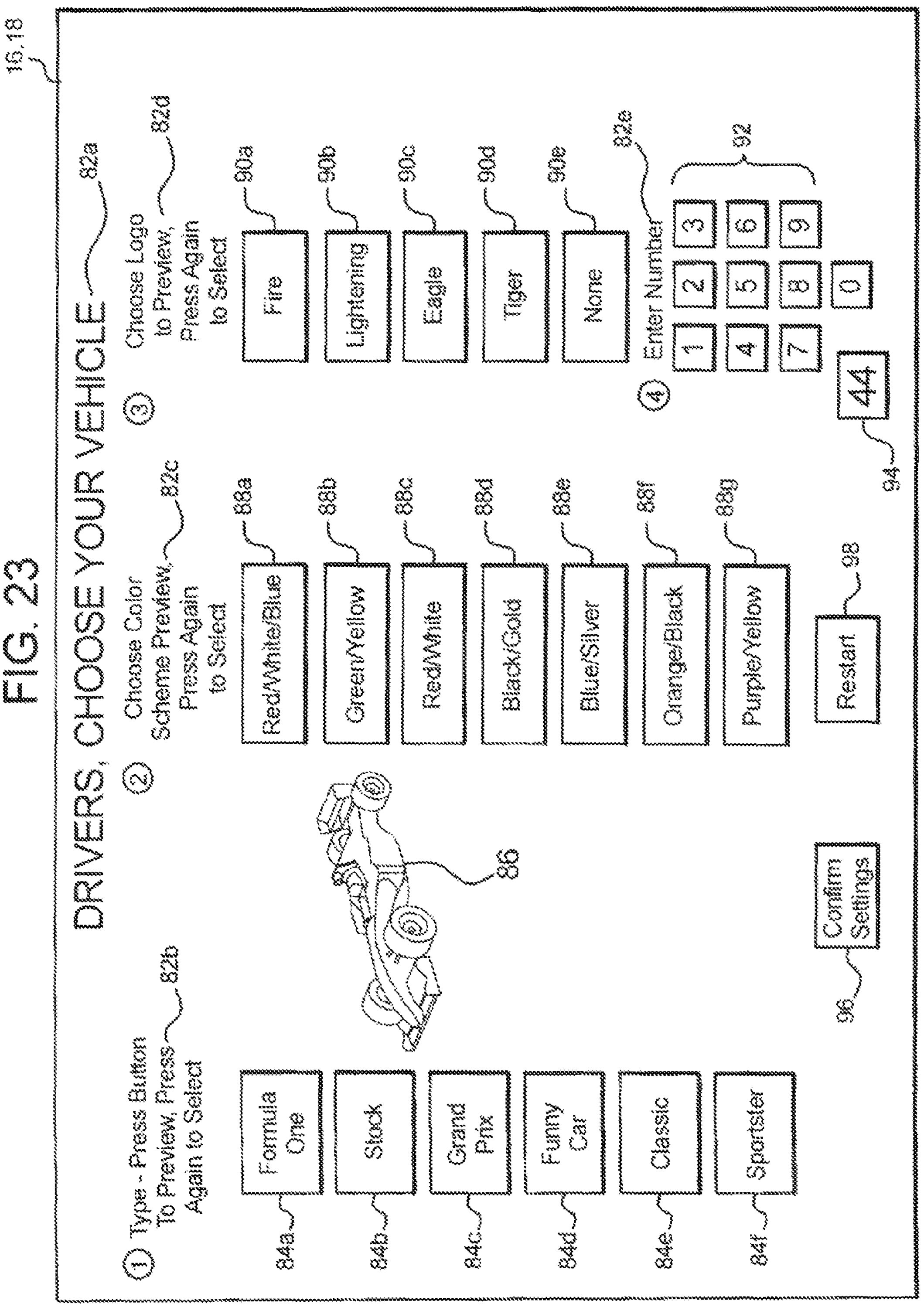
FIG. 23 is a screen shot of one of the individual racing game machines or kiosks illustrating one example of a car type, color, number, etc., setup regimes.
Figure 24:
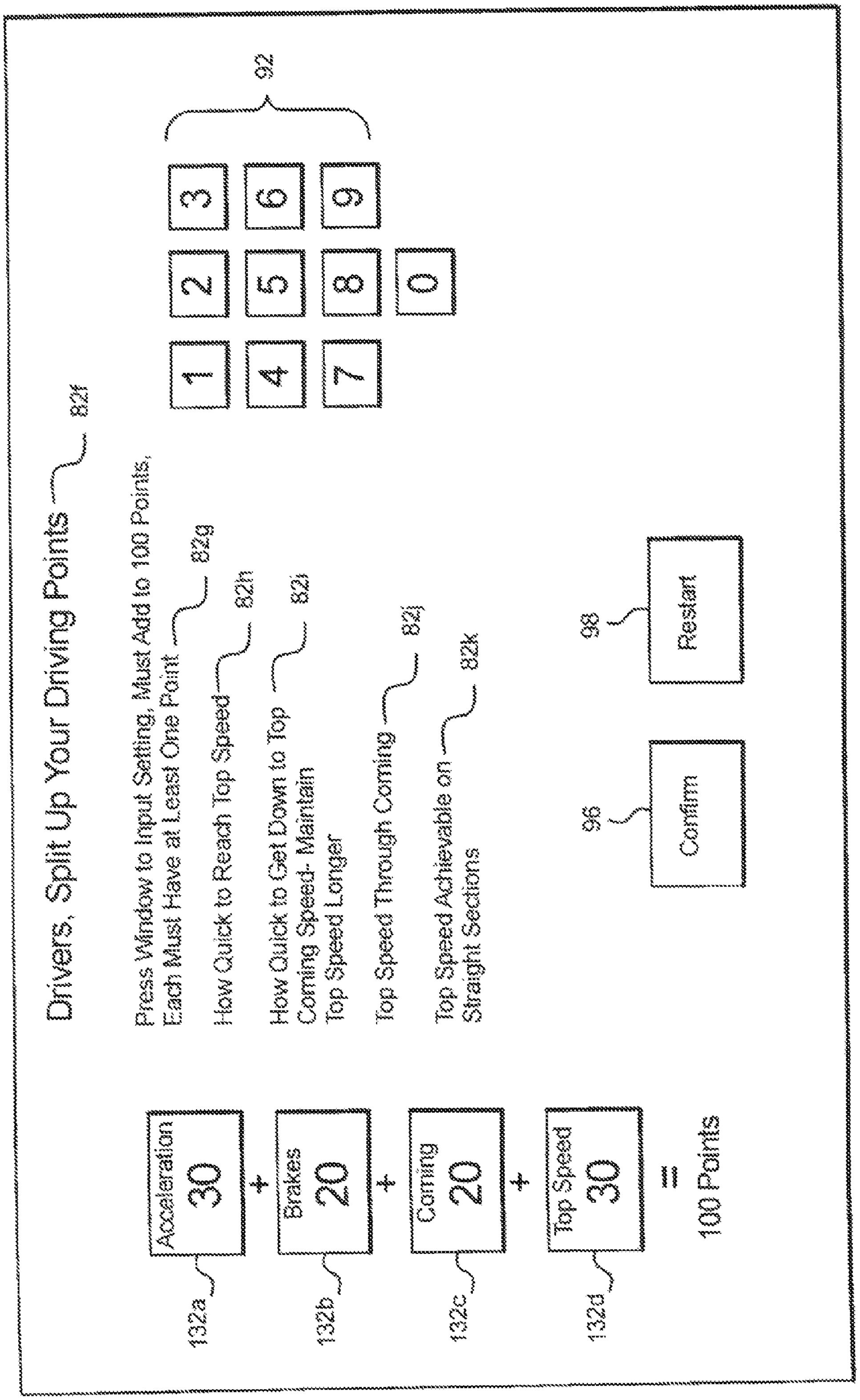
FIG. 24 is a screen shot of one of the individual racing game machines or kiosks illustrating one example of a "driving point" distribution setup regime.
Figures 25A, 25B, 25C, 25D, 25E, 25F, 25G, 25H, 25I, 25J:
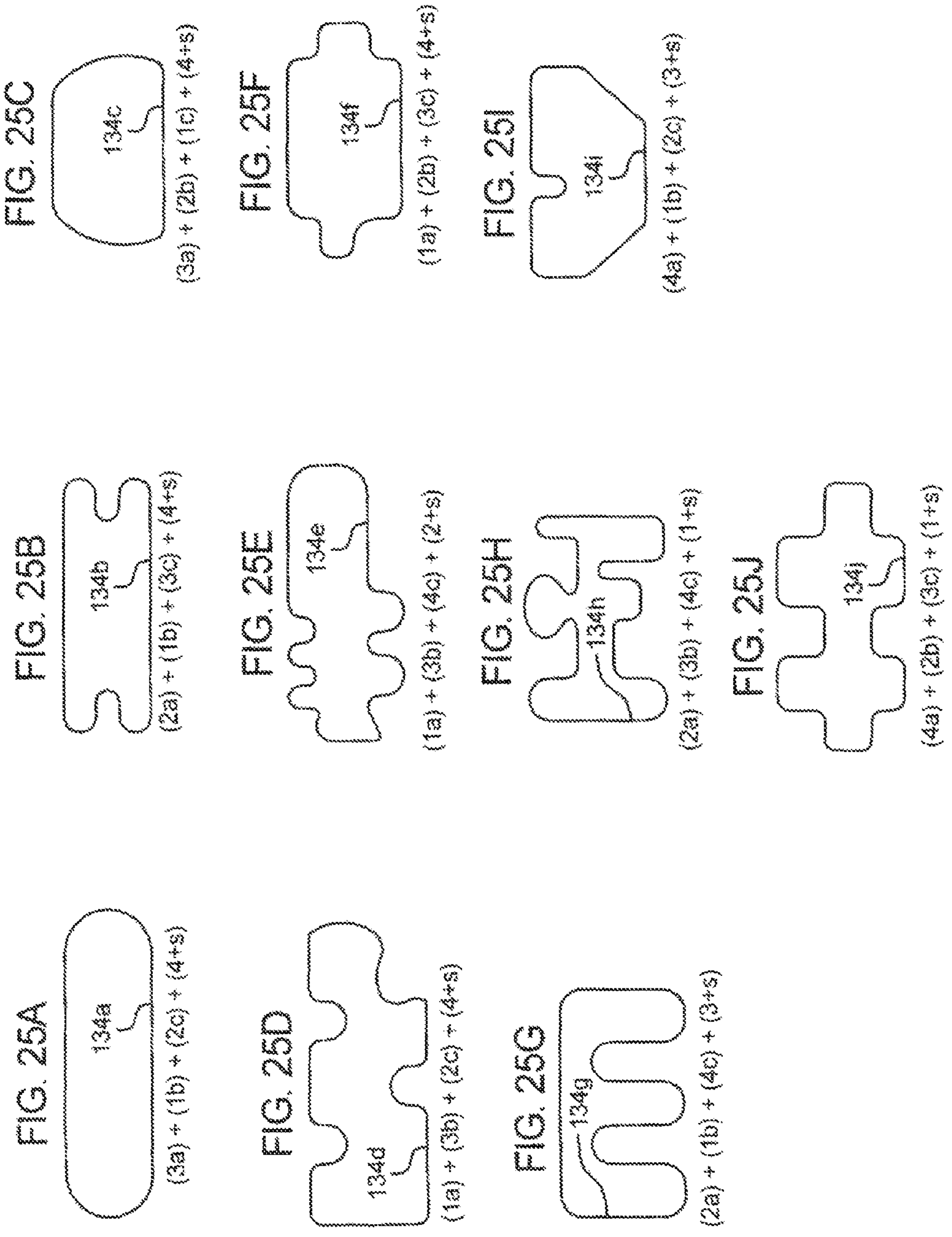
FIGS. 25A, 25B, 25C, 25D, 25E, 25F, 25G, 25H, 25I and 25J illustrate multiple racetracks and associated algorithms, one of which is chosen for each race of a series of races.

Sequence 300 during the countdown enables player at individual gaming machines or kiosks to place wagers, to configure their cars and distribute driver points, as shown in connection with block 306. FIGS. 1A and 1B and associated text discuss different ways to place wagers at individual gaming devices 10*a* through 10*j*. FIG. 23 described below shows one embodiment for enabling the players to configure their cars as desired. FIG. 24 below shows one embodiment for enabling the players to distribute their driver points. Regarding driver points, as discussed in the summary and in detail below, in one embodiment each player splits a preset amount (e.g., one-hundred of points) into four driving categories, namely, acceleration, breaking, cornering, and top speed. Each of these categories and the mode of point distribution is discussed in detail below. It should also be appreciated that other suitable categories may be employed in addition to or as alternatives of these categories. Thus, the player acts to configure the player car in one of multiple different ways.

During the countdown, sequence 300 can run one or more “hurry-up” messages to machines that have not yet entered necessary information. For example, a hurry-up message can be provided at one minute until the end of countdown, as seen in connection with block 308. In one embodiment, the “hurry-up” message is provided at local video monitor 16 or 18. It is also contemplated to provide such message on large overhead display 68. Large overhead display 68 also shows the actual countdown in one embodiment.

If the initialization portion of sequence 300 is not complete as determined in connection with diamond 210, system 70 continues to run attract sequences as seen in connection with block 304, enables wagers and other configurations to be made, as seen in connection with block 306, and provides any necessary hurry-up messages seen in connection with block 308. When the initialization countdown is complete, as determined in connection with diamond 310, system 70 chooses a racetrack randomly from a racetrack pool, as seen in connection with block 312. FIGS. 25A to 25J show different selectable racetrack configurations. Those figures and FIGS. 26A to 26C also illustrate system 70 in connection with block 314 determinations outcomes using the player's distribution of driver points and the randomly chosen racetrack. It should be appreciated that the track determination can also include other random determinations such as the weather at the track and crashes at the track, or other determinations that counteract against the player set race car attributes.

After the outcome determinations have been made, sequence 300 in connection with block 316 shows the race occurring on the selected racetrack and finishes the race display showing the cars finishing according to the determined outcomes. The race is shown is using the cars as configured by the constituent players as described above in connection with large overhead display 68 of system 70

In one embodiment, the base or bonus game includes a plurality of races, although a single race is also contemplated. Sequence 300 provides an award to one or more players of system 70 based on a combination of the outcomes from the races in the series. As seen in connection with block 318, system 70 updates each player/racer's points and standings after each race of the series. If no additional race is left in the series, as determined in connection with diamond 320, system 70 and sequence 300 determines one or more winner based on a stored paytable. Each of the credit meters of the constituent gaming devices is updated accordingly, as seen in connection with block 326. One example of a paytable for a multiplayer embodiment is shown in connection with FIG. 27.

System 70 enables the players to store their car configurations and point distributions on the player tracking system. This way, the next time the player plays the base or bonus competitive racing game, the player simply inserts his or her card into a gaming device 10 and system 70 recalls the player's settings automatically. If the player has changed the car configuration or point distribution during sequence 300, system 70 in one embodiment prompts the player whether the player's current new settings should be stored as a standard on the player's tracking card, as seen in connection with block 328. Afterwards, sequence 300 of system 70 ends as seen in connection with oval 330.

If another race exists in this series, as determined in connection with diamond 320, system 70 using sequence 300 performs a car configuration change and driver point distribution setting change countdown, as seen in connection with block 322. For example, if the race series includes ten races, each of which lasts a minute, sequence 300 in one embodiment provides one and ½ minutes between each race or heat for each player to reconfigure the player's car or change the player's during point distribution, In an alternative embodiment, the player's initially selected car configurations is used for each race of a particular series. The player can then reconfigure the car upon the next sequence 300.

In one preferred embodiment however the player is allowed to change the driver point distribution between races. It is contemplated however that system 70 alternatively use's the same driver point distribution throughout each race of a series.

If the setting change countdown has not yet been completed, as determined in connection with diamond 324, the countdown continues and the players can change their car and point distribution settings. When the setting change countdown is completed as determined in connection with diamond 324, system 70 and sequence 300 chooses another racetrack randomly from the racetrack pool, as seen in connection with block 312; and sequence 300 continues in this loop until each race of the series has been performed.

Figure 22:
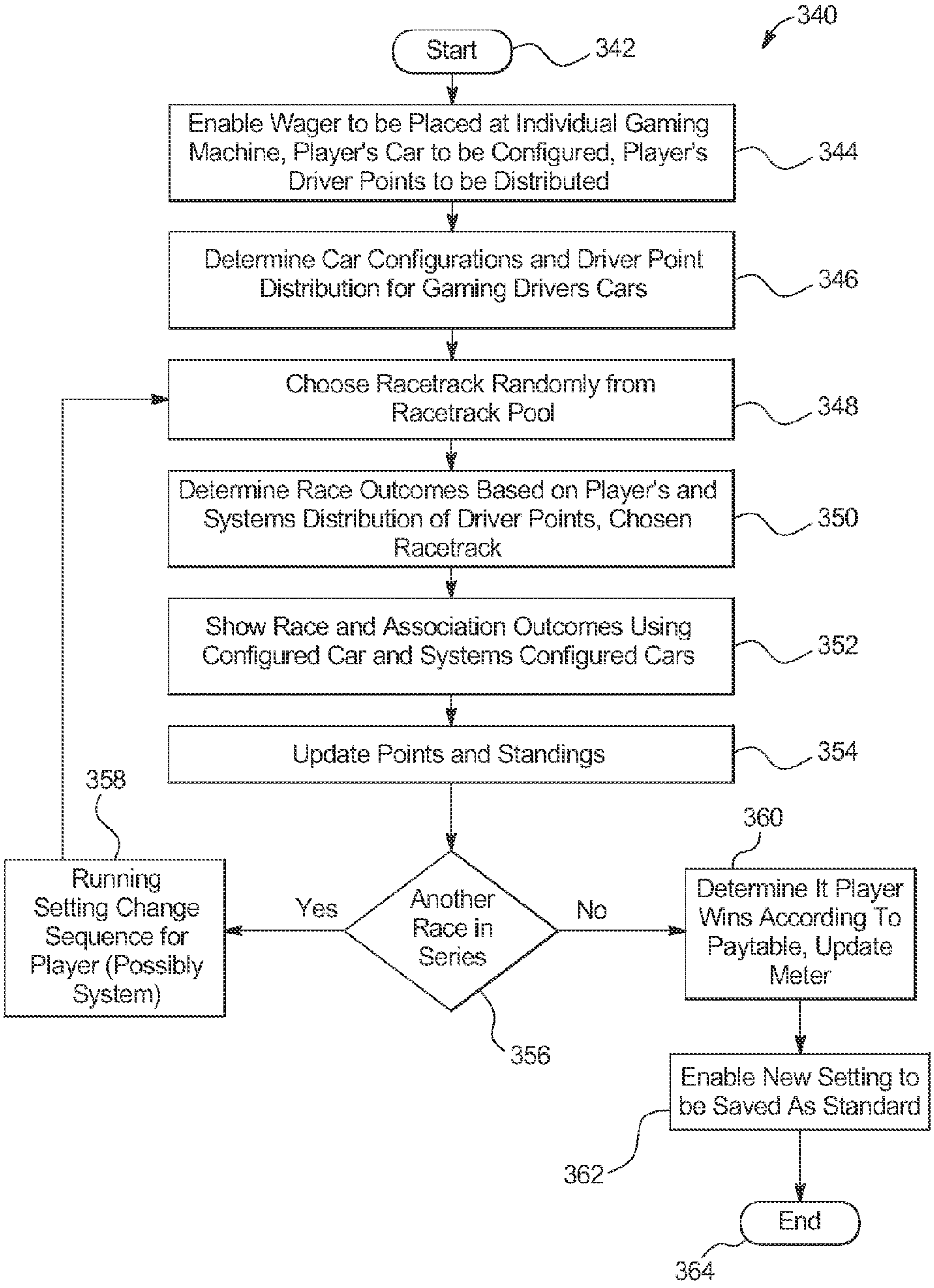
FIG. 22 is a schematic block diagram showing one possible sequence of operation for a single player version of a racing game having player configurable performance characteristics.

Referring now to FIG. 22, sequence 390 illustrates one embodiment for a single player version of the competition racing game having player configurable performance characteristics. Sequence 340 is operated individually on one of gaming devices 10. Here a large overhead display 68 and server computer 56 is not used. Game Processing and display are performed at gaming device 10.

Upon starting sequence 340 as seen in connection with oval 342, gaming device 10 enables the player to place a wager on machine 10, configure his or her car and set the driver point distribution, as seen in connection with block 344. Sequence 340 assumes that the single player game is a base wagering game, in which the player places a wager to play the racing game. In an alternative embodiment, the single player racing game is a bonus game triggered through play of a base wagering game, such as slot or poker. In the bonus game the player's wager is placed at the base game level. The payout of the single player bonus game is then set according to a bonus game payout schedule.

The player's car configuration and/or driver point distribution in one embodiment is recalled from the player's tracking card automatically. Gaming device 10 enables the player to keep the standard settings or modify either one or both of the car configuration and the point distribution. Alternatively, if the player does not have a player tracking card or gaming device 10 does not provide such a feature, gaming device 10 prompts the player for the car configuration and point distribution.

Next, gaming device 10 determines the car configuration and point distribution for each of the other cars in the race, as seen in connection with block 346. These settings are made randomly in one embodiment. In another embodiment, the car configurations for the system cars are preset, in which case the car configuration determination in connection with block 346 is not needed. It is also possible to preset the point distribution for the gaming device competitor cars. It may be preferable however to vary the car configurations and point distributions to enhance the randomness of the display results.

Next, gaming device 10 chooses a racetrack randomly from a racetrack pool, as seen in connection with block 348. Afterwards, gaming device 10 determines race outcomes based on the player's point distribution and the point distributions that gaming device 10 chooses randomly for the gaming device competitor cars. The outcome determination also depends on the randomly chosen racetrack, as seen in connection with block 350.

Next, the race and associated outcomes are shown on video monitor 16 or 18 using the player's configured car and the game's configured cars, as seen in connection with block 352. A racetrack display with moving cars similar to that illustrated in connection with FIG. 20 is displayed on the video monitor 16 or 18 of individual gaming device 10, as seen in connection with block 352.

In block 354, the player's point and standing in the series is updated. If another race exists in the series, as determined in connection with diamond 356, gaming device 10 runs a setting change sequence for the player (and possibly the gaming device cars), as seen in connection with block 358. For example, gaming device 10 can allow the player a half-minute or a minute to reconfigure the player's car and/or change the driving point distribution.

In an alternative embodiment, gaming device 10 prompts the player as to whether the player wishes to change either one or both the car configuration or the point distribution. If the player decides not to change either, sequence 340 returns to diamond 348 and chooses another racetrack randomly for the next race. If the player decides to change any settings, gaming device 10 waits until the player enters new settings. In any case, system 340 returns to block 348 and repeats this portion of sequence 340 until no additional race for the series exists, as determined in connection with diamond 356.

When no more races in the series exist, gaming device 10 running sequence 340 determines if the player wins any award according to a paytable and updates the player's credit meter accordingly, as seen in connection with block 360. One example of a single player paytable is shown in connection with FIG. 28. If the single player race game is a base game, the player may lose game credits or win game credits based on the paytable. If the single player race game alternatively is a bonus game, the player in one embodiment either wins credits or does not win credits but does not lose credits. The player's win in the bonus game can be enhanced by having a better overall race outcome.

Gaming device 10 operating sequence 340 also enables any new settings to the player's car or the player's driving point distribution to be saved as a standard, for example, on the player's tracking card, as seen in connection with block 362. Sequence 340 then ends, as seen in connection with oval 364.

Referring now to FIG. 23, one of example car configuration setup screen for a base or bonus game embodiment and for a single or multiplayer embodiment is shown on display device 16 or 18. In the illustrated embodiment, car configuration is performed at the individual gaming device. Gaming device 10 provides a suitable audio, visual or audiovisual message 82*a*, such as, "Driver's chose your vehicles" to inform the player that the current screen is a car setup screen.

FIG. 23 illustrates that the car configuration setup is split into three categories highlighted by audio, visual or audiovisual messages 82*b*, 82*c* and 82*d*. Message 82*b* prompts the player to press one of the buttons, e.g., touch screen buttons 84*a* to 84*f* once to preview the type of racecar and a second time to select that racecar. For example, if the player chooses formula one button 84*a* a first time, a formula one type racecar appears on display device 16 or 18 as seen in connection with indicia 86. If the player wishes to select the formula one car, the player pushes formula one button 84*a* again. The player can push the stock, grand prix, funny car, classic or sportster racecar button 84*b* to 84*f* instead to see different types of cars. Once the player selects the type of racecar, indicia 86 remains and the selected, e.g., formula one, button becomes highlighted with respect to the other car type buttons.

Audio, visual or audiovisual message 82*c* prompts the player to choose a color scheme using one of buttons 88*a* through 88*g*. Here again, the player presses the desired colored button once to have indicia 86 show the color scheme applied to the selected type of racecar and then presses that same button again a second time to choose or select the color. Alternatively, the player presses a different color scheme button a first time to see the car with a different color scheme.

In the third step the player presses one of buttons 90*a* to 90*e* to choose a logo or design or to not have a logo or design, according to audio, visual or audiovisual message 82*d*. Again, the player can press any button once to preview the logo on indicia 86 and then press the logo button 90*a* to 90*e* again to select the logo or design or a different logo button 90*a* to 90*e* to see a different logo.

In a fourth step as signaled by audio, visual or audiovisual message 82*e*, the player enters the number of the racecar using number selectors 92. The selected number appears in display 94. In an embodiment if after selecting two numbers the player selects an additional two numbers including a first number 0 for a single digit car, the new number appears in display 94.

After entering each of the four car configuration categories of information, the player presses confirm button 96 to confirm the settings or restart button 98 to restart the car configuration process. The screen of FIG. 23 is shown again in one embodiment after each race. If the player wishes after any race to change the type, color scheme, logo and/or number of the racecar, the player presses the restart button 98 and begins the above described process again. In one embodiment, the player must sequence through the car configuration screen from one to four. In another embodiment, the screen is flexible to allow the number for example to be chosen before the car type, etc.

Referring now to FIG. 24, one example of a driving point distribution screen is illustrated on local video monitor 16 or 18 of one of gaming devices 10. Again, in one preferred embodiment the point distribution selection is done locally at the constituent gaming device or kiosk. The driving point distribution screen of FIG. 24 is applicable to a base or bonus version of the racing game. Screen 24 is further applicable to a single or multiplayer race game.

Audio, visual or audiovisual message 82*f* informs the player that this screen is the driving point distribution screen via a suitable message, such as "Drivers, split up your driving points." Message 82*g* informs the player to press one of the windows 132*a* to 132*d* to choose one of the driving characteristics to set. The accumulation of the driving points in windows 132*a* to 132*d* must add to the preset amount allowed to each player, such as one-hundred points. Further, each characteristic must include at least one point in one embodiment.

Audio, visual or audiovisual messages 82*h* to 82*k* provide a quick definition of each driving parameter or characteristic, so that the player can simply choose which characteristics or parameters to emphasize and which to deemphasize. Message 82*h* for example reaches that acceleration is the automobile's ability to reach top speed. Message 82*i* informs the player that braking is how quickly the car can get down to a top cornering speed. Quicker braking is better because the car can move at a higher speed for a longer period of time before having to brake to reach the cornering speed in time to negotiate the corner properly. Message 82*j* illustrates that cornering is the speed that is maintained through a corner. Message 82*k* illustrates that top speed is the maximum speed the car can achieve assuming that it has enough time to do so on a particular straight section.

In the illustrated example, the player has placed thirty of the one-hundred of the points on acceleration, twenty of the one-hundred points on braking, twenty of the one-hundred points on cornering and thirty of the one-hundred points on top speed, totaling one-hundred points. Screen 16 or 18 provides numerical input buttons 92 to allow the player to change the settings of any of the driving characteristics. It should be appreciated that while four driving characteristics are shown, different characteristics and different numbers of characteristics can be used alternatively.

Screen 16 or 18 of FIG. 24 also provides the confirm and restart buttons 96 and 98, respectively. In one embodiment, if the chosen points do not add to one-hundred when the player presses confirm button 96, gaming device 10 sends an error message to the player informing the player to change one or more the settings to meet the one-hundred point requirement. In one embodiment, the player can change any of the settings via buttons 132*a* to 132*d* any number of times before pressing the confirm button 96. In such a case, restart button 98 is not needed. Alternatively, gaming device 10 sequences the player through characteristics 132*a* to 132*d*, in which case the player presses restart button 98 to begin anew at the top of the sequence if it is determined that a change needs to made during the middle or before the end of the sequence.

FIGS. 25A through 25J show example different selectable racetracks 134*a* to 134*j*, respectively. Each of the racetracks has a different shape, which is displayed for example on large overhead display 68 and/or on video monitor 16 or 18 of the individual gaming devices at the appropriate time of the single or multiplayer racing sequence. Associated with each racetrack 134*a* to 134*j* is an algorithm that determines outcomes for each racecar. Each algorithm weights each of the four characteristics or racing parameters from one to four. Racetrack 134*a* for example is associated with an algorithm that multiplies the total acceleration points by three, sums that product with the total breaking points, which is summed with 2× the total cornering points, all of which is summed with 4× the top speed points.

Thus, if racetrack 134*a* is selected, each player's (including single player system cars) point distribution is multiplied according to the algorithm associated with racetrack 134*a*. At the end of the race, the player or car with the highest total outcome wins, the player or car with the second highest total outcome is shown to come in second place, and so on. It is contemplated that different cars could tie. In one embodiment, there are simply two second place finishes, for example, and no tenth place finish for example. Alternatively, a separate race can be performed between the tied cars using a different randomly chosen racetrack and corresponding algorithm.

The algorithms in one embodiment are associated at least in some fashion with the shape of the racetrack. For example, racetracks tending to have less corners and longer straightaways will have associated algorithms stressing top speed and acceleration (quickness to top speed). On the other hand, racetracks having many turns and less straightaways will tend emphasize braking and cornering and deemphasize top speed and quickness to top speed.

In one embodiment, each racetrack 134*a* to 134*j* is weighted equally in terms of being selected randomly. While the racetracks 134*a* to 134*j* are shown, any suitable number of racetracks and associated algorithms may be provide alternatively.

Referring now to FIGS. 26A to 26C, an alternative algorithm for determining how different cars finish in a particular race is determined according to the time needed to reach the total distance of the racetrack or race. In FIG. 26A, select driver points for the categories are assigned to actual characteristic values for acceleration, deceleration and speed (only four representative points twenty, twenty-five, thirty and thirty-five are shown). The actual values are used in an equation for each racetrack, which includes a formula using actual values for acceleration, deceleration, cornering and top speed. For example, if the first portion of the selected racetrack is a straightaway, the time needed to complete the first portion of the racetrack is calculated using an acceleration (or a quickness to top speed number) and then the top speed itself assuming it can be reached. If the next portion of the racetrack involves a corner, the deceleration value and cornering speed are used to determine the time needed to negotiate the corner. This is done until the entire race has been completed. FIGS. 26B and 26C show an example of two cars running the same race.

FIG. 26A shows actual accelerations in miles/$h^2$, actual decelerations in negative miles/$h^2$, top cornering speed in miles/h and top speed in miles/h. In the cornering equation, the top cornering speed is based or dependent upon the radius of the corner. Thus, a corner having a smaller radius will result in a lower speed, but will do so equally for each car. Again, actual values for four typical weights or points are shown. Each point setting, e.g., one to ninety-seven out of one-hundred would have an associated actual value for each category.

FIGS. 26B and 26C show an integration of rate (in miles/hr) over the total time needed to finish the race (in hrs). That is, the area under the curve represents total distance which can be a single lap or multiple laps around the racetrack. Since the total distance for the race is known and the same for each car, and the speeds over different portions of the racetrack can be calculated, a determination can be made of the total time for each car that is needed to achieve the total or final distance. Here, the car with the least total time is the first place finisher, the car with the next lowest total time is the second place finisher, and so on. It should be appreciated that the following algorithm truly takes into account the actual configuration of the racetrack. The values for acceleration, deceleration, cornering and top speed can be adjusted per the game implementor.

Again, it should be appreciated that the numbers on the left represent certain ones of the point settings distribution selected by the player for the driving points. A separate actual value is set for each possible point selection. That is, acceleration would include a chart ranking one to ninety-seven out of one hundred, which is the possible range for acceleration assuming each category must have at least one point. Deceleration, cornering and top speed would have a like chart.

Referring now to FIG. 27, a sample paytable for a multiplayer game is illustrated. In this embodiment, the paytable varies depending on the total number of players and set a payback percentage at seventy-five percent, for example. Here, in this embodiment, each player wagers the same required a required amount. If only two players are playing, the first place player wins 1.5× the wager, the second player wins nothing. With three players, the top two finishers win at least some amount, while the third place finisher wins nothing. This type of distribution is expanded to four, five, six, seven, or more players in FIG. 27.

In one embodiment, the race is shown with for example ten cars racing regardless of how many gaming machines are actually active. If for example only two of ten cars are active, the car which finishes ahead of the other car wins 1.5× player's wager, while the car which finishes second relative to the first car wins nothing. That is, even if the players finish ninth and tenth, the payout is paid to the ninth place finisher according to the paytable of FIG. 27. In an alternative embodiment, if only two of the ten possible cars are active, only the two cars are shown in the race. Further alternatively, the race can have crashes in which non-active cars begin the race but eventually fall out of the race due to a crash so that active cars will finish at the front.

Referring now to FIG. 28, a sample paytable for a single player embodiment is shown. Here, a total payback percentage of 95 cents on the dollar is set. The race always has a set number of cars, such as ten, one of which will be the player's car, while nine remaining cars are configured and distributed randomly via gaming device processor's. Here, if the player finishes first the player wins 4× the player's wager, which in this case can vary. If the player finishes second, the player wins 2.5× the player's wager, and so on. If the player finishes sixth or worse, the player wins no credits. The paybacks of the first through the fifth place finishes add to 0.95× the wager or a 95% payback.

Further Description of Outcome Enhancing Feature

In one embodiment, the above described gaming devices and methods for operating gaming devices include an outcome enhancing feature implemented in a competition and/or attack and countermeasure game. The outcome enhancing feature enables a player to elect to enhance at least one outcome when an outcome enhancing condition is satisfied. If the player elects to enhance an outcome, the player is provided with an outcome associated with a greater average expected payout than the player would have received if the player had not elected to enhance an outcome and the same player and game choice selections were made. The outcome a player receives from electing to enhance an outcome can be considered an enhanced outcome and the outcome the player receives from not electing to enhance an outcome can be considered an unenhanced outcome.

Figure 29:
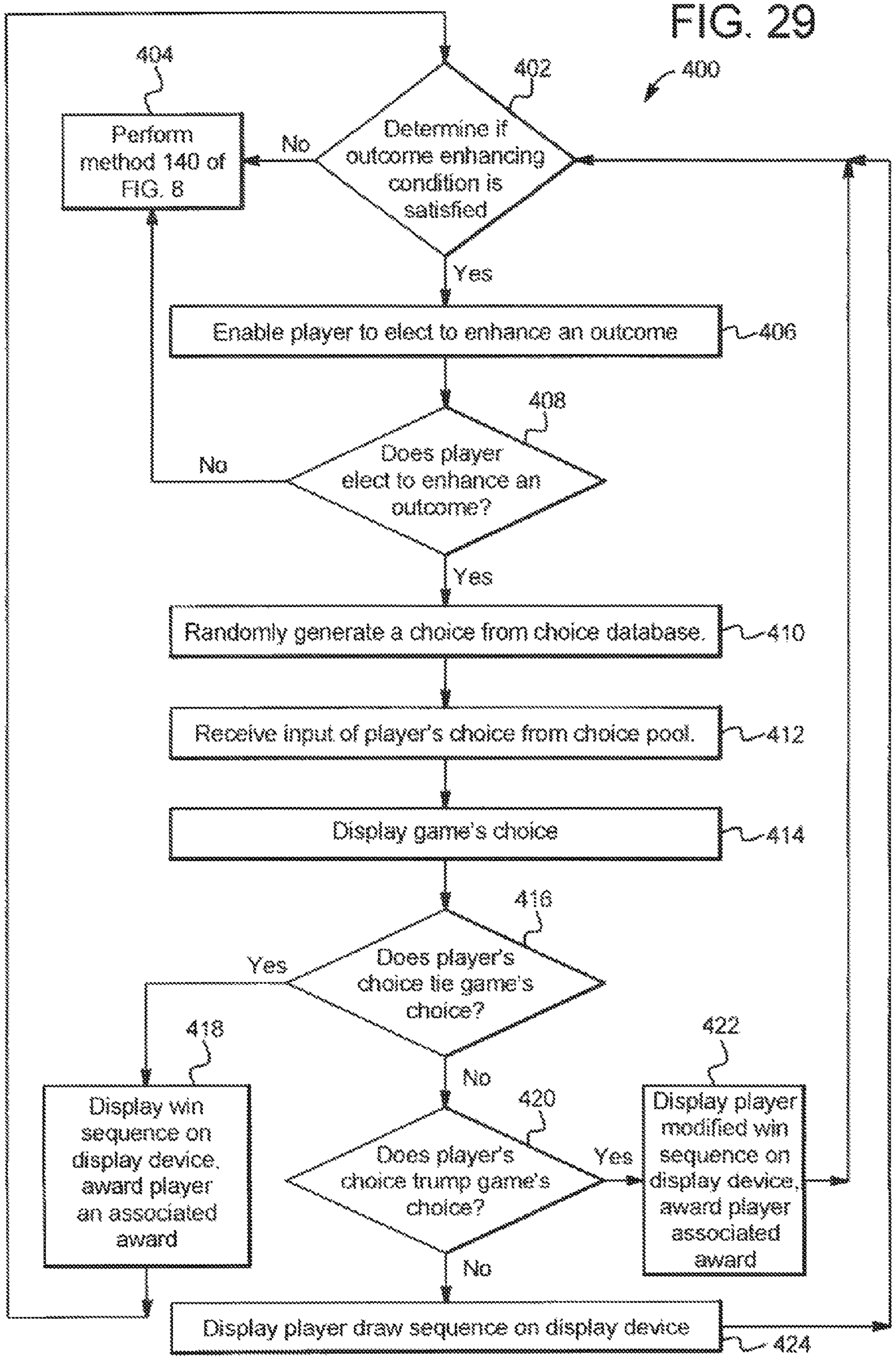
FIG. 29 is a flow diagram of one embodiment of the gaming device disclosed herein, illustrating an outcome enhancing feature.

Referring now to FIG. 29, one embodiment of a game implementing the outcome enhancing feature is illustrated by method 400. The outcome enhancing feature described in connection with the method 400 is implemented in the embodiment having the three choice structure described above with the game theme of rock, paper, scissors. In the method 400, the gaming device determines if an outcome enhancing condition is satisfied as indicated by the diamond 402. In one embodiment, the outcome enhancing condition is satisfied by an occurrence, or quantify of occurrences, of a gaming device event. In other embodiments, the gaming device processor and/or central server randomly determines when the outcome enhancing condition is satisfied. It should be appreciated that the outcome enhancing condition may be satisfied by any of the previously described manners, or any combination thereof. For example, satisfying the outcome enhancing condition may include, but is not limited to, a player receiving a predetermined outcome, a player receiving a predetermined set of outcomes, a player completing a predetermined number of games, a player placing any wager amount on a game, a player placing a designated wager amount on a game, a player receiving a certain number of points or a certain award (or award combination), the passage of a certain amount of time, the display of a designated symbol or symbol combination on one or more wheels or reels, or the spinning of one or more wheels or reels a certain number of times, or any other trackable event occurring during a player's gaming activity, or any combination of the above. In different embodiments, the determination of whether an outcome enhancing condition is satisfied is predetermined, randomly determined, determined based on a random determination by the central controller, determined based on a random determination by one or more gaming devices, determined based on the status of one or more players (such as determined through a player tracking system), determined based on one or more side wagers placed, determined based on the amount of coin-in accumulated in one or more pools, or determined based on any other suitable method or criteria.

If the outcome enhancing condition is not satisfied, the gaming device performs the method 140 of FIG. 8, as indicated by the block 404. If the outcome enhancing condition is satisfied, the game enables a player to elect to enhance an outcome, as indicated by the block 406. The gaming device determines if the player elected to enhance an outcome at the block indicated by 408. If the player does not elect to enhance an outcome, the gaming device continues with the method 140 of FIG. 8, as indicated by the block 404. In one embodiment, a player's decision not to elect to enhance an outcome may delay or prevent advancement towards another outcome enhancing condition being satisfied. For example, if a player does not elect to enhance an outcome when the progress indicator of FIG. 30C displays a full progress meter 500, the progress meter 500 would remain full, and thus the player's opportunity to advance towards satisfying another outcome enhancing condition would be delayed. In this embodiment, the gaming device provides the player with an incentive to use the outcome enhancing feature once the outcome enhancing condition is satisfied.

If the player elects to enhance an outcome, the gaming device randomly generates a choice from an equally or unequally weighted choice database, as indicated by the block 410. The gaming device receives the input of player's choice from the choice structure as indicated by the block 412 and displays the game's choice as indicated by the block 414. The gaming device makes a determination as to whether the player's choice ties the game's choice, as indicated by the diamond 416. If a tie occurs, the gaming device displays a win sequence, as indicated by the block 418, and awards the player an associated award. After displaying the player win sequence at block 418, the gaming device resets the sequence by returning to step 402 of the method 400.

It should be appreciated that if the player did not elect to enhance an outcome, the player would have received the draw outcome if the player's choice tied the game's choice. The gaming device's determination of a win sequence resulting from the player electing to enhance an outcome provides an outcome with a greater average expected payout than the outcome the gaming device would have provided if the player had not elected to enhance an outcome or the outcome enhancing condition has not been satisfied. For example, the win sequence resulting from the election to enhance an outcome may provide a player with a greater number of credits or points than the player would have received with a tie sequence if the player had not elected to enhance an outcome or when the outcome enhancing condition had not been satisfied. The gaming device's determination of a player win sequence resulting from the player electing to enhance an outcome is therefore greater than the average expected payout from the gaming device's determination of a player tie sequence resulting from the gaming device performing the method 140.

If a tie does not occur at the diamond 416, the gaming device determines whether the player's choice trumps the game's choice, as indicated by the diamond 420. If the player's choice does trump the game's choice, the gaming device displays a modified win sequence and awards the player an associated award, as indicated by the block 422. After displaying the player modified win sequence at block 422, the gaming device resets the sequence by returning to step 402 of the method 400.

It should be appreciated that if the player did not elect to enhance an outcome, the player would have received the win outcome if the player's choice trumped the game's choice. The gaming device's determination of the modified win sequence resulting from the player electing to enhance an outcome provides an outcome with a greater average expected payout than the outcome the gaming device would have provided if the player had not elected to enhance an outcome or the outcome enhancing condition had not been satisfied. For example, the modified win sequence resulting from the election to enhance an outcome may provide the player with a greater number of credits or points than the award that would have been associated with the win sequence when the player had not elected to enhance an outcome. The gaming device's determination of a player modified win sequence resulting from the player electing to enhance an outcome is therefore associated with a greater average expected payout than the gaming device's determination of a player win sequence resulting from the gaming device performing the method 140.

If the gaming device determines the player's choice does not trump the game's choice at diamond 420, the gaming device displays a player draw sequence, or tie. After displaying the player draw sequence at block 424, the gaming device resets the sequence by returning to step 402 of the method 400.

It should be appreciated that if the player had not elected to enhance an outcome, the player would have been received the lose outcome if the player's choice was trumped by the game's choice. The draw sequence resulting from the player electing to enhance an outcome provides an outcome with a greater average expected payout than the outcome the gaming device would have provided if the player had not elected to enhance an outcome or the outcome enhancing condition had not been satisfied. For example, the draw sequence resulting from the election to enhance an outcome may provide a player with a certain number of credits or points while the lose outcome may provide a player with a loss of continued play or potential awards, or loss of points. The gaming device's determination of a player draw sequence resulting from the player electing to enhance an outcome is therefore a determination associated with a greater average excepted payout than the gaming device's determination of a player lose sequence resulting from the gaming device performing the method 140 of FIG. 8.

Referring now to FIGS. 30A through 30H, in one example embodiment, the gaming device displays a player's gaming activity in the rock, paper, scissors game theme having an outcome enhancing feature. The embodiment illustrated in FIGS. 30A through 30H employs the choice structure 100 of FIG. 3A, wherein each choice either trumps or is trumped by every other choice. In an audio visual display, the gaming device includes a progress indicator illustrated as a progress meter 500 that displays the status of an outcome enhancing condition. The gaming device also displays three choice selections indicated by a rock selector 510, a paper selector 520, and a scissors selector 530.

Figure 30A:
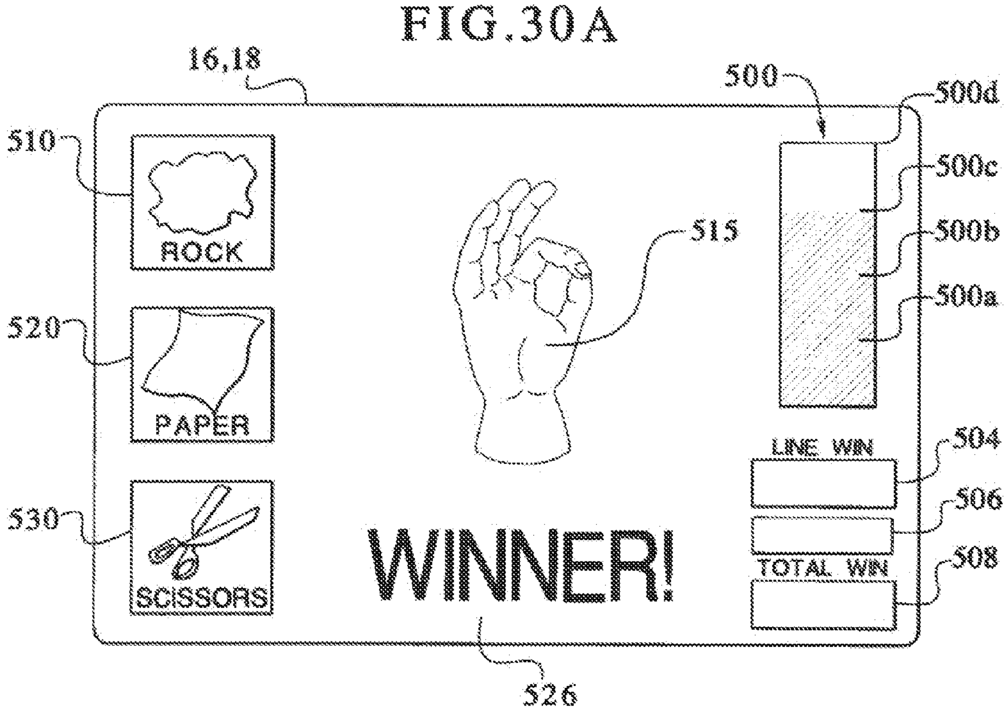
FIGS. 30A, 30B, 30C, 30D, 30E, 30F, 30G, and 30H are front elevational views of one of the display devices of FIGS. 1A and 1B, which illustrate one example display embodiment of a game having an outcome enhancing feature, wherein the choices are rock, paper, and scissors.
Figure 30B:
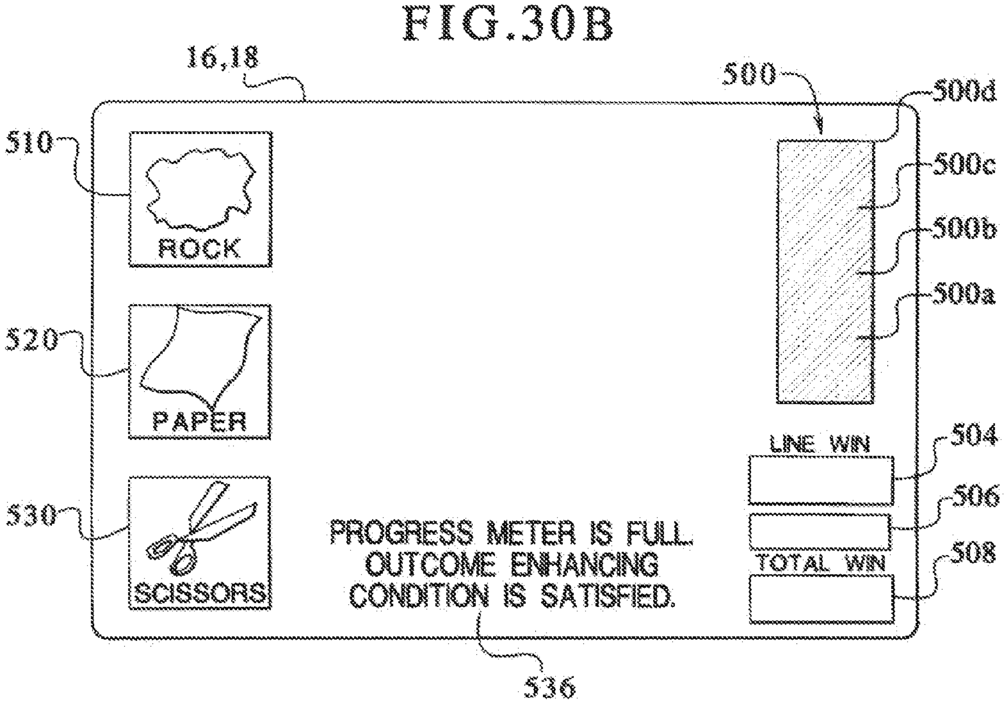

In this embodiment, the progress meter 500 includes first 500*a*, second 500*b*, third 500*c*, and fourth 500*d* levels for indicating the status of an outcome enhancing condition. For each game completed in this embodiment, the progress meter 500 increments upward one level. FIG. 30A illustrates a player winning a fourth game via a suitable audio or visual indicator 515. The gaming device generates a message 526 reading "WINNER" to indicate to the player they have won that particular game. At this time, the progress meter 500 is at the third level 500*c* and has not yet incremented to the fourth level 500*d*. FIG. 30B illustrates the gaming device incrementing the progress meter 500 one level to 500*d* for the completion of the fourth game. In this embodiment, the outcome enhancing condition is satisfied by the completion of the fourth game and the progress meter 500 indicating it as such. That is, the progress meter 500 is shown as being full or having been incremented to the top or fourth level 500*d*. The gaming device generates a message 536 reading "PROGRESS METER IS FULL. OUTCOME ENHANCING CONDITION SATISFIED."

Figure 30C:
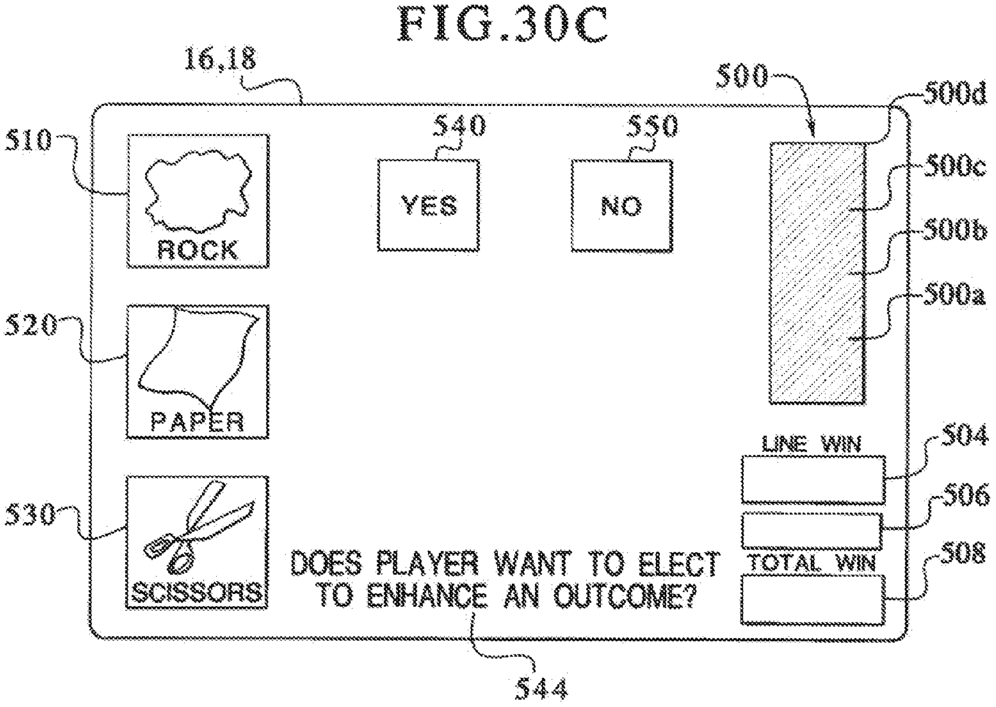
Figure 30D:
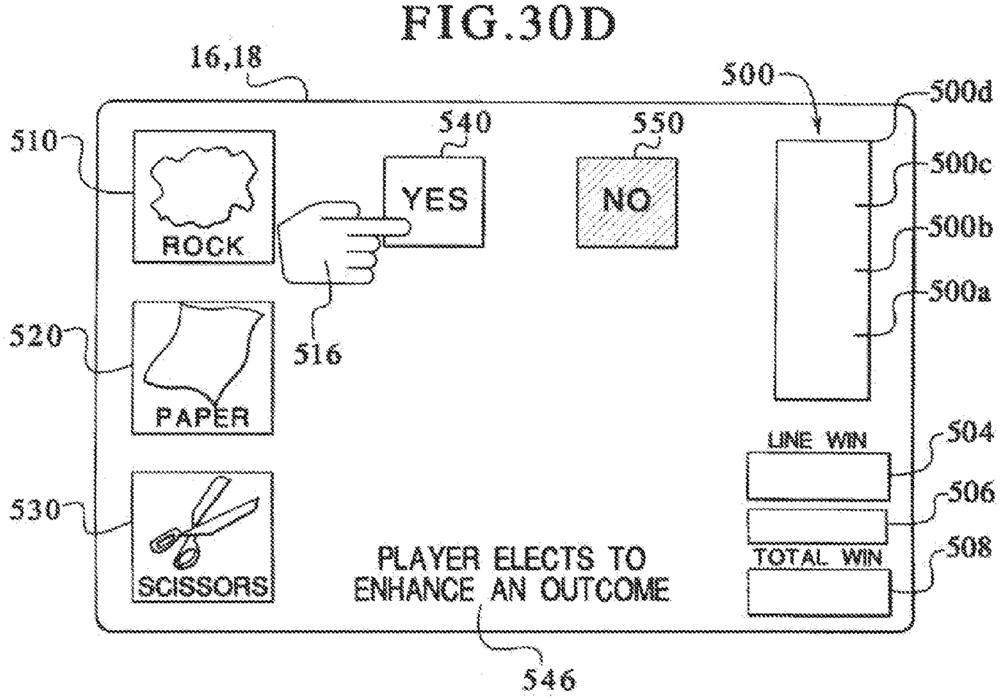

In one embodiment, FIG. 30C illustrates the gaming device prompting a player to elect to enhance an outcome when the outcome enhancing condition has been satisfied, as indicated by the progress meter 500 being full in FIG. 30B. The gaming device in FIG. 30C displays two selectors for a player to choose, a yes selector as illustrated by 540, and a no selector as illustrated by 550. The gaming device generates a message 544 reading "DOES PLAYER WANT TO ELECT TO ENHANCE AN OUTCOME?". The number of outcomes enhanced can be predetermined, randomly determined, determined based on a random determination by the central controller, determined based on a random determination by one or more gaming devices, determined based on the status of one or more players (such as determined through a player tracking system), determined based on one or more side wagers placed, determined based on a player's primary game wager, determined based on the amount of coin-in accumulated in one or more pools, or determined based on any other suitable method or criteria. FIG. 30D illustrates a player 516 electing to enhance an outcome by selecting the yes selector 540. When the player 516 elects to enhance an outcome, the progress meter 500 is emptied as illustrated in FIG. 300. The gaming device generates a message 546 reading "PLAYER ELECTS TO ENHANCE AN OUTCOME" across the bottom of one of the display devices 16, 18. It should be appreciated that in other embodiments, the player's election to enhance an outcome does not empty the progress meter 500, but instead increments the progress indicator down one or more levels. The amount the progress indicator increments downward can predetermined, randomly determined, determined based on a random determination by the central controller, determined based on a random determination by one or more gaming devices, determined based on the status of one or more players (such as determined through a player tracking system), determined based on one or more side wagers placed, determined based on a player's primary game wager, determined based on the amount of coin-in accumulated in one or more pools, or determined based on any other suitable method or criteria.

Figure 30E:
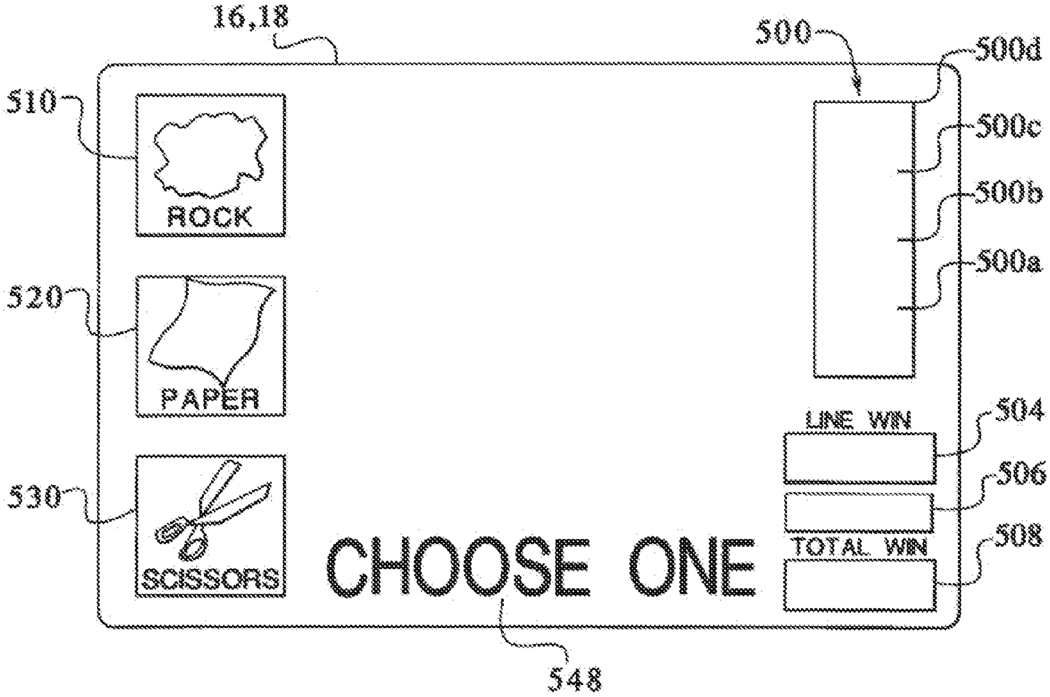
Figure 30F:
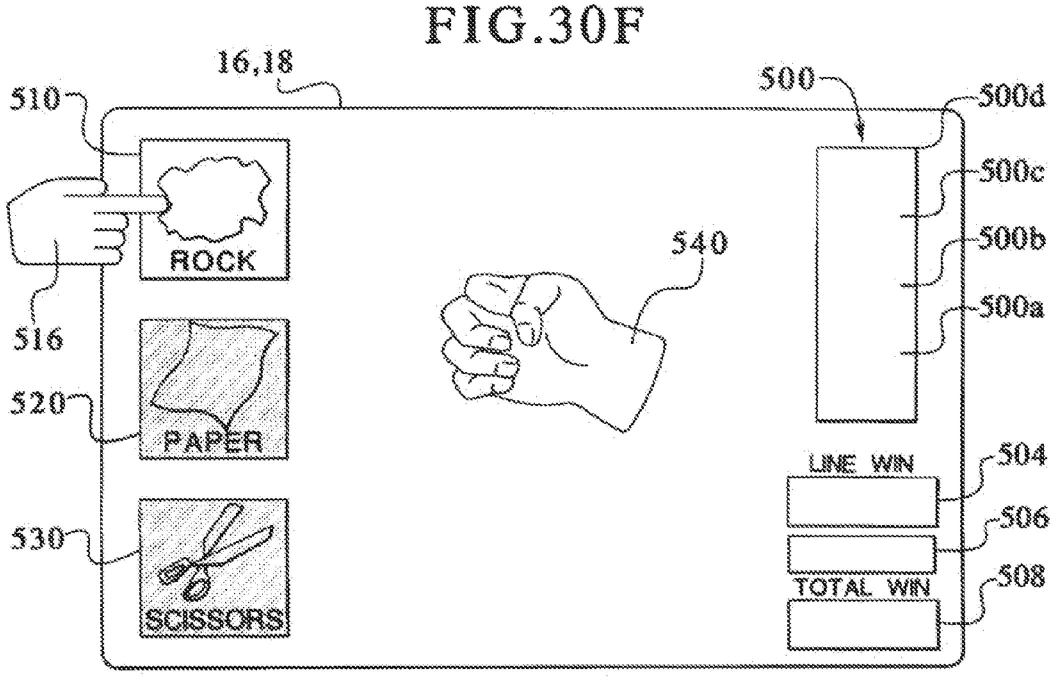
Figure 30G:
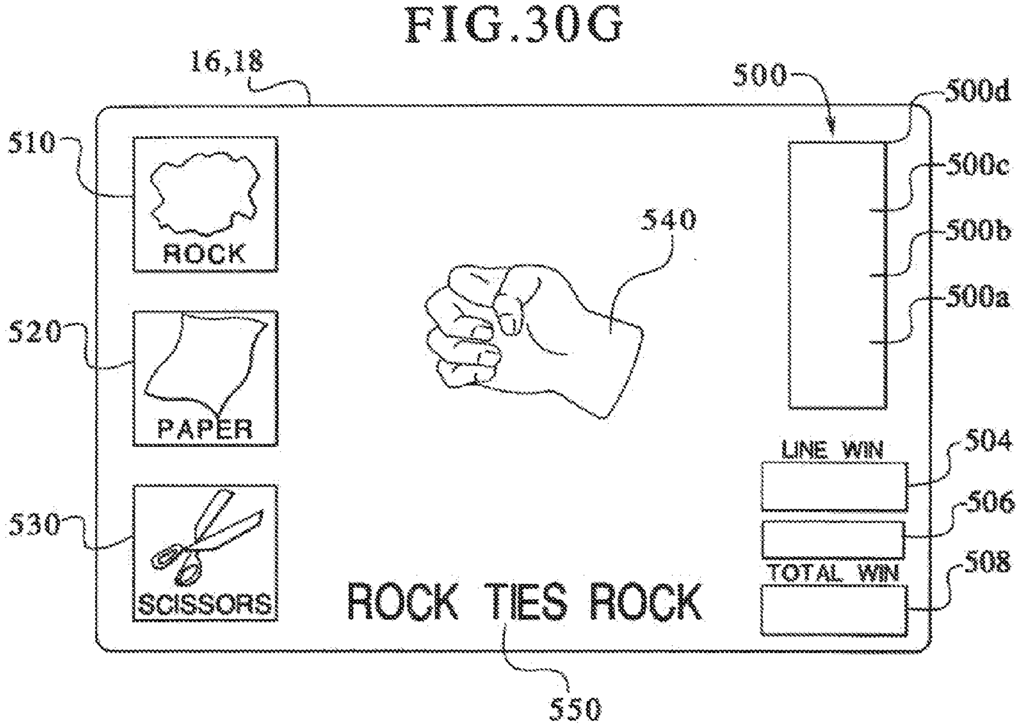
Figure 30H:
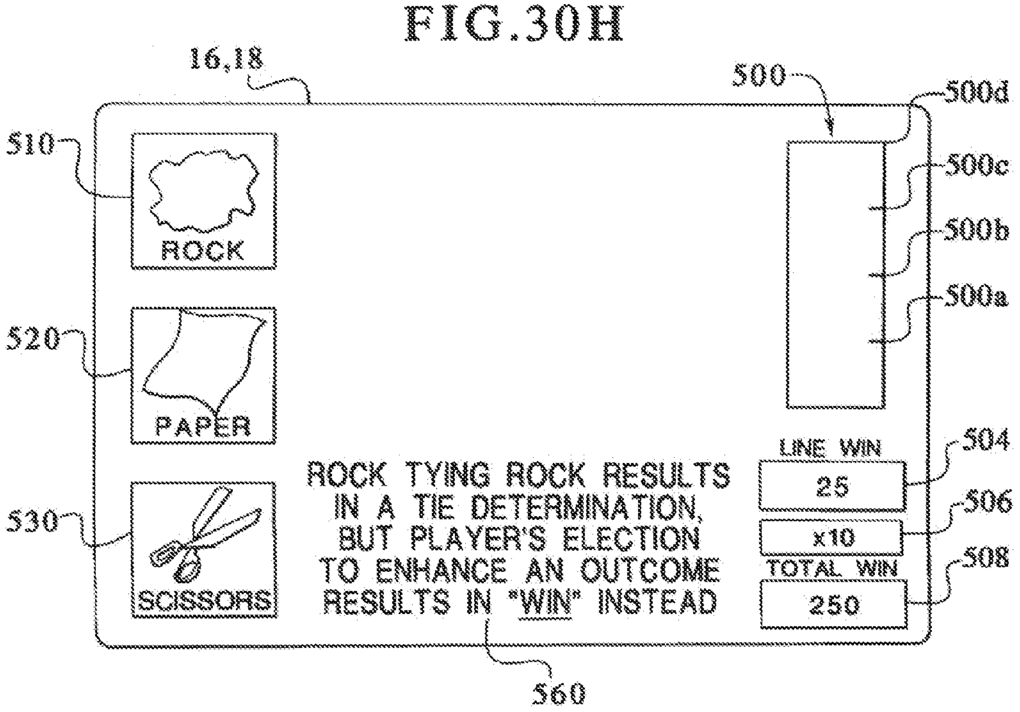

FIG. 30E illustrates the gaming device prompting the player 516 to select a choice of rock 510, paper 520, or scissors 530. The gaming device generates a message 548 reading "CHOOSE ONE" across the bottom of one of the display devices 16, 18, FIG. 30F illustrates the player 516 selecting the rock selector 530. FIG. 30G illustrates the gaming device, via indicator 540, selecting a rock choice from the rock 510, paper 520, scissors 530 selection choices. The gaming device displays the appropriate comparator of 550 between rock and rock as illustrated by FIG. 30G. That is, the gaming device displays "ROCK TIES ROCK" across the bottom of one of the display devices 16, 18. The gaming device determines an enhanced outcome based on the player's selection to enhance an outcome and displays the enhanced outcome. In this embodiment, the gaming device provides a win outcome to the player via visual indicator 560 displaying "ROCK TYING ROCK RESULTS IN TIE DETERMINATION, BUT PLAYER'S DECISION TO ELECT TO ENHANCE AN OUTCOME RESULTS IN "WIN" INSTEAD" as illustrated by FIG. 30H. If the player had not elected to enhance an outcome, the gaming device's determination would have been the draw outcome instead of the win outcome because the player's selection of rock ties the game's selection of rock. The election to enhance an outcome therefore provides a player with an outcome associated with a greater average expected payout than the player would have received if they had not elected to enhance an outcome.

FIG. 30H further illustrates the game rewarding the player for the win outcome by multiplying the player's payline 52 win (e.g., the win along the payline having the symbol or symbol combination triggering the bonus round) of twenty five credits shown in the line win display 504, by the multiplier of ten shown in the multiplier display 506 to form a total win of 250 credits shown in the total win display 508.

It should be appreciated that the embodiments of FIGS. 30A through 30H includes at least both of the methods disclosed in connection with FIGS. 8 and 10 described above.

Figure 31:
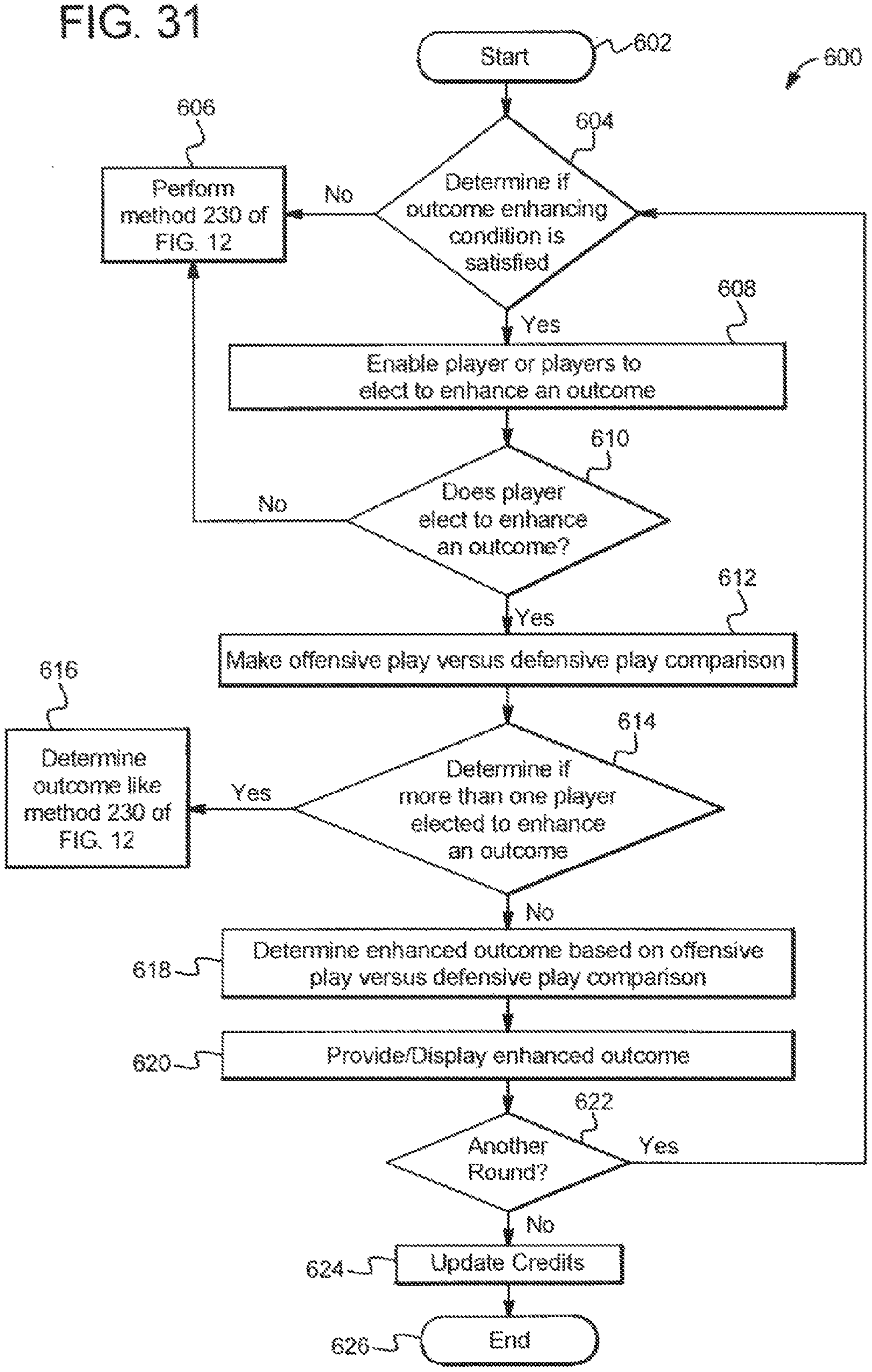
FIG. 31 is a flow diagram showing one example of an attack and countermeasure wagering game having an outcome enhancing feature playable on a gaming device.

Referring now to FIG. 31, one embodiment for the attack and countermeasure game having an outcome enhancing feature is illustrated by sequence 600, which begins as seen in connection with oval 602. This embodiment is described in connection with both a single and a multi-player format (two players in this embodiment). The gaming device first determines whether an outcome enhancing condition is satisfied as illustrated by the diamond 604. If the gaming device determines an outcome enhancing condition has not been satisfied, the gaming device performs the method 230 of FIG. 12 as illustrated by the block 606. If the gaming device determines an outcome enhancing condition has been satisfied, the gaming device enables the player in a single player format (or two players in a multi-player format) to elect to enhance an outcome as illustrated by the block 608. The gaming device determines whether the player in a single format (or both players in the multi-player format) elects to enhance an outcome as illustrated by the diamond 610.

If the player in a single player format does not elect to enhance an outcome (or if neither player elects to enhance an outcome in the multi-player format), the gaming device performs the method 230 of FIG. 12 as illustrated by the block 606. In a single player format, if the player elects to enhance an outcome, the gaming device makes an offensive play versus defensive play determination based on the player's selection of offensive and defensive plays and the game's selection of offensive and defensive plays as illustrated by the block 612. In a multiplayer format, the gaming device makes an offensive versus defensive play comparison based on the first player's selection of offensive and defensive plays and the second player's selection of offensive and defensive plays also illustrated by the block 612.

The gaming device determines whether more than one player elected to enhance an outcome as illustrated by the diamond 614. If more than one player elected to enhance an outcome, the gaming device determines an outcome in the same manner as the method 230 of FIG. 12 as illustrated by the block 616. That is, in this embodiment, the gaming device does not provide an enhanced outcome if two players elected to enhance an outcome because the election by one player cancels out the election by the second player. If the gaming device determines only one player elected to enhance an outcome, the gaming device determines an enhanced outcome based on the offensive versus defensive play comparison as illustrated by the block 618. The gaming device provides an enhanced outcome and displays the enhanced outcome to the player that elected to enhance an outcome as illustrated by the block 620. The enhanced outcome is an outcome that is greater than the average expected payout the player would have received had they not elected to enhance an outcome or if the outcome enhancing condition had not been satisfied.

After the enhanced outcome is displayed in step 620 the gaming device determines whether another round exists as seen in connection with diamond 622. If another round does exist, the gaming device repeats the above sequence. If no additional rounds exists, the gaming device updates each player's credits, as seen in block 624, and the sequence ends as illustrated by the End oval 626.

In one embodiment, the outcome enhancing feature is implemented in an attack and countermeasure game having a fight theme with two combatants or entities as discussed above in connection with FIGS. 13 and 14. In this embodiment, the gaming device includes a set of at least three offensive plays and a set of at least three defensive plays, wherein each of the defensive plays is predefined to trump at least one of the offensive plays and be trumped by at least one of the offensive plays. The gaming device enables the player to select one of the offensive plays and one of the defensive plays associated with a first entity and the gaming device selects one of the offensive plays and one of the defensive plays associated with a second entity.

If the outcome enhancing condition is satisfied, the gaming device enables the player to enhance at least one outcome. If the player does not elect to enhance an outcome or the outcome enhancing condition is not satisfied, the gaming device provides a win outcome for the first entity if the player selected offensive play trumps the gaming device selected defensive play. If the player selected offensive play is trumped by the gaming device selected defensive play, the gaming device provides a lose outcome. For example, if the player selects the offensive play to attack the head of the opponent and the gaming device selects the defensive or countermeasure play to defend the body, the gaming device provides the win outcome for the first entity. In one embodiment, the win outcome may be associated with an award of one or more points for the first entity. If the player selects the offensive play to attack the head of the opponent and the gaming device selects the defensive or countermeasure play to defend the head, the gaming device provides a lose outcome for the first entity. In one embodiment, the lose outcome may be associated with a loss of points for the first entity. In other embodiments, the lose outcome may be associated with no points.

If the player elects to enhance an outcome, the gaming device provides the win outcome for the first entity if the player selected offensive play trumps the gaming device selected defensive play. If the player elects to enhance an outcome, the gaming device provides the draw outcome instead of the lose outcome if the player selected offensive play is trumped by the gaming device selected defensive play. For example, if the player selects the offensive play to attack the head of the opponent and the gaming device selects the defensive or countermeasure play to defend the body, the gaming device provides the win outcome for the first entity. In one embodiment, the player may receive a certain number of points greater than the number of points received for the win award when the player had not elected to enhance an outcome and the player selected offensive play trumped the opponent selected defensive play. If the player selects the offensive play to attack the head of the opponent and the gaming device selects the defensive or countermeasure play to defend the head, the gaming device provides the draw outcome for the first entity instead of the lose outcome. In one embodiment, the draw outcome may be associated with no points for the first entity. The gaming device's determination of the win outcome and the draw outcome resulting from the player electing to enhance an outcome is associated with a greater average payout or award than the gaming device's determination of the win outcome or the lose outcome if the player had not elected to enhance an outcome or the outcome enhancing condition had not been satisfied.

In another embodiment, the outcome enhancing feature is implemented in the attack and countermeasure game having a fight theme wherein the gaming device only enables the player to select one of the offensive plays associated with a first entity and the gaming device only selects one of the defensive plays associated with a second entity. In this embodiment, the player's election to enhance an outcome results in the same outcomes as described above. For example, if the player selects the offensive play to attack the head of the opponent and the gaming device selects the defensive or countermeasure play to defend the body, the gaming device provides the win outcome for the first entity. In another example, if the player selects the offensive play to attack the head of the opponent and the gaming device selects the defensive or countermeasure play to defend the head, the gaming device provides the draw outcome for the first entity instead of the lose outcome. The gaming device's determination of the win outcome and the draw outcome resulting from the player electing to enhance an outcome is associated with a greater average payout or award than the gaming device's determination of the win outcome or the lose outcome if the player had not elected to enhance an outcome.

In another embodiment, the outcome enhancing feature is implemented in the attack and countermeasure game having a fight theme wherein the gaming device only enables the player to select one of the defensive plays associated with the first entity and the gaming device only selects one of the offensive plays associated with a second entity. In this embodiment, the player's election to enhance an outcome results in outcomes similar to those described above. For example, if the gaming device selects the offensive play to attack the body, and the player selects the defensive or countermeasure play to defend the body, the gaming device provides the win outcome for the first entity. In another example, if the gaming device selects the offensive play to attack the head of the opponent and the player selects the defensive or countermeasure play to defend the body, the gaming device provides the draw outcome for the first entity instead of the lose outcome. The gaming device's determination of the win outcome and the draw outcome resulting from the player electing to enhance an outcome is associated with a greater average payout or award than the gaming device's determination of the win outcome or the lose outcome if the player had not elected to enhance an outcome.

In another embodiment, the outcome enhancing feature is implemented in the attack and countermeasure game having a fight theme wherein the gaming device enables a first player to select only one of the offensive plays associated with a first entity and enables a second player to select only one of the defensive plays associated with a second entity. In this embodiment, the first player's election to enhance an outcome results in the same outcomes as described above. For example, if the first player selects the offensive play to attack the head of the opponent and the second player selects the defensive or countermeasure play to defend the body, the gaming device provides the win outcome for the first entity. In another example, if the first player selects the offensive play to attack the head of the opponent and the second player selects the defensive or countermeasure play to defend the head, the gaming device provides the draw outcome for the first entity instead of the lose outcome. The gaming device's determination of the win outcome and the draw outcome resulting from the first player electing to enhance an outcome is associated with a greater average payout or award than the gaming device's determination of the win outcome or the lose outcome if the first player had not elected to enhance an outcome.

In another embodiment, the outcome enhancing feature is implemented in the attack and countermeasure game having a fight theme wherein the gaming device enables a first player to select only one of the defensive plays associated with a first entity and enables a second player to select only one of the offensive plays associated with a second entity. In this embodiment, the second player's election to enhance an outcome results in the same outcomes for the second player as the outcomes for the first player in the embodiment where the first player is only able to select one of the offensive plays and the gaming device only selects one of the defensive plays.

It should be appreciated that the outcome enhancing feature can be implemented in any of the above embodiments or in any other competition and/or attack and countermeasure type game. For example, the outcome enhancing feature can be implemented in the three choice attack and countermeasure embodiment as described in connection with FIGS. 3A, 3B, and 3C, wherein each choice either trumps or is trumped by every other choice of the embodiment. The feature may also be implemented in the four choice attack and countermeasure embodiment described in FIGS. 4A, 4B, and 4C, the five choice attack and countermeasure embodiment described in FIGS. 5A, 5B, and 50, the eight choice attack and countermeasure embodiment described in FIGS. 6A, 6B, and 6C, and an attack and countermeasure embodiment having different probability distributions as described in FIGS. 7A, 7B, 7C, and 70.

The outcome enhancing feature can also be implemented in any of the various game themes described above or any other competition and/or attack and countermeasure type game theme. For example, the outcome enhancing feature may be implemented in the three choice structure having the rock, paper, scissors game theme as illustrated in FIGS. 11A through 11D. In alternative embodiments, the outcome enhancing feature can be implemented in the fight or combat type game theme as illustrated in FIGS. 13 and 14, the tank battle or commander game theme as illustrated in FIGS. 15 to 17, the American football type game theme as illustrated in FIGS. 18 and 19, or in the racing game system as illustrated in FIGS. 20 through 28. It should be appreciated that the outcome enhancing feature can also be implemented in any attack and countermeasure embodiment adapted for a multiplayer gaming environment.

It should also be appreciated that the progress indicator may increment a different amount depending on what event occurs. For example, the progress indicator may increment two or more levels for a win outcome, at least one level for a tie outcome, and no levels for a loss outcome. Alternatively, the gaming device may randomly increment the progress indicator during a player's gaming activity. It should be appreciated that the amount the progress indicator increments can be predetermined, randomly determined, determined based on a random determination by the central controller, determined based on a random determination by one or more gaming devices, determined based on the status of one or more players (such as determined through a player tracking system), determined based on one or more side wagers placed, determined based on the amount of coin-in accumulated in one or more pools, or determined based on any other suitable method or criteria. The progress indicator may display the outcome enhancing condition being satisfied by a full progress bar or less than a full progress bar for each of the above described methods of satisfying an outcome enhancing condition. In alternative embodiments, the progress indicator may increment different amounts for different players upon the occurrence of the same event.

It should be appreciated that in one embodiment the gaming device accumulates a designated number of outcome enhancing units for each play of a game. The gaming device's accumulation of outcome enhancing units can be considered a player's accumulation of power in, for example, the combatant type game theme discussed above. In one embodiment, the outcome enhancing condition can be satisfied if the quantity of accumulated outcome enhancing units is at least a designated quantity. In one embodiment, the progress indicator displays the accumulation of the outcome enhancing units. For example, the gaming device may increment the progress indicator one level for each game completed, which would be a visual representation of the accumulation of one outcome enhancing unit.

It should also be appreciated that in alternative embodiments, the status of the outcome enhancing condition could be displayed using any visual representation displayable by the gaming device. Alternatively, the gaining device may inform a player of the status of an outcome enhancing condition via an audio signal. For example, the gaming device may inform a player as to the status of an outcome enhancing condition via the gaming device's sound generating device, such as the one or more sound cards 48 controlling the one or more speakers 50. The sound generating device may periodically inform the player as to the status of the outcome enhancing condition and prompt the player to make a decision as to whether to elect to enhance an outcome when the outcome enhancing condition is satisfied.

In another embodiment, the gaming device may notify the player only when the outcome enhancing condition is satisfied. That is, the gaming device may provide no indication as to the status of an outcome enhancing condition and prompt the player to elect to enhance an outcome only when the outcome enhancing condition is satisfied. The prompt could be an audio signal, a visual display, or a combination thereof.

In a further embodiment, if the player elects to enhance an outcome, the gaming device provides the player with an outcome that is less favorable than the outcome the player would have received had they not elected to enhance an outcome. For example, if a player elects to enhance an outcome, the gaming device provides the player with a draw outcome instead of the win outcome, which the player would have received if they had not elected to enhance an outcome. Thus, the player's decision to elect to enhance an outcome provides the player with an award associated with a lesser average expected payout than the player would have received if they had not elected to enhance an outcome. In this embodiment, the gaming device provides the player with an additional element of strategy in determining an appropriate time for electing to enhance an outcome.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device; and at least one memory device which stores a plurality of instructions which when executed by at least one processor cause the at least one processor to operate with the at least one input device and the at least one display device to:

(a) determine when an outcome enhancing condition is" satisfied in association with a play of a game, said game including:

(i) a first entity and a second entity, said first entity representing a player and said second entity representing an opponent of the player, (ii) a set of at least three different offensive plays, and (iii) a set of at least three different defensive plays, wherein each of the offensive plays is predefined to trump at least one of the defensive plays and be trumped by at least another one of the defensive plays, wherein each of the defensive plays is predefined to trump at least one of the offensive plays and be trumped by at least another one of the offensive plays, (b) enable the player to elect to enhance at least one outcome when the outcome enhancing condition is satisfied, (c) enable the player to select one of the offensive plays and one of the defensive plays for the first entity, (d) select one of the opponent defensive plays and one of the opponent offensive plays for the second entity, (e) when the outcome enhancing condition is not satisfied or satisfied and the player elects not to enhance at least one outcome:

(i) provide a win outcome for the first entity when the player selected offensive play trumps the opponent selected defensive play, and (ii) provide a lose outcome for the first entity when the player selected offensive play is trumped by the opponent selected defensive play, and (f) when the outcome enhancing condition is satisfied and the player elects to enhance at least one outcome:

(i) provide the win outcome for the first entity when the player selected offensive play trumps the opponent selected defensive play, and (ii) provide a draw outcome for the first entity when the player selected offensive play is trumped by the opponent selected defensive play.

2. The gaming device of claim 1, wherein when the player elects to enhance an outcome and the player selected offensive play trumps the opponent selected defensive play, the win outcome is associated with a greater award than the win outcome when the player elects not to enhance an outcome.

3. A method of operating a gaming system, said method comprising:

(a) causing at least one processor to execute a plurality of instructions to determine when an outcome enhancing condition is satisfied in association with a play of a game, said game including:

(i) a first entity and a second entity, said first entity representing a player and said second entity representing an opponent of the player, (ii) a set of at least three different offensive plays, and (iii) a set of at least three different defensive plays, wherein each of the offensive plays is predefined to trump at least one of the defensive plays and be trumped by at least another one of the defensive plays, wherein each of the defensive plays is predefined to trump at least one of the offensive plays and be trumped by at least another one of the offensive plays, (b) enabling the player to elect to enhance at least one outcome when the outcome enhancing condition is satisfied, (c) enabling the player to select one of the offensive plays and one of the defensive plays for the first entity, (d) causing the at least one processor to execute the plurality of instructions to select one of the opponent defensive plays and one of the opponent offensive plays for the second entity, (e) when the outcome enhancing condition is not satisfied or satisfied and the player elects not to enhance at least one outcome:

(i) providing a win outcome for the first entity when the player selected offensive play trumps the opponent selected defensive play, and (ii) providing a lose outcome for the first entity when the player selected offensive play is trumped by the opponent selected defensive play, and (f) when the outcome enhancing condition is satisfied and the player elects to enhance at least one outcome:

(i) providing the win outcome for the first entity when the player selected offensive play trumps the opponent selected defensive play, and (ii) providing a draw outcome for the first entity when the player selected offensive play is trumped by the opponent selected defensive play.

4. The method of claim 3, wherein when the player elects to enhance an outcome and the player selected offensive play trumps the opponent selected defensive play, the win outcome is associated with a greater award than the win outcome when the player elects not to enhance an outcome.

5. The method of claim 3, which is provided through a data network.

6. The method of claim 5, wherein the data network is the internet.

7. A non-transitory computer readable medium including a plurality of instructions, which when executed by at least one processor, cause the at least one processor to:

(a) determine when an outcome enhancing condition is satisfied in association with a play of a game, said game including:

(i) a first entity and a second entity, said first entity representing a player and said second entity representing an opponent of the player, (ii) a set of at least three different offensive plays, and (iii) a set of at least three different defensive plays, wherein each of the offensive plays is predefined to trump at least one of the defensive plays and be trumped by at least another one of the defensive plays, wherein each of the defensive plays is predefined to trump at least one of the offensive plays and be trumped by at least another one of the offensive plays, (b) enable the player to elect to enhance at least one outcome when the outcome enhancing condition is satisfied, (c) enable the player to select one of the offensive plays and one of the defensive plays for the first entity, (d) select one of the opponent defensive plays and one of the opponent offensive plays for the second entity, (e) when the outcome enhancing condition is not satisfied or satisfied and the player elects not to enhance at least one outcome:

(i) provide a win outcome for the first entity when the player selected offensive play trumps the opponent selected defensive play, and (ii) provide a lose outcome for the first entity when the player selected offensive play is trumped by the opponent selected defensive play, and (f) when the outcome enhancing condition is satisfied and the player elects to enhance at least one outcome:

(i) provide the win outcome for the first entity when the player selected offensive play trumps the opponent selected defensive play, and (ii) provide a draw outcome for the first entity when the player selected offensive play is trumped by the opponent selected defensive play.

8. The non-transitory computer readable medium of claim 7, wherein when the player elects to enhance an outcome and the player selected offensive play trumps the opponent selected defensive play, the win outcome is associated with a greater award than the win outcome when the player elects not to enhance an outcome.

* * * * *